US006483276B1

(12) United States Patent
Shimizu et al.

(10) Patent No.: US 6,483,276 B1
(45) Date of Patent: Nov. 19, 2002

(54) ELECTRONIC DEVICE WITH VARIABLE CHOPPING SIGNAL AND DUTY RATIO SELECTION FOR STRONG BRAKING

(75) Inventors: Eisaku Shimizu, Okaya (JP); Kunio Koike, Matsumoto (JP); Hidenori Nakamura, Matsumoto (JP); Osamu Takahashi, Matsumoto (JP); Shigeyuki Fujimori, Chino (JP); Osamu Shinkawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/518,812

(22) Filed: Mar. 3, 2000

(30) Foreign Application Priority Data

| | | | |
|---|---|---|---|
| Mar. 3, 1999 | (JP) | .......................................... | 11-055545 |
| Mar. 29, 1999 | (JP) | .......................................... | 11-086949 |
| Dec. 2, 1999 | (JP) | .......................................... | 11-343262 |
| Dec. 22, 1999 | (JP) | .......................................... | 11-364956 |

(51) Int. Cl.$^{7}$ ............................ H02P 9/04; H02P 9/00; H02P 11/00; H02K 7/00; H02H 7/06; G04B 1/00

(52) U.S. Cl. ........................ 322/24; 290/1 C; 290/1 E; 368/204; 310/75 A; 310/75 B; 322/28

(58) Field of Search ................................ 318/757, 375, 318/727, 254, 258, 376, 767, 807, 362, 701, 139, 759; 322/29; 290/52, 1, 1 AE, 1 C; 180/65.2, 65.4; 340/75 B, 83, 118

(56) References Cited

U.S. PATENT DOCUMENTS

| | | | | | |
|---|---|---|---|---|---|
| 3,937,001 | A | | 2/1976 | Berney ........................ | 322/29 |
| 4,284,936 | A | * | 8/1981 | Bailey et al. ............... | 318/381 |
| 4,581,565 | A | * | 4/1986 | Van Pelt et al. ............ | 318/294 |
| 4,799,003 | A | | 1/1989 | Tu et al. ....................... | 322/29 |
| 5,615,178 | A | * | 3/1997 | Takakura et al. ........... | 368/203 |
| 5,881,027 | A | | 3/1999 | Schafroth ................... | 368/203 |
| 6,041,021 | A | * | 3/2000 | Shnkawa et al. ............. | 368/64 |
| 6,097,675 | A | * | 8/2000 | Takahashi et al. .......... | 368/204 |
| 6,154,422 | A | * | 11/2000 | Shinkawa et al. .......... | 320/166 |
| 6,252,828 | B1 | * | 6/2001 | Shinkawa et al. .......... | 368/203 |
| 6,314,059 | B1 | * | 11/2001 | Shimizu et al. ............. | 368/157 |

FOREIGN PATENT DOCUMENTS

| | | | | |
|---|---|---|---|---|
| EP | 0 239 820 | A1 | | 10/1987 |
| EP | 0 806 710 | A1 | | 11/1997 |
| EP | 0 862 262 | A2 | | 9/1998 |
| EP | 0905588 | A2 | * | 3/1999 |
| JP | 7-119812 | | | 5/1995 |
| JP | 8-101284 | | | 4/1996 |
| JP | 2780356 | | | 5/1998 |
| JP | 411206132 | A | * | 7/1999 |
| JP | 2000197393 | A | * | 7/2000 |

* cited by examiner

*Primary Examiner*—Nestor Ramirez
*Assistant Examiner*—Julio C. Gonzalez
(74) *Attorney, Agent, or Firm*—Mark Pl Watson

(57) ABSTRACT

An electronic device capable of increasing the braking torque applied to an electric power generator without causing a significant reduction in electric power generated by the electric power generator. The electronic device, which may be embodied in an electronically controlled mechanical clock, includes an electric power generator for converting mechanical energy transmitted from a spring via a wheel train to electrical energy, and a rotation controller for controlling the rotation period of the electric power generator. The rotation controller includes switches capable of connecting two terminals of the electric power generator in a closed-loop state, a chopping signal generator for generating two or more types of chopping signals which are different in duty ratio or frequency for use in a strong braking operation, and chopping signal selector that selects one of the chopping signals, wherein, in the strong braking operation, the selected chopping signal is applied to the switches so as to control the electric power generator in a chopping fashion. The strong braking operation is performed in one of two modes such that a higher priority is given to generation of electric power or the braking torque depending on the mode, thereby achieving an increase in the braking torque of the electric power generator without causing a significant reduction in the voltage generated by the electric power generator.

32 Claims, 33 Drawing Sheets

53
MONOSTABLE MULTIVIBRATOR
62
FG1
WAVEFORM SHAPING
61
22
28
29
120
CH15
MG2
25
20
23
MG1
24
26
27
21
40
41
VDD
SR
VSS
INITIALIZATION CIRCUIT
90
BRAKING AMOUNT DETECTOR
100
FG1
fs
CTL2
155
CH14
80
152
154
153
CH11
CH12
CH13
CHOPPING SIGNAL GENERATOR
151A
0/16
512Hz
64Hz
13/16
SR
74
75
60
LOAD
UP
DOWN
QA
QB
QC
QD
CLE
D
C
B
A
VSS
73
71
D
Q
CK
72
70
55
FG1
512Hz
1024Hz
fs:8Hz
52
Q3 Q4 Q5 Q6 Q7 Q8 Q9
Q12
FREQUENCY DIVIDER
OSCILLATOR
51
QUARTZ RESONATOR
51A

ELECTRONIC DEVICE WITH VARIABLE CHOPPING SIGNAL AND DUTY RATIO SELECTION FOR STRONG BRAKING

BACKGROUND OF THE INVENTION

1. Field of the Invention

The present invention relates to an electronic device, apparatuses employing the device such as an electronically controlled mechanical clock, and a method of controlling such a device and apparatuses. The device and clock of the present invention include a mechanical energy source; an electric power generator, driven by the mechanical energy source, for generating electric power by induction and supplying resulting electrical energy; and a rotation controller, driven by the electrical energy, for controlling the rotation period of the electric power generator.

2. Description of the Related Art

Japanese Examined Patent Publication No. 7-119812 is directed to an electronically controlled mechanical clock in which mechanical energy generated when a spring is released is converted to electrical energy using an electric power generator. A rotation controller is driven by the electric energy so as to control a current flowing through a coil of the electric power generator so that the clock hands connected to a wheel train are precisely driven to indicate precise time.

To operate such an electronically controlled mechanical clock for a long period of time, it is important to increase braking torque when the spring torque is large without causing a reduction in generated electric power. That is, in electronically controlled mechanical clocks, it is desirable to prioritize the braking torque applied to the electric power generator versus the electric power generated by the electric power generator, such that a higher priority is given to the braking torque when the spring torque is large, while a higher priority is given to the electric power when the spring torque is small because strong braking is not needed in this case.

As used herein, the expression "when the torque is large" or the like describes not only a state in which the spring torque is large because the spring is in a fully or sufficiently wound state, but also a state in which the driving torque applied to the rotor is increased due to a disturbance, such as vibration or mechanical shock. Similarly, the expression "when the torque is low" or the like describes not only a state in which the spring torque is low because the spring is in a fully or nearly fully unwound/released state, but also a state in which the driving torque applied to the rotor is reduced due to a disturbance, such as vibration or mechanical shock.

In the technique disclosed in Japanese Examined Patent Publication No. 7-119812, a "braking-off" angular range and a "braking-on" angular range are provided in each revolution of a rotor. In each period of a reference signal, the rotational speed of the rotor is increased and a greater amount of electric power is generated in the braking-off angular range, while the rotational speed of the rotor is decreased by applying braking in the braking on angular range. That is, the rotational speed is controlled such that the generated electric power is increased during a high-speed period thereby compensating for the reduction in the electric power which occurs when the electric power generator is braked. The braking-off operation is performed at a plurality of first points of time in respective successive periods of the reference signal generated by a quartz oscillator or the like, and a braking-on operation is performed at a second point of time apart from the first point of time in each period of the reference signal.

However, in the technique of Japanese Examined Patent Publication No. 7-119812, a reduction in electric power generated by the electric power generator occurs when the electric power generator is braked, and thus there is a limitation in suppressing the reduction in the electric power when the braking torque is increased. This problem occurs not only in electronically controlled mechanical clocks, but also in other various electronic devices, such as music boxes, metronomes, and electric shavers, each of which include a part rotated by a mechanical energy source such as a spring or rubber. Thus, there is a need for a technique which can solve the above problem.

Another problem associated with the technique in Japanese Examined Patent Publication No. 7-119812, is that a braking-on operation started at a second point of time in a certain reference period is forcibly switched to a braking-off operation at a first point of time in the following reference period, regardless of the state in terms of rotation of the electric power generator. This can cause the braking amount to become insufficient depending on the state, and thus it takes a long time to reach a target rotational speed. Even if the braking operation is performed using a control signal, the operation is switched to a mode in which braking is performed in synchronization with a reference period, regardless of the period of the control signal. This can cause degradation in the braking control accuracy.

Thus, there is a need to control the braking operation in a more precise manner so as to achieve higher accuracy in the operation of various operating parts. Such control is needed not only in electronically controlled mechanical clocks, but also in other various electronic devices which have a part which is rotated by a mechanical energy source such as a spring or rubber. Other devices in which such control is needed include, for example, music boxes (i.e, drums thereof), metronomes (i.e., pendulums thereof), various electronic toys, and electric shavers.

SUMMARY OF THE INVENTION

OBJECTS OF THE INVENTION

Therefore, it is an object of the present invention to overcome the aforementioned problems.

It is another object of the invention to provide an electronic device, an electronically controlled mechanical clock, and a method of controlling such a device and clock, which allow a braking torque applied to an electric power generator to be increased without causing a significant reduction in electric power generated by the electric power generator. Unlike the technique in Japanese Examined Patent Publication No. 7-119812, the electric power generator is controlled using a chopping signal, so as to increase the applied braking torque without causing a significant reduction in electric power.

It is a further object of the invention to provide an electronic device, an electronically controlled mechanical clock, and a method of controlling such a device and clock, which allow a precise and large amount of braking torque to be applied during a braking operation using a chopping signal, thereby ensuring that the rotational speed is controlled in a quick and highly reliable manner.

The present invention is based on the discovery made by the inventors herein that when an electric power generator is controlled in a chopping manner by applying a chopping signal to a switch such that the switch connects the two terminals of the electric power generator in a closed-loop state in response to the chopping signal, the driving torque (i.e., braking torque, damping torque) increases with decreasing frequency and/or with increasing duty ratio of the chopping signal, while the charged voltage (i.e., generated voltage) corresponding to electric power generated by the electric power generator increases with increasing chopping signal frequency but does not greatly decrease with increasing duty ratio of the signal, and, on the contrary, at frequencies higher than 50 Hz, the charged voltage increases with increasing duty ratio in a range where the duty ratio is less than 0.8 as shown in FIGS. 32 to 35.

Thus, in one aspect, the present invention provides an electronic device comprising a mechanical energy source; an electric power generator, driven by the mechanical energy source, for generating electric power by induction and supplying electrical energy; and a rotation controller, driven by the electrical energy, for controlling the rotation period of the electric power generator. The rotation controller includes a switch capable of connecting two terminals of the electric power generator in a closed-loop state; a chopping signal generator for generating two or more types of chopping signals which are different in at least either duty ratio or frequency and which direct the rotation controller to apply a strong braking force to the electric power generator; and a chopping signal selector for selecting one of the chopping signals and applying it to the switch, thereby controlling the electrical power generator in a chopping manner according to the selected signal.

In such an electronic device, when the electric power generator is driven by the mechanical energy source such as a spring, the rotational speed of the rotor is controlled by applying a braking force to the electric power generator via the rotation controller.

The rotation of the electric power generator is controlled by applying a chopping signal to the switch which is capable of connecting two terminals of the electric power generator in a closed-loop state thereby turning the switch on and off. When the switch is closed in response to the chopping signal, the two ends of the coil of the electric power generator are electrically connected in the closed-loop state. As a result, the electric power generator is braked, and energy is stored in the coil of the generator. If the switch is opened, the loop is opened, and the electric power generator outputs electric power. In this state, the energy stored in the coil results in an increase in the output voltage. If a strong braking force is applied to the electric power generator using the chopping technique of the present invention, the reduction in the generated electric power due to the braking can be compensated for by the increase in the generated voltage which occurs when the switch is turned off (i.e., opened). Thus, the braking torque (braking force) can be increased without causing a significant reduction in the generated electric power. This makes it possible to realize an electronic device which can operate for a long period of time.

When a strong braking force is applied (in the strong braking mode), the chopping signal selector selects a chopping signal from the chopping signals which are different in at least either duty ratio or frequency and which are set for strong braking, and applies the selected chopping signal is applied to the switch. More specifically, when a large braking force is required (i.e., when a higher priority is to be given to braking) because the driving torque is large, a chopping signal, which provides a larger braking force, is applied to the switch. Conversely, when the driving torque becomes low and a large braking force is not necessary (i.e., when a higher priority is to be given to generation of electric power), a chopping signal is applied which does not provide a large braking force but which results in an increase in the charged voltage. This technique ensures that a proper braking force (braking torque) corresponding to the driving torque applied to the rotor of the electric power generator is applied to the electric power generator, thereby properly controlling the rotational speed of the electric power generator. Thus, the controllable operating range is increased, and the charged voltage can likewise be increased. This makes it possible to further increase the braking torque while more effectively suppressing the reduction in the generated electric power. Again, this makes it possible to realize an electric device which can operate for a longer period of time.

In the present invention, the closed-loop state, which is achieved when the switch is turned on, refers to a state that results in an increase in the braking force applied to the electric power generator. As long as this requirement is met, the closed-loop may include a resistor or the like disposed, for example, between the switch and the electric power generator. However, it is desirable to form the closed-loop state by directly connecting the two terminals of the electric power generator, because the voltages of the two terminals can be made equal more easily, thereby allowing the generator to be braked in a more efficient fashion. When the signal output from the chopping signal selector is applied to the switch, the signal may be applied either directly or indirectly via another circuit or device.

By applying braking forces with two or more different magnitudes, as described above, it is possible to generate a regulated voltage required for a system. This makes it possible to improve the stability of the system. Furthermore, it becomes possible to maximize the braking effect and the self-supporting capability of the system.

The two or more types of chopping signals may be equal in frequency but different in duty ratio. More specifically, the chopping signals may include a first chopping signal with a duty ratio in the range from 0.75 to 0.85 (13/16, for example), and a second chopping signal with a duty ratio in the range from 0.87 to 0.97 (15/16, for example). As shown in FIGS. 32 to 35, it is possible to change the charged voltage and the driving torque (braking torque) by changing the duty ratio of the chopping signal while maintaining the frequency at a fixed value. Therefore, when the braking force is more important than the generated electric power, the second chopping signal with a greater duty ratio is employed to obtain a greater braking torque. On the other hand, when the generation of electric power is more important, the first chopping signal with a duty ratio which is not very small (but smaller than the duty ratio of the second chopping signal) so as to achieve a large charged voltage. That is, the rotation of the electric power generator can be properly controlled by properly selecting the chopping signal depending on the state of the electric power generator. A specific example of a set of two or more types of chopping signals used for providing strong braking forces includes three different chopping signals with duty ratios of 15/16, 14/16, and 13/16, respectively. This allows the braking force and the generated electric power to be controlled in a finer fashion, thereby achieving further improvements in the stability of the system and the self-supporting capability.

It should be noted that in FIGS. 32 to 35, the term "driving torque" may also be considered as "braking torque," because the driving torque refers to a torque which is balanced with a braking torque applied so as to obtain a desired rotational speed. Similarly, the term "charged voltage" may also be considered as "generated voltage" because the voltage charged in a capacitor results from the voltage generated by the electric power generator.

Instead of fixing the frequency but varying the duty ratio among the chopping signals, the two or more types of chopping signals described above may be equal in duty ratio but different in frequency. More specifically, the two or more types of chopping signals may include a first chopping signal with a frequency in the range from 110 to 1100 Hz (512 Hz, for example), and a second chopping signal with a frequency in the range from 25 to 100 Hz (64 Hz, for example). As shown in FIGS. 32 to 35, it is possible to change the charged voltage and the driving torque (braking torque) by changing the frequency of the chopping signal while maintaining the duty ratio at a fixed value. Therefore, when the braking force is more important than the generated electric power, the second chopping signal with a lower frequency is employed to obtain a greater braking torque. On the other hand, when the generation of electric power is more important, the first chopping signal with a higher frequency is employed to obtain a greater charged voltage. That is, the rotation of the electric power generator can be properly controlled by properly selecting the chopping signal depending on the state of the electric power generator. As can be seen from FIGS. 32 to 35, when the frequency is varied, it becomes possible to change the charged voltage and the braking torque over greater ranges, as compared to the case where only the duty ratio is varied. Thus, the controllable operating range can be expanded.

In FIGS. 32 and 33, the driving torque and the charged voltage are plotted as a function of the duty ratio for five different frequencies, 25, 50, 100, 500, and 1000 Hz. In FIGS. 34 and 35, the driving torque and the charged voltage are plotted as a function of the duty ratio for six different frequencies, 32, 64, 128, 256, 512, and 1024 Hz. In each case, the results are obtained by measuring the charged voltage across the capacitor (the voltage generated by the electric power generator) and the driving torque while maintaining the duty ratio at a fixed value, as will be described later.

Another variation is that the two or more types of chopping signals described above may be different in both duty ratio and frequency. More specifically, the two or more types of chopping signals may include a first chopping signal having a duty ratio in the range from 0.75 to 0.85 and having a frequency in the range from 110 to 1100 Hz, and a second chopping signal having a duty ratio in the range from 0.87 to 0.97 and having a frequency in the range from 25 to 100 Hz. The specific frequencies of the chopping signals may be selected depending on the signal generation capability of a specific electronic device. For example, in the case of a clock including a quartz resonator, signals obtained by dividing the frequency of a signal generated by the quart resonator may be employed. This technique is very efficient, because it is not required to additionally generate chopping signals. In other types of electronic devices, if there are particular frequencies which can be easily generated, they can be employed. By controlling the rotation of the electric power generator in a chopping fashion using chopping signals which are different in both duty ratio and frequency, it becomes possible to control the braking force in a very effective fashion.

More specifically, if the braking force is more important, the second chopping signal having a low frequency (64 Hz, for example) and having a large duty ratio (15/16, for example) may be employed to apply a strong braking force. This allows the braking force to be further increased, thereby controlling the rotational speed in a more reliable fashion. As can be seen from FIGS. 32 to 35, the braking torque can be increased by decreasing the frequency of the chopping signal and increasing the duty ratio. Thus, by employing a chopping signal meeting these requirements, a great braking torque can be obtained.

On the other hand, if the generation of electric power is more important, the first chopping signal having a high frequency (512 Hz, for example) and having a large duty ratio (13/16, for example) may be employed to obtain a proper braking force corresponding to the driving torque and to also obtain a large charged voltage. As can be seen from FIGS. 32 to 35, the charged voltage can be increased by increasing the frequency while setting the duty ratio in the range from 0.75 to 0.85. The first chopping signal described above meets these requirements.

If chopping signals differing in both frequency and duty ratio are employed, it is possible to control the charged voltage and the braking torque over greater ranges, as compared to the case where only the frequency or the duty ratio is varied. Thus, the controllable operating range can be expanded, and the rotational speed can be controlled in a more efficient fashion.

As described above, when two or more types of chopping signals having the same frequency are used for strong braking, the chopping signal having the greater duty ratio is employed when the braking torque is more important, and the chopping signal having the smaller duty ratio is employed when the charged voltage is more important, thereby ensuring that the rotational speed is controlled in a very efficient fashion.

When two or more types chopping signals having the same duty ratio are used for strong braking, the chopping signal having the lower frequency is employed when the braking torque is more important, and the chopping signal having the higher frequency is employed when the charged voltage is more important, thereby ensuring that the rotational speed is controlled in a very efficient fashion.

Preferably, the rotation controller described above includes a priority determination circuit that determines the priority of applying a braking torque to the electric power generator versus the priority of generating electric power with the generator. In the case where the priority determination circuit determines that a higher priority should be given to the braking torque, the chopping signal selector selects from the two or more types of chopping signals an appropriate chopping signal and applies the selected chopping signal to the switch. Such a chopping signal will have a large duty ratio when frequency is fixed, a low frequency when duty ratio is fixed, or a both of these characteristics when neither is fixed. However, if the priority determination circuit determines that a higher priority should be given to the electric power, the chopping signal selector selects a chopping signal with either a small duty ratio (when frequency is fixed), a high frequency (when duty ratio is fixed), or a chopping signal having both of these characteristics (when neither is fixed), and applies the selected chopping signal to the switch.

For determining the priority of applying braking torque to the electric power generator versus the priority of generating electric power with the generator, the priority determination circuit may include a voltage detector that detects the voltage generated by the electric power generator, a rotation period detector that detects the rotation period of the electric power generator, or a braking amount detector that detects the amount of braking applied to the electric power generator. By switching the chopping signal in the strong braking mode in accordance with data representing one of these parameters using the priority determination circuit, it is possible to select an optimum chopping signal, depending on the required braking force, and thus the rotational speed can be controlled in an effective fashion.

The chopping signal selector may select and apply a chopping signal to the switch in the strong braking mode from the two or more chopping signals set for strong braking, in accordance with the voltage generated by the electric power generator. Alternatively, the rotation controller may include an up/down counter which receives, at its up count input, a rotation detection signal generated based on the rotation period of the electric power generator and which also receives, at its down count input, a reference signal. In this case, the chopping signal selector selects and applies an appropriate chopping signal set for strong braking, in accordance with the value of the up/down counter. Alternatively, the chopping signal selector may select and apply a chopping signal in the strong braking mode, in accordance with a braking amount represented by the ratio of a braking period to one period of a reference signal. By switching/applying the chopping signal in the strong braking mode in accordance with data representing one of these parameters, it is possible to select an optimum chopping signal depending on the required braking force, and thus the rotational speed can be controlled in an effective fashion.

It is desirable that the rotation controller be capable of applying not only the strong braking force but also a weak braking force to the electric power generator, such that, when the weak braking force is applied to the electric power generator, the rotation controller applies a chopping signal with a duty ratio smaller than the duty ratio of any of the chopping signals set for strong braking. In the weak braking mode, a chopping signal with a very small duty ratio (1/16, for example) may be employed so that a very small braking force is applied to the electric power generator. The frequency of the chopping signal for weak braking may or may not be equal to that of the strong braking.

When a strong braking force is not applied, a chopping signal with a small duty ratio in the range, for example, from 0.01 to 0.30 may be applied to the switch, thereby applying a weak braking force to the electric power generator, or the switch may be maintained in an open state so that no braking force is applied to the electric power generator. By applying such a chopping signal to the switch in the weak braking mode, it becomes possible to decrease the driving torque while maintaining the charged voltage to a certain level. That is, it is possible to increase the charged voltage to a certain degree even in the weak braking mode.

It is even more desirable, in the weak braking mode, that a chopping signal with a duty ratio in the range from 0.01 to 0.15 be applied to the switch thereby controlling the electric power generator in a chopping fashion. Still more desirably, a chopping signal with a duty ratio in the range from 0.05 to 0.10 is applied. By applying a chopping signal with a duty ratio in the range from 0.01 to 0.15 to the switch in the weak braking mode, it is possible to reduce the driving torque while maintaining the charged voltage to a certain level. This allows the control in the weak braking mode to be performed in an effective fashion. If a chopping signal with a duty ratio in the range from 0.05 to 0.10 is employed, it becomes possible to reduce the braking torque while achieving a greater charged voltage. That is, the control in the weak braking mode can be performed in a more effective fashion.

The frequency of the chopping signal having a duty ratio in the range from 0.01 to 0.30 may be set to a value within the same range as that employed in the strong braking mode. As can be seen from FIGS. 32 to 35, when the duty ratio is small, the braking force and the generated electric power do not greatly depend on the frequency, and thus the frequency may be equal to that employed in the strong braking mode.

It is desirable that the chopping signal frequency at which the switch is turned on and off by the rotation controller be 3 or more times greater than the frequency of a voltage waveform which is generated when the rotor of the electric power generator rotates at a set speed. More desirably, the chopping signal frequency is 3 to 150 times greater than the frequency of the generated voltage waveform, and most desirably the chopping signal frequency is 5 to 130 times greater than the frequency of the generated voltage waveform.

Usually, if the chopping frequency is lower than 3 times the frequency of the generated voltage waveform, the voltage cannot be effectively increased. On the other hand, if the chopping frequency is greater than 150 times the frequency of the generated voltage waveform, integrated circuit electric power consumption increases in the chopping operation. That is, much electric power is consumed when electric power is generated. Thus, it is desirable that the chopping frequency be lower than 150 times the frequency of the generated voltage waveform. When the chopping frequency is within the range 3 to 150 times the frequency of the generated voltage waveform, the rate of change of the torque with respect to the change in the duty cycle becomes constant. This makes it easy to control the torque. However, depending on a specific application or control scheme, the chopping frequency may be set to a value lower than 3 times or greater 150 times the frequency of the generated voltage waveform.

Specifically, the chopping signal frequency may be set to a value in the range from 25 Hz to 1100 Hz. More desirably, the chopping signal frequency may be set to a value in the range from 64 Hz to 512 Hz. The switch which is turned on and off by the chopping signal may be formed of a field effect transistor. In this case, the gate capacitance of the transistor results in an increase in power consumption when the switching frequency becomes high. To minimize the power consumption, it is desirable that the chopping signal frequency be equal to or lower than 512 Hz. However, the maximum allowable power consumption depends on specific electronic devices, and the chopping signal frequency may be set to a value equal to or lower than about 1100 Hz to achieve high performance in terms of the braking performance or the electric power generation performance. On the other hand, if the chopping signal frequency is low, the charged voltage decreases. From this point of view, it is desirable to set the chopping signal frequency to 25 Hz or higher, and more desirably to 64 Hz or higher.

According to another aspect of the present invention, there is provided an electronic device comprising a mechanical energy source; an electric power generator, driven by the mechanical energy source, for generating electric power by induction and supplying electrical energy; a rotation controller, driven by the electrical energy, for controlling the rotation period of the electric power generator. The rotation controller comprises a switch capable of connecting two terminals of the electric power generator into a closed-loop state; a chopping signal generator that generates two or more types of chopping signals which are different in at least either duty ratio or frequency which direct the rotation controller to apply a strong or a weak braking force to the electric power generator; and a chopping signal selector that selects and outputs a chopping signal, such that at least either the timing of the start of a strong braking period, during which the chopping signal for strong braking is applied to the switch, or the timing of the start of a weak braking period, during which the chopping signal for weak braking is applied to the switch, is synchronous with a rotation detection signal associated with a rotor of the electric power generator, thereby controlling the electric power generator in a chopping manner according to the selected signal.

In this electronic device, according to the present invention, synchronizing the timing of starting a strong braking period with the rotor rotation detection signal, ensures that a strong braking force is applied immediately after the start of the strong braking period in response to the rotation detection signal. Thus, the control of the rotational speed can be performed in a quick and highly reliable fashion. On the other hand, if the timing of starting a weak braking period is synchronized with the rotor rotation detection signal, the timing of transition from the strong braking mode to the weak braking mode is set such that the transition occurs after the end of one period of a chopping signal for strong braking. This allows an improvement in the accuracy of the braking amount.

In the present invention, only the timing of the start of the strong braking period may be synchronized with the rotor rotation detection signal, or only the timing of the start of the weak braking period may be synchronized with the rotor rotation detection signal. Alternatively, the start timing may be synchronized with the rotor rotation detection signal for both the strong and weak braking periods.

In this case, the chopping signal selector preferably outputs the selected chopping signal such that either the weak braking start timing, at which time the chopping signal applied to the switch is switched from a strong braking chopping signal to a weak braking chopping signal, or the strong braking start timing, at which time the chopping signal applied to the switch is switched from a weak braking to a strong braking chopping, is synchronized with the chopping signal for strong braking or the chopping signal for weak braking. In the present invention, the control in the chopping manner refers to a controlling manner in which the electric path between the two terminals of the electric power generator is closed and opened using a control signal (chopping signal) having a frequency high enough compared with the rotational speed of the rotor of the electric power generator.

In this technique, because strong-to-weak braking transition or weak-to-strong braking transition occurs after the end of one period of a chopping signal for strong or weak braking, it is ensured that the chopping signal for strong or weak braking is applied over the specified entire period. Therefore, it is possible to control the braking amount at precise intervals equal to integral multiples of the unit period. Thus, the control accuracy can be further improved.

It is desirable that the chopping signal selector be capable of continuously outputting the chopping signal for strong braking over a period of time equal to or longer than one period of a reference signal.

This makes it possible to continuously apply a strong braking torque when the rotational speed of the electric power generator is very high. Thus, this technique allows quick response and high efficiency in the control of the rotation compared with the technique disclosed in Japanese Examined Patent Publication No. 7-119812, in which a braking-off operation is performed in each period.

The electronic device according to the present invention may further include a power supply, and first and second power supply lines for transmitting electrical energy generated by the electric power generator to the power supply for storage. The switch includes a first switch disposed between a first terminal of the electric power generator and the first power supply line, and a second switch disposed between a second terminal of the electric power generator and the second power supply line. The rotation controller controls the rotation period of the electric generator, such that one of the first and second switches is maintained in a closed state while the selected chopping signal is applied to the other switch, thereby turning it on and off.

In such an electronic device, not only the braking operation but also the operation of charging the generated electric power and the control of the rotation of the electric power generator are performed at the same time. Therefore, the circuit can be constructed using fewer components. Furthermore, the power generation efficiency can be improved by properly controlling the timing of closing and opening the respective switches.

It is desirable that the switches be formed of transistors. More particularly, the first switch preferably includes a first field effect transistor whose gate is connected to the second terminal of the electric power generator and a second field effect transistor which is connected in parallel to the first field effect transistor and which is turned on and off by the rotation controller. The second switch preferably includes a third field effect transistor whose gate is connected to the first terminal of the electric power generator and a fourth field effect transistor which is connected in parallel to the third field effect transistor and which is turned on and off by the rotation controller. With this arrangement, when the voltage of the first terminal of the electric power generator is positive with respect to the voltage of the second terminal, the first field effect transistor, whose gate is connected to the second terminal, is turned on (in the case where the first FET is of the p-channel type; the transistor is turned off if it is of the n-channel type), and the third field effect transistor, whose gate is connected to the first terminal is turned off (in the case where the third FET is of the p-channel type; the transistor is turned on if it is of the n-channel type). As a result, AC current generated by the electric power generator flows through a path including the first terminal, the first field effect transistor, one of the first or second power supply lines, the power supply, the other power supply line, and the second terminal.

On the other hand, when the voltage of the second terminal of the electric power generator is positive with respect to the voltage of the first terminal, the third field effect transistor, whose gate is connected to the first terminal, is turned on, and the first field effect transistor, whose gate is connected to the second terminal, is turned off. As a result, the AC current generated by the electric power generator flows through a path including the second terminal, the third field effect transistor, one of the first or second power supply lines, the power supply, the other power supply line, and the first terminal.

In the above operation, the second and fourth field effect transistors are alternately turned on and off in response to the chopping signal applied to the gates thereof. When the first and third field effect transistors are in the on-state, the current is passed regardless of whether the second and fourth field effect transistors are on or off, because the second and fourth field effect transistors are connected in parallel to the first and third field effect transistors, respectively. On the other hand, in the case where the first and third field effect transistors are in the off-state, the current is passed when the second and fourth field effect transistors are turned on by the chopping signal. Therefore, when one of the second and fourth field effect transistors is turned on by the chopping signal, both the first and second switches are turned on, and the two terminals of the electric power generator are connected to each other in the closed-loop state.

As a result, the electric power generator is braked in a chopping manner, such that the reduction in the electric power caused by braking is compensated for by the increase in the generated voltage obtained when the switches are turned off. Thus, the braking torque can be increased while maintaining the generated electric power at a certain level. This makes it possible to realize an electric device which can operate for a long period of time. Furthermore, because the rectification of the electric power generator is performed by the first and third field effect transistors whose gates are connected to the respective terminals, no comparator is required. This allows rectification to be performed using a simple circuit configuration. Furthermore, a reduction in the charging efficiency due to power consumption by the comparator is eliminated. Furthermore, because the field effect transistors are turned on and off using the terminal voltage of the electric power generator, the field effect transistors are turned on and off in synchronization with the polarity of the terminal voltage of the electric power generator. This results in an improvement in the rectification efficiency.

A preferable example of the electronic device according to the present invention is an electronically controlled mechanical clock including a time indication device which is rotated by the mechanical energy in connection with the electric power generator and which is controlled in terms of rotational speed by the rotation controller.

More specifically, the electronically controlled mechanical clock may include a mechanical energy source; an electric power generator, driven by the mechanical energy source connected to the electric power generator via an energy transmission device such as a wheel train, for generating electric power by means of induction and supplying resulting electrical energy; a time indication device connected to the energy transmission device; and a rotation controller, driven by the electrical energy, for controlling the rotation period of the electric power generator. The rotation controller may function in accordance with any of the previously described rotation controllers. In this electronically controlled mechanical clock, the braking torque applied to the electric power generator can be increased without causing a significant reduction in generated electric power. Therefore, it is possible to provide a high-precision clock which can operate for a long period of time.

Thus, in the electronically controlled mechanical clock in which the control of the rotation speed is important to accurately drive the hands, the present invention allows high accuracy of the rotation speed.

The application of the electronic device according to the present invention is not limited to the electronically controlled mechanical clock, but may be applied to a wide variety of electronic devices. In particular, the long operation period is advantageous in portable electronic devices such as analog quartz watches, digital watches, portable sphygmomanometers, portable telephones, personal handy phones, pagers, pedometers, calculators, portable personal computers, electronic notepads, PDAs (personal digital assistants), portable radio sets, various toys, music boxes, and electric shavers.

The present invention also provides a method of controlling an electronic device comprising a mechanical energy source, an electric power generator, driven by the mechanical energy source, for generating electric power by induction and supplying resulting electrical energy, and a rotation controller, driven by the electrical energy, for controlling the rotation period of the electric power generator. The method comprises applying a chopping signal, selected from at least two types of chopping signals which are different in at least either duty ratio or frequency and which direct the rotation controller to apply a strong braking force to the electric power generator, to a switch capable of connecting two terminals of the electric power generator in a closed-loop state, thereby controlling the electric power generator in a chopping manner according to the selected chopping signal.

In this control method, a braking force (damping torque) corresponding to the driving torque of the mechanical energy source can be obtained by applying a chopping signal selected from the two or more types of chopping signals which differ in at least either duty ratio or frequency and which are set for strong braking. This makes it possible to properly control the rotational speed of the electric power generator. Thus, the controllable operating range becomes wide, and the charged voltage can be increased. Therefore, it becomes possible to further increase the braking torque (damping torque) while more effectively suppressing the reduction in the generated electric power. Thus, an electric device that can operate for a longer period of time can be realized.

In another aspect of the invention, a method of controlling an electronic device is provided. The device comprises a mechanical energy source, an electric power generator, including a rotor, driven by the mechanical energy source, for generating electric power by induction and supplying electrical energy, and a rotation controller, driven by the electrical energy, for controlling the rotation period of the electric power generator. The rotation controller includes a switch capable of connecting two terminals of the electric power generator in a closed-loop state. The method comprises applying a chopping signal, selected from at least two types of chopping signals which are different in at least either duty ratio or frequency and which direct the rotation controller to apply either a strong or a weak braking force to the electric power generator, to the switch, wherein when a rotation detection signal associated with the rotor of the electric power generator is input, a chopping signal for strong braking is applied to the switch.

Also in this method according to the present invention, because the timing of starting a strong braking period is synchronized with the rotor rotation detection signal, it is ensured that a strong braking force is applied immediately after the start of the strong braking period in response to the rotation detection signal. Thus, the rotational speed can be controlled in a quick and highly reliable fashion.

The frequencies of the chopping signals set for strong and weak braking may be properly selected depending on the characteristics of the electric power generator to be controlled. Preferably, the frequency of the chopping signal for weak braking is in the range from 500 to 1000 Hz, and the frequency for strong braking is in the range from 10 to 100 Hz.

The chopping signals may be different in both frequency and duty ratio. In particular, to achieve a high-efficiency braking operation, it is desirable that the chopping signal for strong braking have a low frequency and a large duty ratio and the chopping signal for weak braking have a high frequency and a small duty ratio.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, wherein like reference symbols refer to like parts.

DESCRIPTION OF THE PREFERRED EMBODIMENTS

Embodiments of the present invention are described below with reference to the accompanying drawings.

Figure 1:
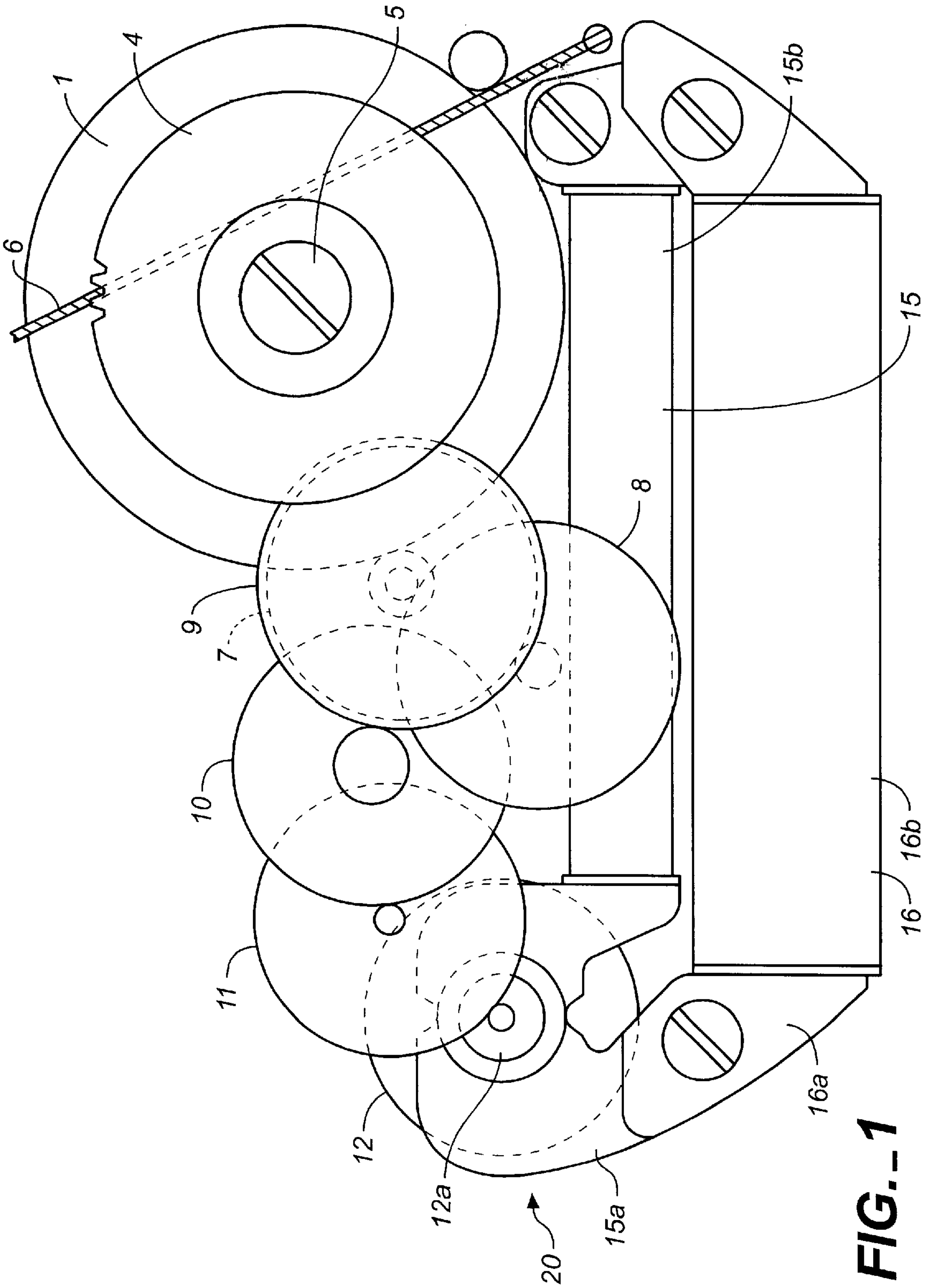
FIG. 1 is a plan view illustrating main parts of a first embodiment of an electronically controlled mechanical clock according to the present invention.
Figure 2:
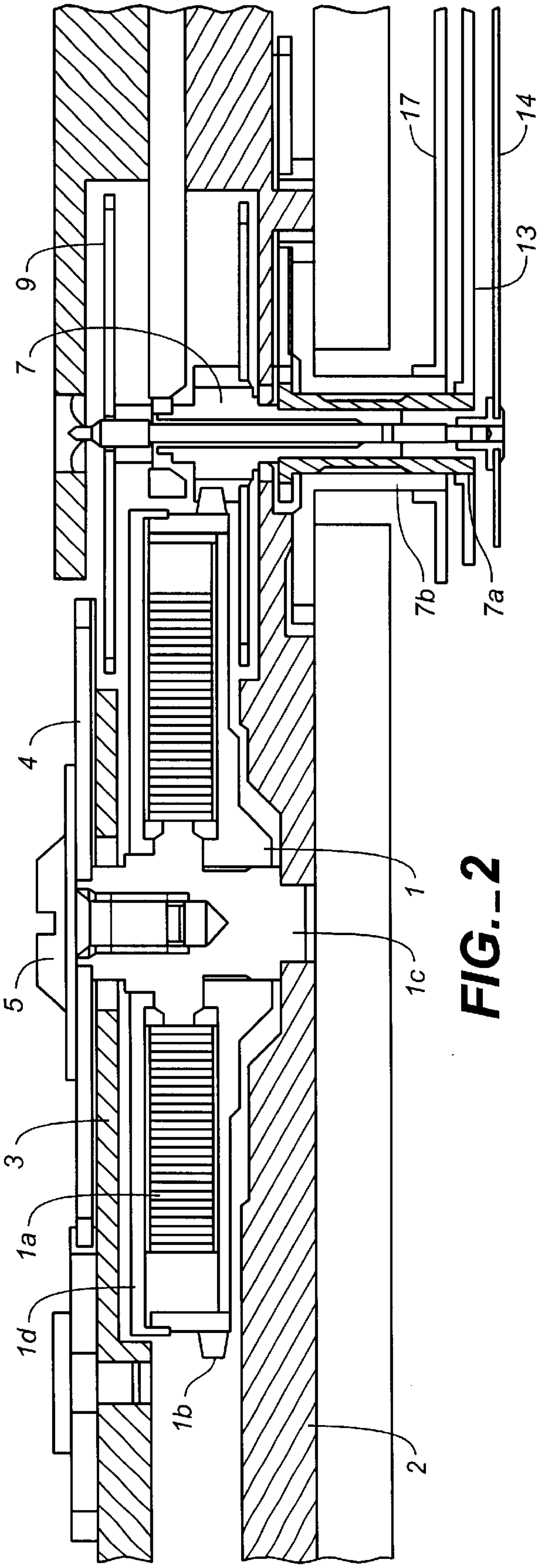
FIG. 2 is a cross-sectional view illustrating main parts of the clock shown in FIG. 1.
Figure 3:
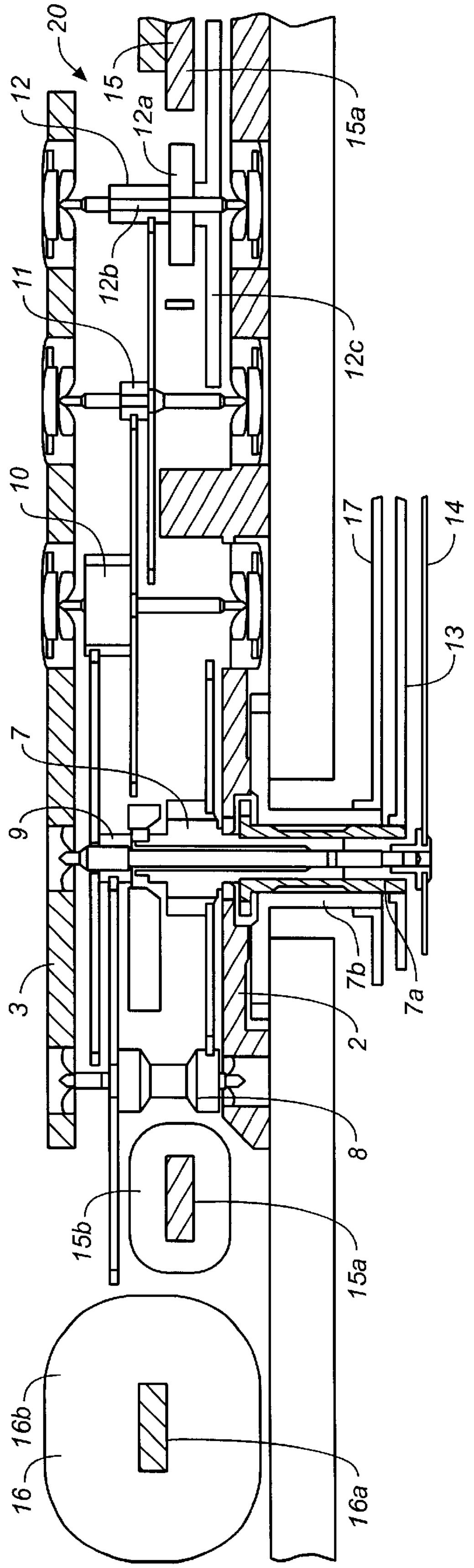
FIG. 3 is a cross-sectional view illustrating main parts of the clock shown in FIG. 1.

FIG. 1 is a plan view illustrating main parts of an electronically controlled mechanical clock which is a first embodiment of an electronic device according to the present invention, and FIGS. 2 and 3 are cross-sectional views thereof.

The electronically controlled mechanical clock includes a barrel wheel 1 including a spring 1*a,* a barrel gear 1*b,* a barrel arbor 1*c* and a barrel cover 1*d.* The outer end of the spring 1*a* serving as a mechanical energy source is fixed to the barrel gear 1*b,* and the inner end thereof is fixed to the barrel arbor 1*c*. The barrel arbor 1*c* is supported by a bottom plate 2 and a top plate 3 and is fixed with a rectangular screw 5 such that the barrel arbor 1*c* rotates together with a ratchet wheel 4.

The ratchet wheel 4 engages with a recoil click 6 such that the ratchet wheel 4 can rotate in a clockwise direction but cannot rotate in a counterclockwise direction. The spring 1*a* may be wound up by rotating the ratchet wheel 4 in the clockwise direction in a similar manner as employed in an automatic winding mechanical clock or a manually winding mechanical clock. Accordingly, the manner of winding the spring 1*a* is not described in further detail herein.

The rotational speed of the barrel gear 1*b* is stepped up by a factor of 7 when the rotation is transmitted to a second wheel 7, further stepped up by a factor of 6.4 to a third wheel 8, by a factor of 9.375 to a fourth wheel 9, by a factor of 3 to a fifth wheel 10, by a factor of 10 to a sixth wheel 11, and finally by a factor of 10 to a rotor 12. Thus, the rotational speed is stepped up by a factor of 126,000 in total. The step-up wheel train consisting of wheels 7 to 11 forms a mechanical energy transmission device for transmitting mechanical energy from the spring 1a serving as the mechanical energy source to the electric power generator 20.

A cannon pinion 7a is fixed to the second wheel 7, and a minute hand 13 is fixed to the cannon pinion 7a. A second hand 14 is fixed to the fourth wheel 9, and an hour hand 17 is fixed to an hour wheel 7b. Therefore, if the rotor 12 is controlled to rotate at 8 rps, then the second wheel 7 rotates at 1 rph and the fourth wheel 9 rotates at 1 rpm. In this situation, the barrel gear 1b rotates at 1/7 rph. The hands 13, 14, and 17 described above form a time indication device.

The electronically controlled mechanical clock includes an electric power generator 20 constructed of a rotor 12, a stator 15, and a coil block 16. The rotor 12 includes a rotor magnet 12a, a rotor pinion 12b, and a rotor inertia disk 12c. The rotor inertia disk 12c serves to minimize the variation in the rotational speed of the rotor 12 caused by a variation in the driving torque given by the barrel wheel 1. The stator 15 includes a stator body 15a and a stator coil 15b with 40,000 turns wound around the stator body 15a.

The coil block 16 includes a core 16a and a coil 16b with 110,000 turns wound around the core 16a. The stator body 15a and the core 16a may be formed of PC permalloy or a similar material. The stator coil 15b and the coil 16b are connected in series so that voltages generated by the respective coils are added together.

Figure 4:
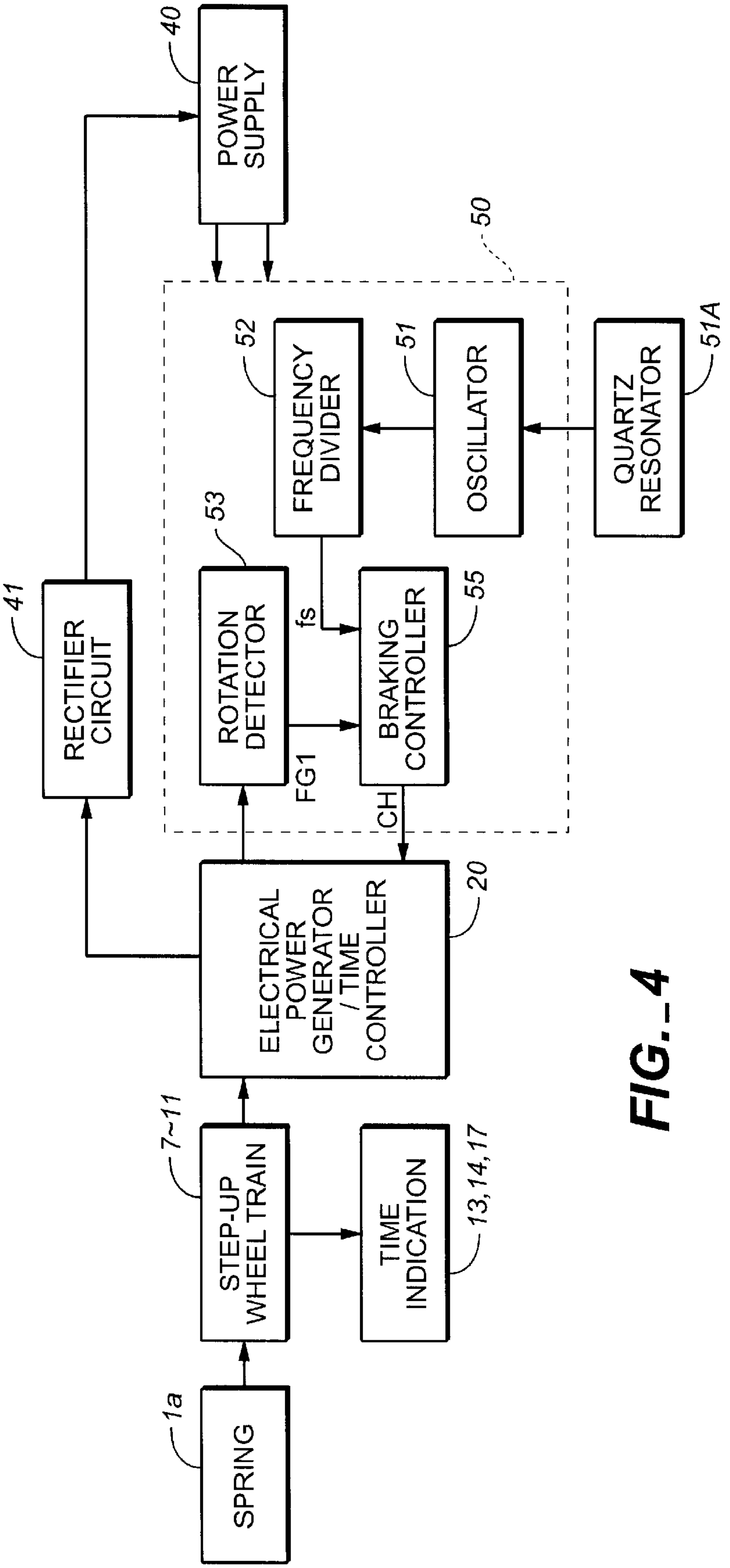
FIG. 4 is a block diagram illustrating a general construction of the first embodiment.

FIG. 4 is a block diagram illustrating the construction of the first embodiment of the electronically controlled mechanical clock.

The electronically controlled mechanical clock includes the spring 1a serving as the mechanical energy source, a step-up wheel train (wheels 7–11) serving as an energy transmission device for transmitting a torque of the spring 1a to the electric power generator 20, and hands (minute hand 13, second hand 14, hour hand 17) serving as time indication devices which are connected to the step-up wheel train (wheels 7–11) so as to indicate time.

The electric power generator 20 serves to supply electrical energy generated by means of induction which occurs when being driven by the spring 1a via the step-up wheel train. An AC voltage output from the electric power generator 20 is stepped up and rectified by a rectifying circuit 41 such as a step-up rectifier, a full-wave rectifier, a half-wave rectifier, or a transistor rectifier. The resultant stepped-up and rectified voltage is supplied to a power supply 40 including a capacitor, and thus the power supply 40 is charged by the voltage.

Figure 5:
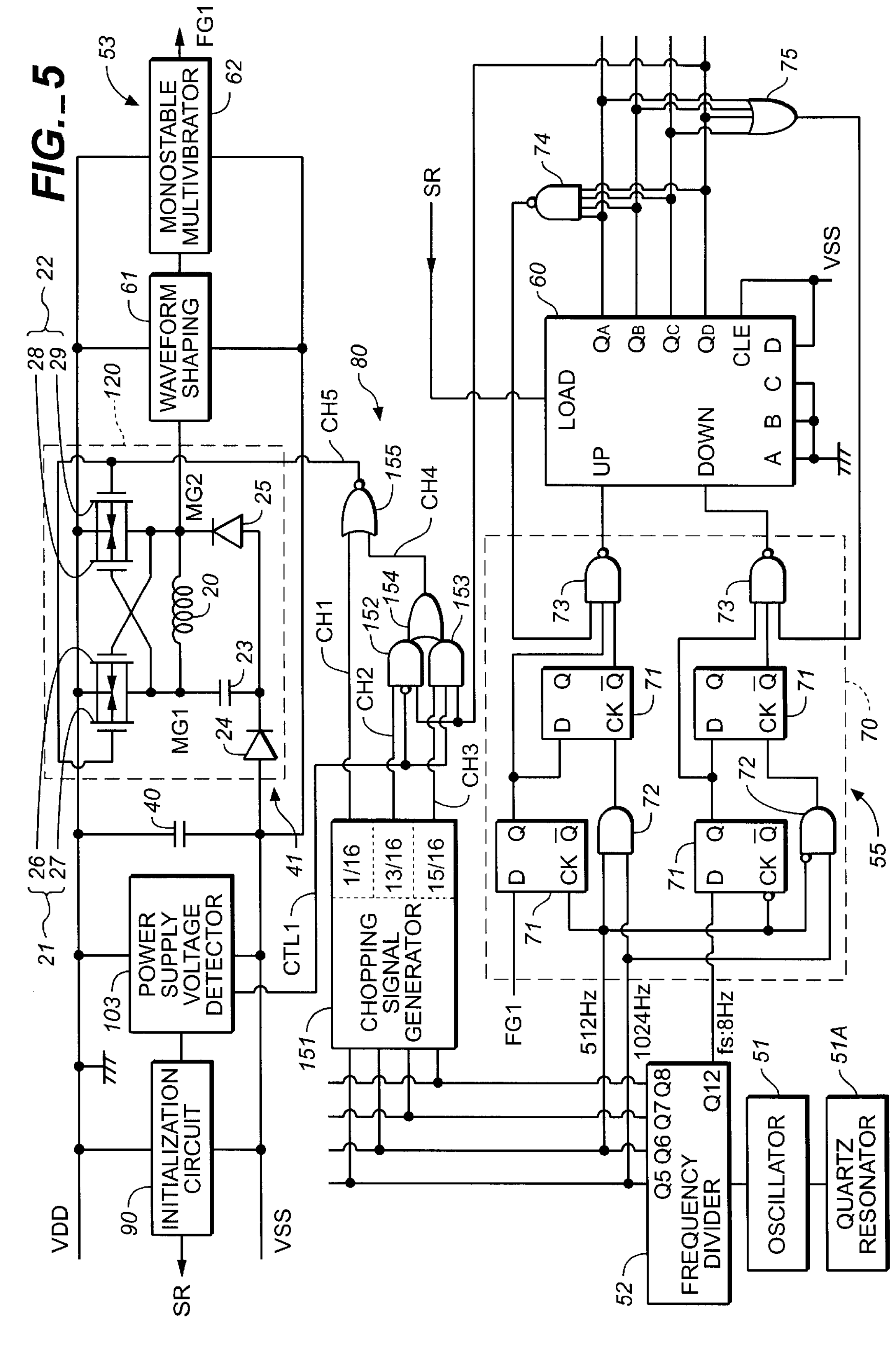
FIG. 5 is a circuit diagram illustrating the circuit configuration of an electronically controlled mechanical clock according to the first embodiment.

In the present embodiment, as shown in FIG. 5, a braking circuit 120 including the rectifying circuit 41 is disposed on the electric power generator 20. The braking circuit 120 includes a first switch 21 connected to a first AC input terminal MG1 via which an AC signal (AC current) generated by the electric power generator 20 is input, and a second switch 22 connected to a second AC input terminal MG2 via which the AC signal is also input. When both switches 21 and 22 are closed at the same time, the first AC input terminal MG1 and the second AC input terminal MG2 are electrically connected to each other and thus a closed-loop is formed thereby braking the electric power generator 20.

The first switch 21 is constructed of a first field effect transistor (FET) 26 of the p-channel type whose gate is connected to the second AC input terminal MG2 and a second field effect transistor 27 connected in parallel to the first field effect transistor 26, wherein a chopping signal (chopping pulse) CH5 output by a chopping signal selector which will be described later is input to the gate of the second field effect transistor 27.

The second switch 22 is constructed of a third field effect transistor (FET) 28 of the p-channel type whose gate is connected to the first AC input terminal MG1 and a fourth field effect transistor 29 connected in parallel to the third field effect transistor 28, wherein the chopping signal (chopping pulse) CH5 output by the chopping signal selector is input to the gate of the fourth field effect transistor 29.

The first field effect transistor 26 turns on when the voltage of the AC input terminal MG2 is negative, while the third field effect transistor 28 turns on when the voltage of the AC input terminal MG1 is negative. That is, of the two transistors 26 and 28, one transistor connected to either terminal MG1 or MG2 is turned on with a positive voltage of the electric power generator while the other transistor is turned off. Thus, the field effect transistors 26 and 28 form a rectifying switch which is a part of the rectifying circuit.

The second field effect transistor 27 and the fourth field effect transistor 29, connected in parallel to the transistors 26 and 28, respectively, are turned on and off in response to the same chopping signal CH5. When the transistors 27 and 29 are turned on at the same time by the chopping signal CH5, the first and second AC input terminals MG1 and MG2 are electrically connected directly to each other regardless of the states of the transistors 26 and 28, and thus a closed-loop is formed thereby braking the electric power generator 20. That is, the above-described switches 21 and 22 for connecting the terminals MG1 and MG2 of the electric power generator 20 into a closed-loop state are constructed such that the terminals MG1 and MG2 of the electric power generator 20 are connected into the closed-loop state by the operations of the transistors 27 and 29.

A step-up capacitor 23 connected to the electric power generator 20, diodes 24 and 25, and the switches 21 and 22 form part of the rectifying circuit (voltage doubler rectifier) 41. Any unidirectional device which allows a current to be passed only in one direction may be employed as the diodes 24 and 25, and there is no particular limitation on the type thereof. In the electronically controlled mechanical clock, the voltage generated by the electric power generator 20 is small. From this point of view, it is desirable that a Shottky barrier diode having a small voltage drop Vf be employed as the diode 25. As for the diode 24, it is desirable to employ a silicon diode having a low reverse leakage current. A DC signal obtained by the rectifying circuit 41 is stored in the power supply (capacitor) 40.

The braking circuit 120 is controlled by a rotation controller 50 which is driven by electric power supplied by the power supply 40. The rotation controller 50 includes, as shown in FIG. 4, an oscillator 51, a frequency divider 52, a rotor rotation detector 53, and a braking controller 55.

The oscillator 51 generates an oscillating signal (32,768 Hz) using a quartz resonator 51A serving as a standard time source. The oscillating signal output from the oscillator 51 is divided down to a particular frequency by the frequency divider 52 formed of flip-flops. The output of the twelfth stage of the frequency divider 52 is output as a reference signal fs at 8 Hz.

The rotation detector 53 includes a waveform shaping circuit 61 connected to the electric power generator 20 and a monostable multivibrator 62. The waveform shaping circuit 61 includes an amplifier and a comparator and serves to convert a sine wave to a rectangular wave. The monostable multivibrator 62 serves as a bandpass filter which passes only pulses having repetition periods smaller than a particular value thereby outputting a rotation detection signal FG1 containing no noise.

The braking controller 55 includes an up/down counter 60, a synchronous circuit 70, a chopping signal generating circuit 151 serving as a chopping signal generator, and a chopping signal selector 80. The rotation detection signal FG1 output from the rotation detector 53 and the reference signal fs output from the frequency divider 52 are input to the up/down counter 60 via an up count input and a down count input, respectively.

The synchronous circuit 70 includes four flip-flops 71, an AND gate 72, and a NAND gate 73. The synchronous circuit 70 synchronizes the rotation detection signal FG1 with the reference signal fs (8 Hz) using the output Q5 (1024 Hz) of the fifth stage or the output Q6 (512 Hz) of the sixth stage of the frequency divider 52. The synchronous circuit 70 also makes an adjustment so that there is no overlap among signal pulses.

The up/down counter 60 is constructed of a 4-bit counter. A signal generated by the synchronous circuit 70 in response to the rotation detection signal FG1 is applied to the up count input of the up/down counter 60, and a signal generated by the synchronous circuit 70 in response to the reference signal fs is applied to the down count input, whereby the counting of both the reference signal fs and the rotation detection signal FG1 and the calculation of the difference therebetween are performed at the same time.

The up/down counter 60 has four data input terminals (preset terminals) A–D. When high-level signals are input to the terminals A–C, the up/down counter 60 is set to an initial counter value (preset value) equal to 7.

A LOAD input terminal of the up/down counter 60 is connected to an initialization circuit 90 which is connected to the power supply 40 and which outputs a system reset signal SR in accordance with the voltage of the power supply 40. More specifically, in the present embodiment, the initialization circuit 90 outputs a high-level signal when the charged voltage of the power supply 40 is less than a predetermined value, and outputs a low-level signal when the charged voltage becomes equal to or greater than the predetermined value.

The up/down counter 70 does not accept an up/down input signal until the LOAD input becomes low, that is, until a system reset signal SR is output, and thus the counter value thereof is maintained at 7 until then.

The up/down counter 60 has 4-bit outputs QA–QD. The 4th-bit output QD is at a low level when the counter value is equal to or less than 7, and it becomes high when the counter value is equal to or greater than 8. The output QD is connected to the chopping signal selector 80.

The outputs QA–QD are input to a NAND gate 74 and also to an OR gate 75. The outputs of the NAND gate 74 and the OR gate 75 are input to the respective NAND gates 73 to which outputs of the synchronous circuit 70 are also input. Thus, if the counter value becomes, for example, "15" after a plurality of up count signals have been input, a low-level signal is output from the NAND gate 74. As a result, even if another up count signal is input to the NAND gate 73 after that, the up count signal is blocked by the NAND gate 73 thereby ensuring that no further up count signal is input to the up/down counter 60. On the other hand, if the counter value becomes equal to "0", a low-level signal is output from the OR gate 75 thereby blocking down count signals. This ensures that the counter value does not exceed "15" to "0" and does not exceed "0" to "15".

The chopping signal generating circuit 151 serving as the chopping signal generator is formed of a logic circuit such that three different chopping signals CH1–CH3 with different duty ratios are generated using the outputs Q5–Q8 of the frequency divider 52.

The chopping signal selector 80 includes AND gates 152 and 153 to which chopping signals CH2 and CH3 generated by the chopping signal generating circuit 151 are applied respectively, an OR gate 154 to which the outputs of the respective AND gates are applied, and a NOR gate 155 to which the output CH4 of the OR gate 154 and the chopping signal CH1 described earlier are applied.

The chopping signal CH1 has a small duty ratio equal to 1/16. The chopping signal CH3 serves as a second chopping signal having a large duty ratio equal to 15/16. The chopping signal CH2 serves as a first chopping signal having a duty ratio equal to 13/16 which is rather great but is not as large as the duty ratio of the chopping signal CH3. These chopping signals CH1–CH3 have the same fixed frequency equal to, for example, 128 Hz.

The output CH5 of the NOR gate 155 of the chopping signal selector 80 is applied to the gates of the p-channel transistors 27 and 29. As a result, the transistors 27 and 29 are maintained in on-states for a duration in which the chopping output CH5 is at a low level, thereby forming a closed-loop which causes the electric power generator 20 to be braked.

On the other hand, the transistors 27 and 29 are maintained in off-states as long as the output CH5 is at a high level, and no braking force is applied to the electric power generator 20. In this way, the electric power generator 20 is controlled by the chopping signal supplied via the output CH5.

The above-described duty ratios of the chopping signals CH1–CH3 are equal to the ratios of times during which the electric power generator 20 is braked relative to one period. In the present embodiment, the duty ratios of the chopping signals CH1–CH3 are represented by the ratios of periods of time during which the chopping signals are at a high level to the one period.

The output QD of the up/down counter 60 is applied to both AND gates 152 and 153. Furthermore, a signal CTL1 from a power supply voltage detector 103 for detecting the voltage of the power supply 40 and thus the voltage generated by the electric power generator 20 is applied to the AND gates 152 and 153 in such a manner that the signal is directly applied to the AND gate 153 while the signal is applied to the AND gate 152 after being inverted.

Figure 6:
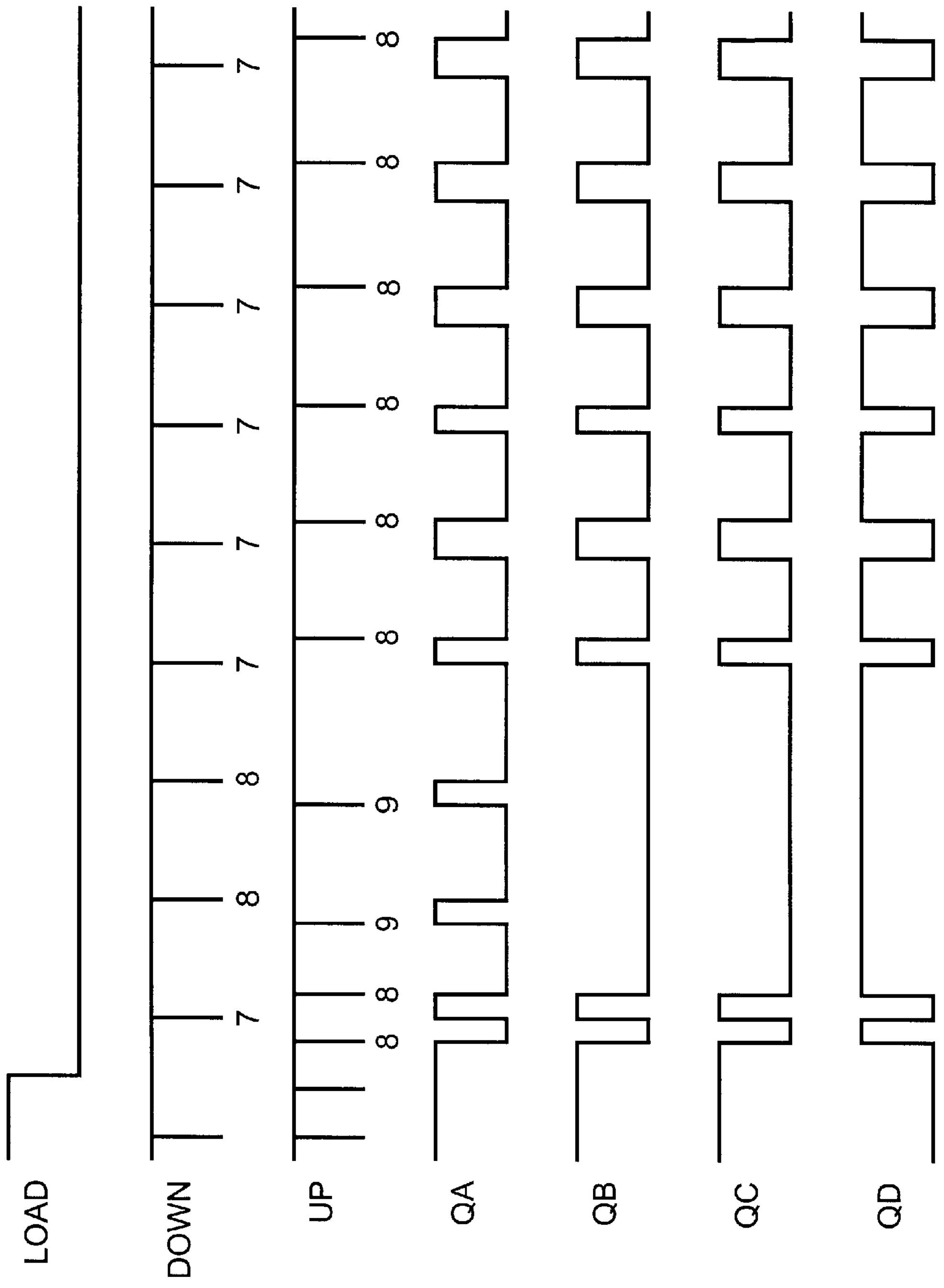
FIG. 6 is a timing chart associated with an up/down counter according to the first embodiment.

The operation of the present embodiment is described with reference to timing charts shown in FIGS. 6 and 7 and a flow chart shown in FIG. 8.

When a low-level system reset signal SR is applied from the initialization circuit 90 to the LOAD input of the up/down counter 60 after the electric power generator 20 starts to operate (step 11, hereinafter "step" is represented simply as "S"), an up count signal generated based on a rotation detection signal FG1 and a down count signal generated based on a reference signal fs are counted by the up/down counter (S12). The synchronous circuit 70 controls these signals so that they are not applied to the counter 60 at the same time.

Thus, when an up count signal is input, the counter value is incremented to "8" from an initial value of "7", and a high-level signal is output via the output QD to the AND gates 152 and 153 of the chopping signal selector 80.

If a down count signal is input and the counter value returns to "7", a low-level signal is output via the output QD.

Figure 7:
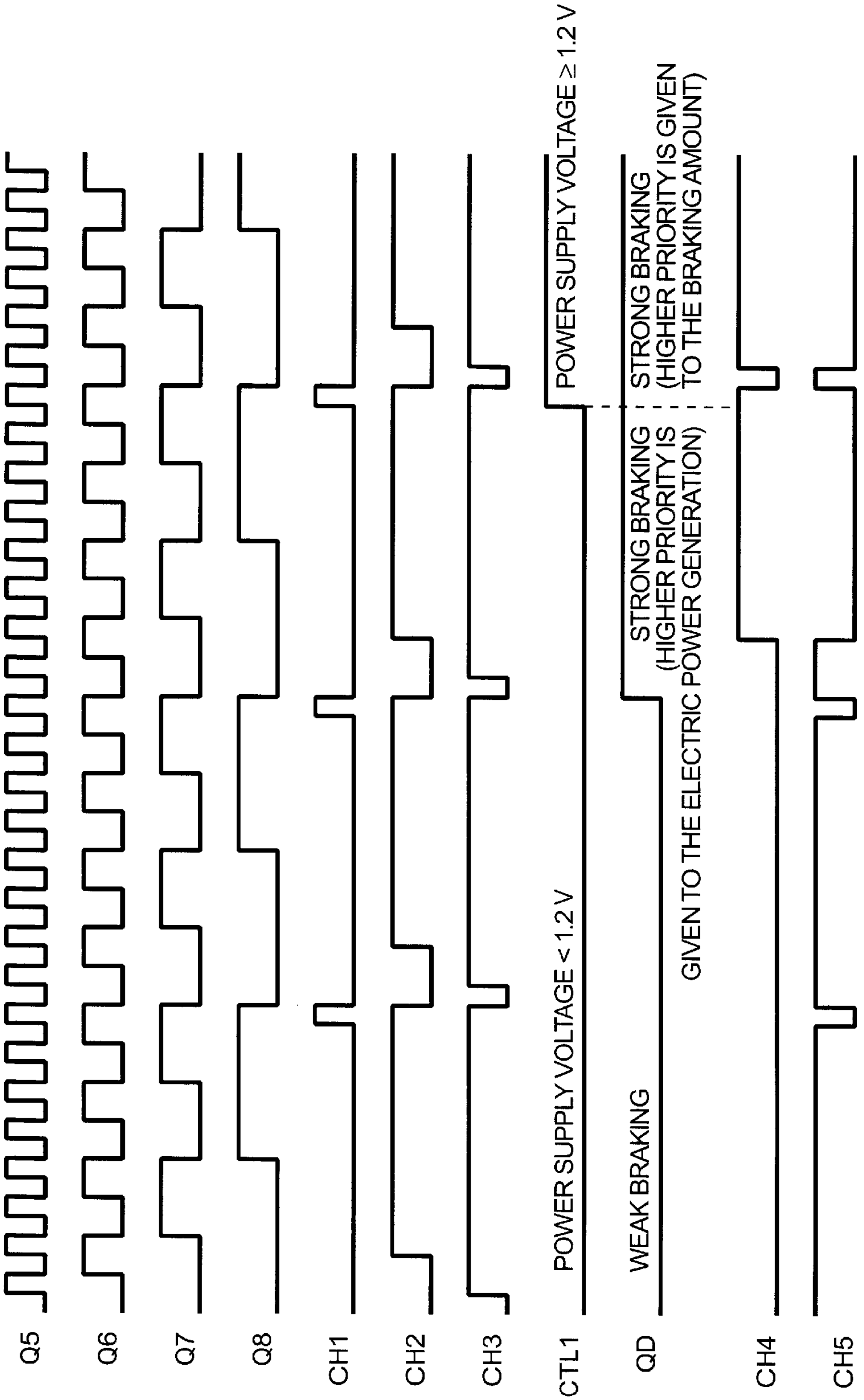
FIG. 7 is a timing chart associated with a chopping signal selector according to the first embodiment.
Figure 8:
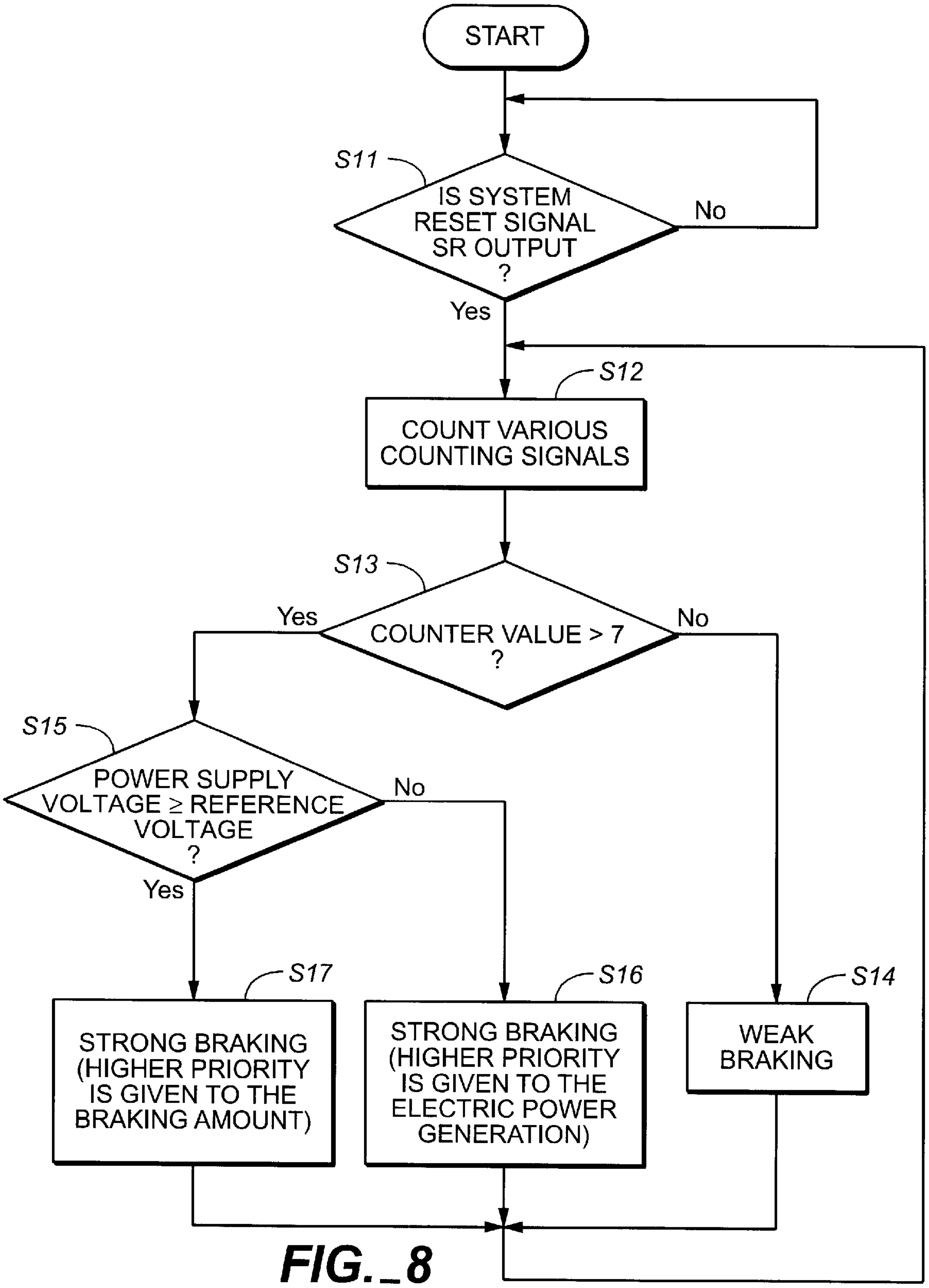
FIG. 8 is a flow chart illustrating a control method according to the first embodiment.

The chopping signal generating circuit 151 serving as the chopping signal generator outputs chopping signals CH1–CH3 using the outputs Q5–Q8 of the frequency divider 52, as shown in FIG. 7.

If the output QD of the up/down counter 60 is at a low level (when the counter value is equal to or less than "7"), the outputs of the AND gates 152 and 153 becomes low, and thus the output CH4 also becomes low. As a result, the output CH5 of the NOR gate 155 becomes a chopping signal having been obtained by inverting the output CH1, and thus it has a long high-level period (braking-off period) and a short low-level period (braking-on period). As a result, the chopping signal output as CH5 has a small duty ratio (the ratio of the on-period of the transistors 27 and 29 to the reference period). In this case, the total braking period is small relative to the reference period. As a result, the electric power generator 20 is braked very weakly so that generation of electric power is optimized (S13, S14). Herein, this operation mode is referred to as a weak braking mode.

On the other hand, when the output QD of the up/down counter 60 is at a high level (when the counter value is equal to or greater than "8"), the output CH4 is switched by the signal CTL1. More specifically, when the voltage of the power supply 40 detected by the power supply voltage detector 103 is smaller than a reference voltage (for example 1.2 V) (S15), the signal CTL1 becomes low. As a result, the signal output from the AND gate 153 becomes low, and the chopping signal CH2 is directly passed through the AND gate 152. Thus, the chopping signal CH2 is output as the output CH4.

In this case, the output of the NOR gate 155, that is, the output CH5 of the chopping signal selector 80 serves as a chopping signal having a high-level period (braking-off period) which is not very short and having a rather long low-level period (braking-on period). Thus, the output CH5 of the chopping signal selector 80 serves as a chopping signal (first chopping signal) with a rather large duty ratio (13/16). In this case, the total braking period becomes long relative to the reference period, and the electric power generator 20 is strongly braked. In this operation mode, the braking is turned off at fixed time intervals. In other words, the braking is performed in a chopping fashion which allows the braking torque to be increased while minimizing the reduction in electric power generated. Because there is a certain duration (3/16) in which the electric power generator 20 is not braked, it is ensured that electric power is maintained at a certain level although strong braking is applied. Thus, in this operation mode, strong braking is applied while giving a high priority to generation of electric power (S16).

When the voltage of the power supply 40 becomes equal to or greater than the reference voltage (S15), the signal CTL1 becomes high, and thus the chopping signal CH3 is output as the output CH4. As a result, a chopping signal obtained by inverting the chopping signal CH3 is output as the output CH5 of the chopping signal selector 80. In this case, thus, the output CH5 of the chopping signal selector 80 becomes a chopping signal (second chopping signal) having a large duty ratio (15/16) with a short high-level period (braking-off period) and a long low-level period (braking-on period). Also in this operation mode, the electric power generator 20 is controlled in a chopping fashion which allows the braking torque to be increased although a certain reduction occurs in electric power generated. In this operation mode, because the no-braking period is short (1/16), strong braking is applied while giving a higher priority to the braking force (braking torque) than to electric power generated (S17).

Electric charges generated by the electric power generator 20 are stored in the power supply 40 via the rectifying circuit 41 as described below. When the voltage of the first terminal MG1 is positive and that of the second terminal MG2 is negative, the first field effect transistor (FET) 26 is turned on and the third field effect transistor (FET) 28 is turned off. As a result, electric charges generated by the electric power generator 20 by means of induction are stored into the capacitor 23 with a capacitance of, for example, 0.1 $\mu$F via a path including the first terminal MG1→capacitor 23→diode 25→second terminal MG2, and also stored into the power supply (capacitor) 40 with a capacitance of, for example, 10 $\mu$F via a path including the first terminal MG1→first switch 21→power supply 40→diode 24→diode 25→second terminal MG2.

On the other hand, when the voltages of the first and second terminals MG1 and MG2 are switched such that the first terminal MG1 becomes negative and that of the second terminal MG2 becomes positive, the first field effect transistor (FET) 26 is turned off and the third field effect transistor (FET) 28 is turned on. As a result, the power supply (capacitor) 40 is charged up with the sum of the voltage generated by the electric power generator 20 and the voltage stored in the capacitor 23 via a path including the capacitor 23→first terminal MG1→electric power generator 20→second terminal MG2→second switch 22→power supply 40→diode 24→capacitor 23.

In each operation mode, when the electric power generator 20 is opened in response to the chopping signal CH5 after being closed, a high voltage is generated across the coil, and this high voltage makes a contribution to an increase in the charging efficiency of the power supply (capacitor) 40.

In the case where the spring la has a strong torque and thus the electric power generator 20 is rotated at a high speed, there is a possibility that another up count signal is input after the counter value has been incremented to "8" in response to an up count signal. In this case, the counter value is incremented to "9", and the output QD described above is maintained at the high level, and thus strong braking is applied while turning off the braking at fixed time intervals in response to the inverted signal of the chopping signal CH3. The strong braking results in a reduction in the rotational speed of the electric power generator 20. As a result, if the reference signal fs (down count signal) is input twice before the rotation detection signal FG1 is input, the counter value is decremented to "8" and then to "7". When the counter value becomes "7", the operation mode is switched into the weak braking mode. When the spring 1*a* has a very large torque, the counter value may increase to "9" and further to "10". In such a high-torque state, the voltage stored in the power supply 40 becomes large and thus the signal CTL1 is switched to a high level, and the output CH5 becomes a chopping signal which causes a large braking force. The large braking force results in a quick reduction in the rotational speed of the electric power generator 20.

As a result of such a control, the rotational speed of the electric power generator approaches the set value, until reaching a locked state in which the up count signal and the down count signal are alternately input and thus the up/down counter alternately has values "8" and "7". In this locked state, strong braking in two different modes (high priority is given to generation of electric power in one mode while high priority is given to braking in the other mode) and weak braking are applied in turn depending on the counter value and the voltage of the power supply. That is, a chopping signal with a large duty ratio (15/16 or 13/16) and a chopping signal with a small duty ratio are alternately applied to the transistors 27 and 29 during each cycle in which the rotor rotates one revolution thereby controlling the rotation of the electric power generator 20 in a chopping fashion.

When the torque of the spring 1*a* becomes small as the spring 1*a* is released, the braking period gradually decreases, and the electric power generator 20 obtains a rotational speed close to the standard speed without applying braking.

Eventually, a large number of down count signals are input in a state in which no braking is applied. Thus, when the counter value becomes equal to or smaller than "6", it is determined that the torque of the spring 1*a* has become very low, and the hands are stopped or their moving speeds are reduced to very low levels. Furthermore, an alarm is sounded or a lamp is lit to warn a user to rewind the spring 1*a*.

Thus, the control is performed in the strong braking mode using a chopping signal with a large duty ratio when the output QD of the up/down counter 60 is at the high level. In the strong braking mode, the magnitude of braking is switched between two levels depending on the voltage stored in the power supply 40 (voltage generated by the electric power generator 20), that is, depending on the driving torque of the spring 1*a*.

That is, the operation mode is switched by the gates 152–155 between the strong braking mode and the weak braking mode depending on the output QD of the up/down counter 60. Furthermore, in the strong braking mode, the operation mode is switched by the gates 152–155 between a mode in which a high priority is given to the brake and a mode in which a high priority is given to the power generation depending on the signal CTL1 of the power supply voltage detector 103, that is, depending on the voltage of the power supply 40. Thus, in the present embodiment, the power supply voltage detector 103 serves as priority determination circuit for determining the priority of the braking torque applied to the electric power generator versus the priority of generation of electric power by the electric power generator in the strong braking mode. Furthermore, the up/down counter 60 and gates 152–155 form chopping signal selector 80 for selecting a chopping signal used in the strong braking mode in accordance with the output of the power supply voltage detector 103 serving as the priority determination circuit. In the present embodiment, the chopping signal selector 80 selects not only chopping signals used in the strong braking mode but also chopping signals used in the strong and weak braking modes.

In the present embodiment, when the output QD is at the low level, the chopping signal CH5 has a small duty ratio equal to 1/16 or 0.0625 (the high-level period versus the low-level period=15:1). On the other hand, when the output QD is at the high level and when the voltage of the power supply 40 is smaller than 1.2 V, the chopping signal CH5 has a duty ratio equal to 13/16 or 0.8125 (the high-level period versus the low-level period=3:13). When the output QD is at the high level and when the voltage of the power supply 40 is equal to or greater than 1.2 V, the chopping signal CH5 has a duty ratio equal to 15/16 or 0.9375 (the high-level period versus the low-level period=1:15).

The electric power generator outputs electric power having an AC waveform corresponding to the change in the magnetic flux, via the terminals MG1 and MG2. Herein, the chopping signal CH5 having a fixed frequency and having a duty ratio which varies depending on the output signal QD is applied to the transistors 27 and 29 (switches 21 and 22). When the output QD rises up to a high level, that is, in the strong braking mode, the braking period in each chopping cycle become long. As a result, the braking force becomes greater and thus the rotational speed of the electric power generator is reduced. Although the braking force results in a reduction in the electric power generated by the electric power generator, energy stored during the braking period is output when the switches 21 and 22 are turned off by the chopping signal. Thus the output voltage is increased, and the reduction in the electric power generated by the electric power generator is compensated for. Thus, it is possible to increase the braking torque while minimizing the reduction in electric power generated.

When the output QD is at a low level, that is, in the weak braking mode, the braking period in each chopping cycle become short. As a result, the braking force becomes lower and thus the rotational speed of the electric power generator increases. Also in this case, the voltage is increased when the transistors 27 and 29 (switches 21 and 22) are turned off from on-states by the chopping signal. This makes it possible to increase the generated electric power even compared with electric power obtained when braking is not applied at all.

The AC output of the electric power generator 20 is stepped up and rectified by the voltage doubler rectifier 41 and then stored in the power supply (capacitor) 40. The rotation controller 50 is driven by the power supply 40.

Because the output QD of the up/down counter 60 and the chopping signal CH5 are both produced on the basis of the outputs Q5–Q8 and Q12 of the frequency divider 52 such that the frequency of the chopping signal CH5 becomes equal to an integral multiple of the frequency of the output QD, the transition of the output level of QD, that is, the timing of transition between strong and weak braking operations, is synchronous with the chopping signal CH5.

The present embodiment has various advantages as described below.

(1) The up count signal based on the rotation detection signal FG1 and the down count signal based on the reference signal fs are input to the up/down counter 60. If the count value associated with the rotation detection signal FG1 (up count signal) is greater than the count value associated with the reference signal fs (down count signal) (that is, if the counter value is equal to or greater than "8" in the case where the initial value of the counter 60 is set to "7"), strong braking is applied to the electric power generator 20 by the braking circuit 120. Conversely, when the count value associated with the rotation detection signal FG1 is equal to or smaller than the count value associated with the reference signal fs (equal to or smaller than "7"), weak braking is applied to the electric power generator 20. As a result, even if there is a large deviation of the rotational speed of the electric power generator 20 from the standard speed when the electric power generator 20 is started or in other situations, the rotational speed of the electric power generator 20 quickly approaches the standard speed. That is, a quick response can be achieved in the control of the rotational speed.

(2) The control mode is switched between the strong braking mode and the weak braking mode using chopping signals CH5 having different duty ratios so as to apply a large braking force (large braking torque) without causing a reduction in the charged voltage (voltage generated by the electric power generator). In particular, a chopping signal with a large duty ratio is used in the strong braking mode, so that a large braking torque can be applied while minimizing the reduction in the charging voltage thereby achieving high-efficiency braking control while maintaining the high stability of the system. This makes it possible to operate the electronically controlled mechanical clock for a longer period of time.

(3) In the strong braking mode, the braking torque is varied between two levels depending on the charged voltage of the power supply 40, that is, depending on the rotational speed of the electric power generator 20.

As can be seen from FIGS. 32 to 35, if a chopping signal having a frequency of 128 Hz and a duty ratio of 15/16 is employed, it is possible to increase the braking torque applied to the electric power generator 20 without causing a significant reduction in the charged voltage. That is, the electric power generator 20 can be controlled such that a higher priority is given to the braking force. On the other hand, if a chopping signal having a frequency of 128 Hz and a duty ratio of 13/16 is employed, then it is possible to increase the charged voltage while maintaining the braking force at a certain level. That is, the electric power generator is controlled such that a higher priority is given to generation of electric power.

(4) Because a chopping signal with a small duty ratio is used also in the weak braking mode, the charged voltage during the weak braking operation can be further improved. More specifically, as can be seen from FIGS. 32 to 35, if a chopping signal having a frequency of 128 Hz and a duty ratio of 1/16 is employed, the braking torque is maintained at a low level and a considerably improved charged voltage can be obtained.

(5) The switching between the strong braking mode and the weak braking mode is performed depending only on whether the counter value is equal to or smaller than "7" or equal to or greater than "8", without needing a setting of the braking time or the like. This allows the rotation controller 50 to be constructed in a simple form. Therefore, the component cost and production cost can be reduced, and thus it is possible to provide an electronically controlled mechanical clock at low cost.

(6) The timing of inputting the up count signal varies depending on the rotational speed of the electric power generator, and thus the period during which the counter has a value equal to "8", that is, the period during which a barking force is applied, is automatically controlled. In particular, in a locked state in which up count signals and down count signals are alternately input, the control is performed in a quick and stable fashion.

(7) The use of the up/down counter 60 employed as the braking controller allows up count signals and down count signals to be counted and also allows the difference between the counted values thereof to be calculated at the same time. That is, it is possible to easily determine the difference between the counted values using a simple circuit configuration.

(8) The use of the 4-bit up/down counter 60 allows counting to be performed in the range of sixteen counter values. Therefore, when a plurality of up count signals are input at short time intervals, the up/down counter 60 can cumulatively count the input signals. Thus, the cumulative error can be corrected as long as the counter value is within the range of 0 to 15 when a plurality of up count signals or down count signals are input at short time intervals. Therefore, even if the rotational speed of the electric power generator 20 greatly deviates from the standard speed, the cumulative error of the rotational speed of the electric power generator 20 can be corrected and the rotational speed can be returned to the standard speed, although it takes a rather long time until the system comes into the locked state. Thus, it is possible to move the hands at correct intervals from the long-term view point.

(9) The initialization circuit 90 is provided to prevent the electric power generator 20 from being braked until the power supply 40 is charged to a predetermined voltage after the start of the operation of the electric power generator 20. That is, in the initial state, the charging of the power supply 40 is performed in preference to the other items thereby ensuring that it quickly becomes possible for the power supply 40 to drive the rotation controller 50. This also results in higher stability in the following operation of controlling the rotation.

(10) The timing of transition of the signal level of the output QD, that is, the switching timing between the strong braking mode and the weak braking mode is synchronized with the timing of the on-to-off transition of the chopping signal CH5. As a result, the electric power generator 20 outputs high-voltage spikes at fixed time intervals in synchronization with the chopping signal CH5. These high-voltage voltage spikes may be used as rate indication pulses of the clock. If the output QD is not synchronized with the chopping signal CH5, the electric power generator 20 outputs high-voltage spikes not only when the chopping signal CH5 varies in level at fixed intervals but also when the output QD varies in level. In this case, the intervals of the "high-voltage spikes" output from the electric power generator 20 are not necessarily uniform, and the high-voltage spikes cannot be used as rate indication pulses. In contrast, the synchronization technique employed in the present embodiment allows the high-voltage pulses to be used as rate indication pulses.

(11) Rectification of the voltage generated by the electric power generator 20 is performed by the first and third field effect transistors 26 and 28 whose gates are connected to the terminals MG1 and MG2, respectively. This allows rectification to be performed using a simple circuit configuration without having to use an additional component such as a comparator. Thus, a reduction in the charging efficiency due to power consumption by the comparator is eliminated. Furthermore, because the field effect transistors 26 and 28 are turned on and off using the terminal voltage of the electric power generator 20, the field effect transistors 26 and 28 are turned on and off in synchronization with the polarity of the terminal voltage of the electric power generator. This results in an improvement in the rectification efficiency. Furthermore, the second and fourth field effect transistors 27 and 29 are connected in parallel to the transistors 26 and 28, respectively, so that the electric power generator 20 can be controlled in the chopping fashion independently using the field effect transistors 27 and 28 without having to use a complicated circuit configuration. That is, it is possible to provide a rectifying circuit 41 simply configured and capable of performing chopping rectification in synchronization with the polarity of the electric power generator 20 while stepping. up the voltage.

Figure 9:
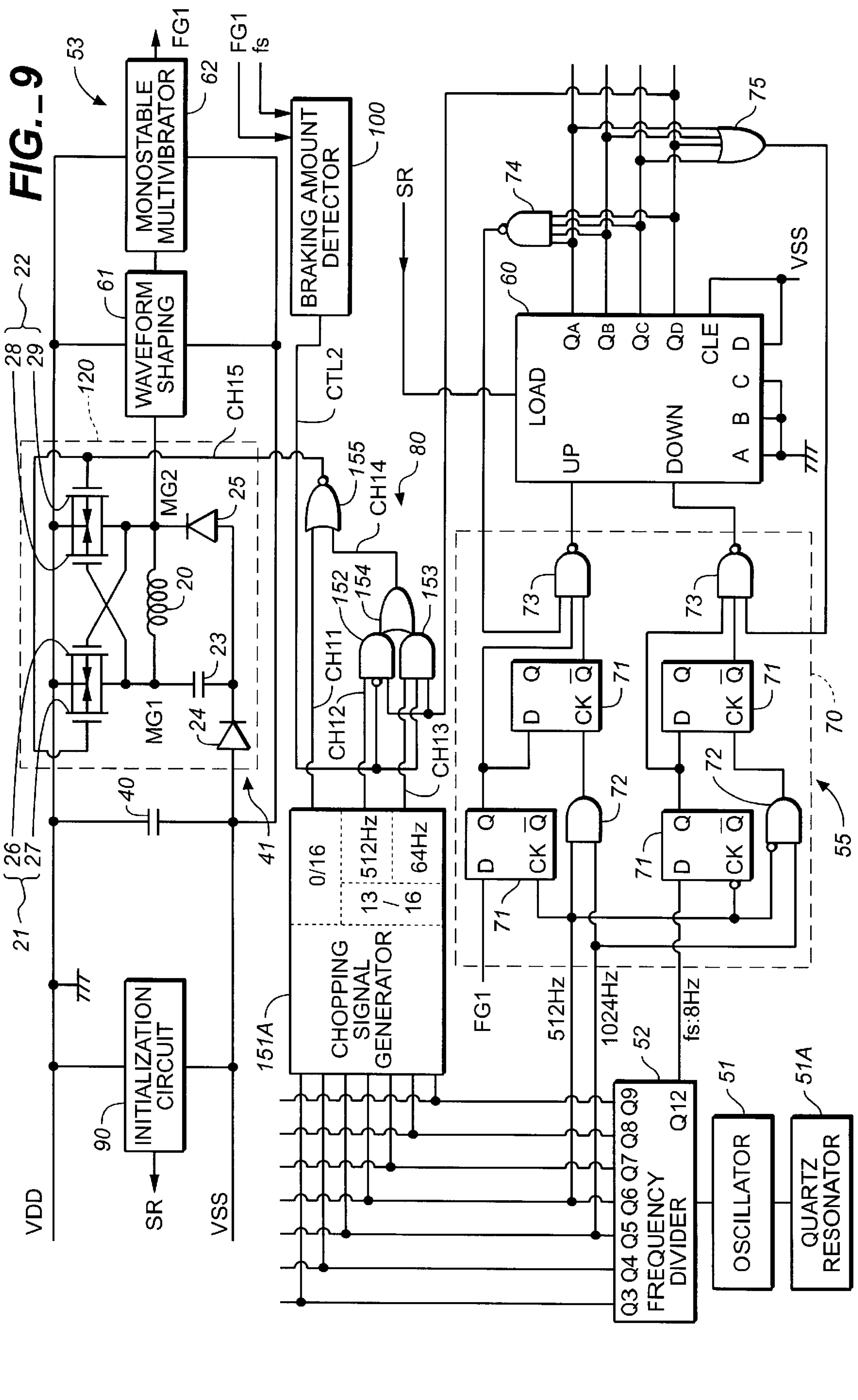
FIG. 9 is a circuit diagram illustrating the circuit configuration of an electronically controlled mechanical clock according to a second embodiment.

Now, a second embodiment of the present invention is described below with reference to FIG. 9. In the second embodiment, the same or similar elements as or to those in the first embodiment are denoted by the same reference numerals, and they are not described in further detail herein.

In this second embodiment, a chopping signal generating circuit 151A serving as the chopping signal generator outputs chopping signals CH12 and CH13 equal in duty ratio but different in frequency. More specifically, the chopping signal CH12 has a duty ratio of 13/16 and a frequency of 512

Hz. On the other hand, the chopping signal CH13 has the same duty ratio 13/16 but has a smaller frequency 64 Hz. The signal CH11 always has a duty ratio equal to 0/16. That is, the signal CH11 is always at a low level.

In this second embodiment, in contrast to the first embodiment in which the signal CTL1 output from the power supply voltage detector 103 is used to switch the output of the OR gate 154, a braking force detector 100 is provided, and the output of the OR gate 154 is switched in accordance with the signal CTL2 output from the braking force detector 100.

Figure 10:
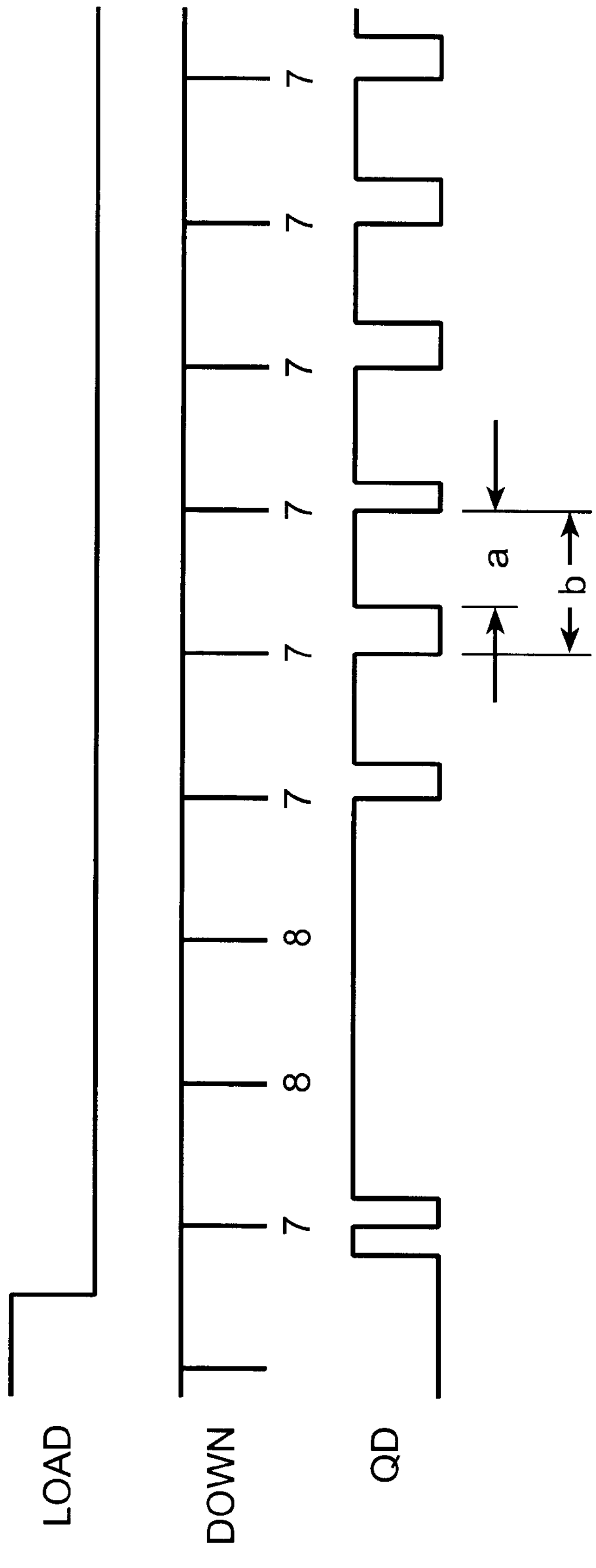
FIG. 10 is schematic diagram illustrating the braking amount obtained in the second embodiment.

The braking period detector 100 receives the reference signal fs and the rotation detection signal FG1 and calculates the ratio a/b of the braking period a to the reference signal period b. In the above calculation, the braking period a is determined by detecting the phase difference between the rotation detection signal FG1 and the reference signal fs using a timer. As also shown in FIG. 10, if the relative braking period a/b is less than a reference value (for example 50%), the braking period detector 100 outputs a low-level signal as CTL2, while the braking period detector 100 outputs a high-level signal as CTL2, if the relative braking period a/b is equal to or greater than the reference value.

Figure 11:
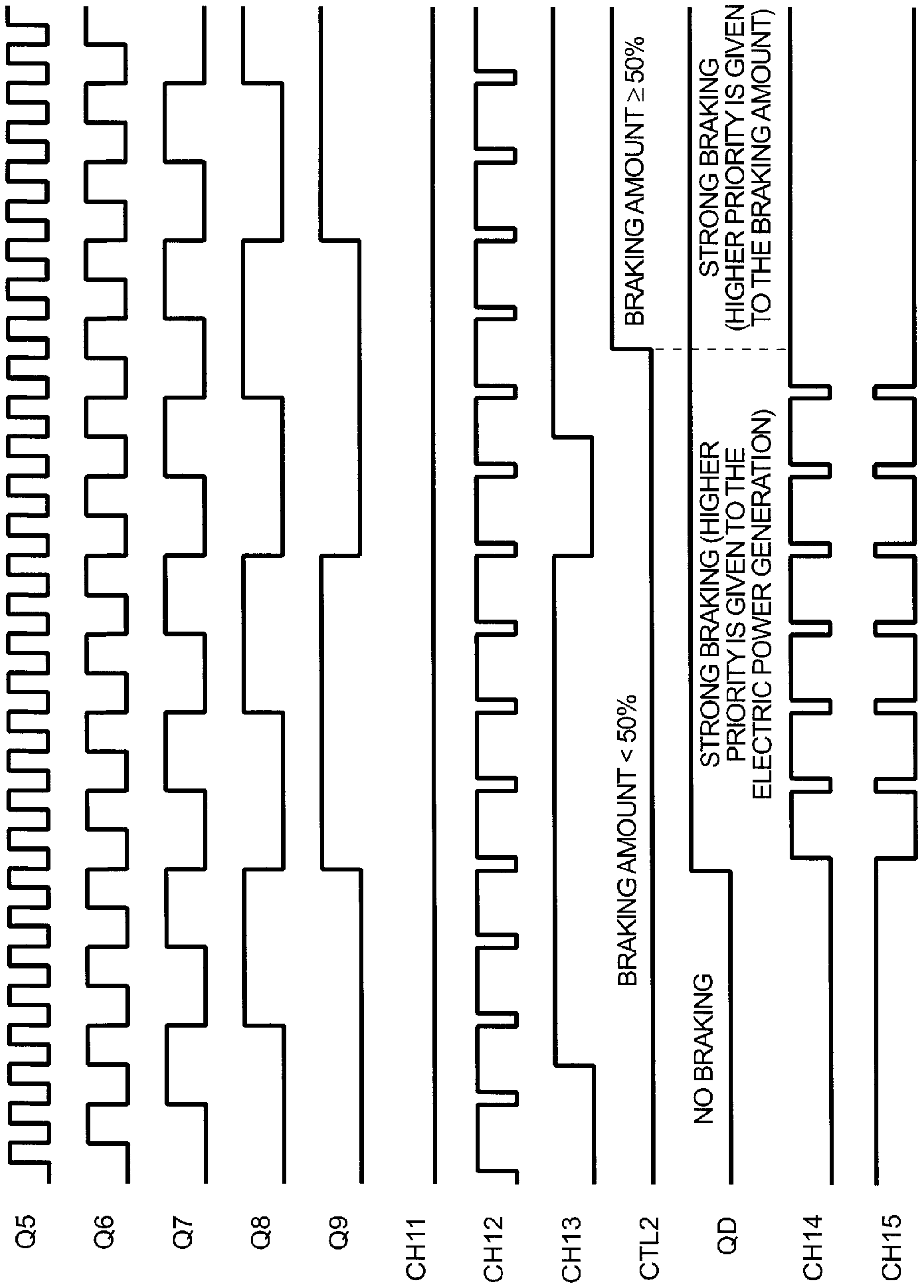
FIG. 11 is a timing chart associated with a chopping signal selector according to the second embodiment.
Figure 12:
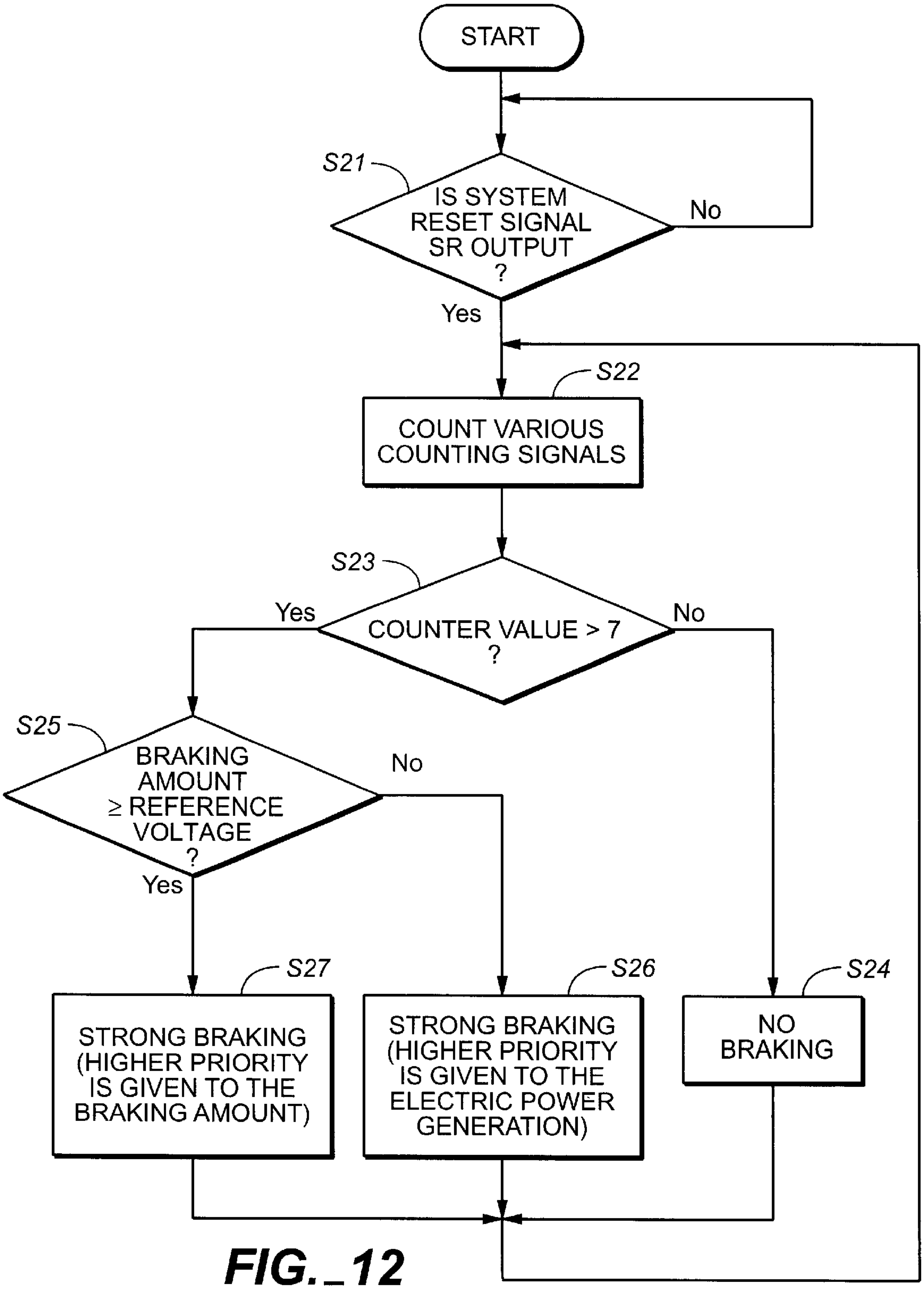
FIG. 12 is a flow chart illustrating a control method according to the second embodiment.

Thus, in the present embodiment, as shown in FIG. 11 and also in the flow chart of FIG. 12, the initialization circuit 90 outputs a system reset signal SR (S21), and the up/down counter 60 counts up count signals and down count signals (S22). When the counter value of the up/down counter 60 is less than "7" and thus the output QD is at a low level (S23), the output CH15 of the chopping signal selector 80 is given by the inverted signal of CH11, and thus it is maintained at a high level. As a result, the switches 21 and 22 are maintained in off-states, and no braking force is applied to the electric power generator 20 (braking-off state). In this case, an AC output of the electric power generator 20 is directly output (S24).

If the output QD rises up to a high level, the operation is switched into the strong braking mode (S23). In this strong braking mode, if the relative braking period is less than the reference value and thus the signal CTL2 is at a low level (S25), the signal (first chopping signal) which is obtained by inverting the chopping signal CH12 and which has a frequency of 512 Hz and a duty ratio of 13/16 is output as CH15. As a result, a strong braking force is applied while giving high priority to generation of electric power (S26). In the strong braking mode, if the relative braking period is equal to or greater than the reference value and thus the signal CTL2 is at a high level (S25), the signal (second chopping signal) which is obtained by inverting the chopping signal CH13 and which has a frequency of 64 Hz and a duty ratio of 13/16 is output as CH15. As a result, a strong braking force is applied while giving high priority to braking (S27).

Thus, in the present embodiment, the braking period detector 100 serves as a priority determination circuit for determining the priority of the braking torque applied to the electric power generator versus the priority of generation of electric power by the electric power generator in the strong braking mode. Furthermore, the up/down counter 60 and gates 152–155 form chopping signal selector 80 for selecting a chopping signal used in the strong braking mode in accordance with the output of the braking period detector 100 serving as the priority determination circuit. Also in the present embodiment, the chopping signal selector 80 selects not only chopping signals used in the strong braking mode but also chopping signals used in the strong and weak braking modes.

The present embodiment also has the advantages described above in (1)–(11) with reference to the first embodiment. That is, by using chopping signals CH12 and CH13 which are equal in duty ratio but different in frequency, it is possible to change the braking torque and the charged voltage as in the first embodiment. Furthermore, in the strong braking mode, the braking force can be switched between two levels depending on the rotational speed of the electric power generator 20. The second embodiment also has the following advantage.

(12) As can be seen from FIGS. 32 to 35, the use of the chopping signals CH12 and CH13 which are equal in duty ratio but different in frequency makes it possible to control the charged voltage and the braking force over wider ranges compared to the first embodiment in which chopping signals which are equal in frequency but different in duty ratio are used. Thus, the controllable operating range can be expanded, and the rotational speed can be controlled in a more effective fashion.

Figure 13:
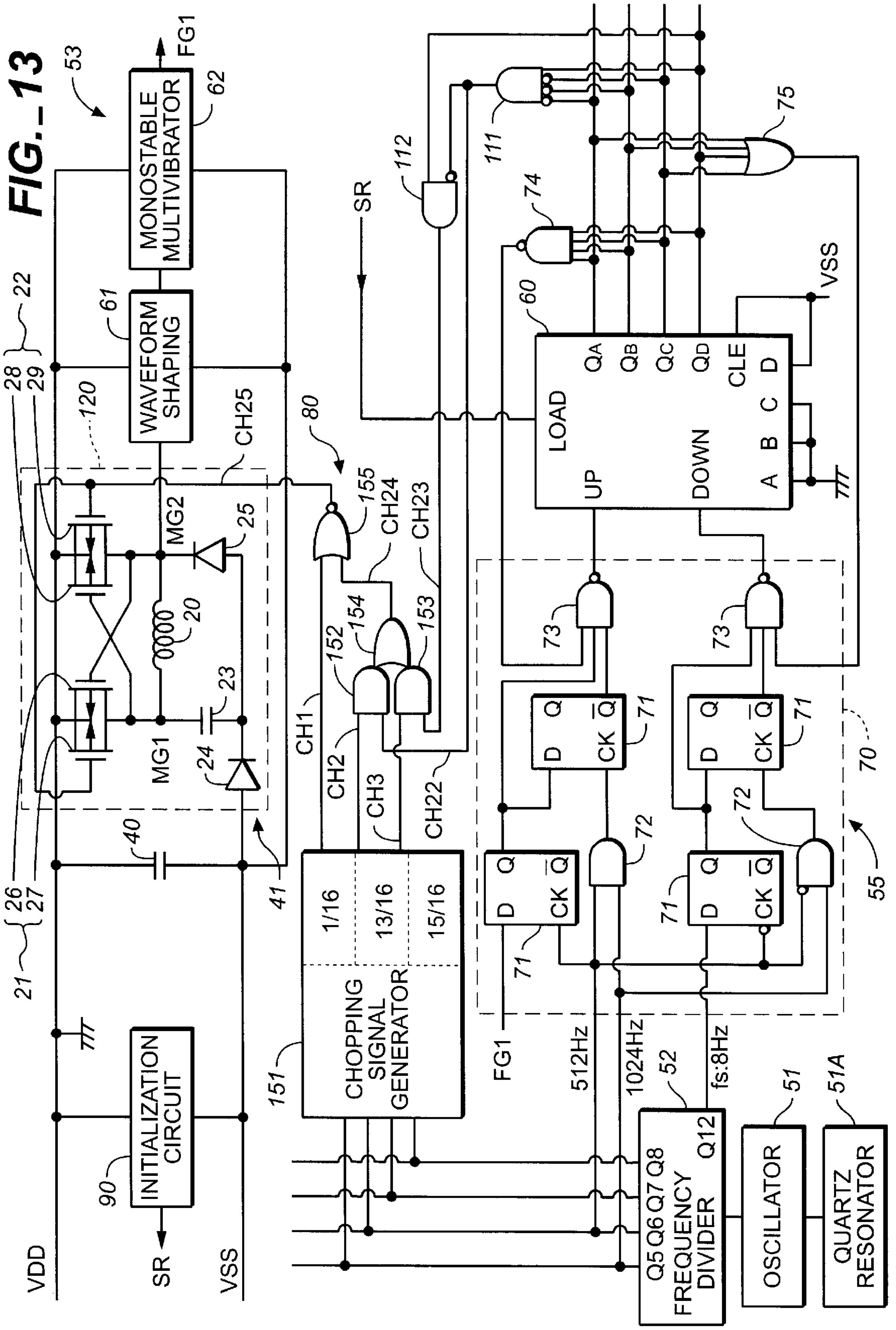
FIG. 13 is a circuit diagram illustrating the circuit configuration of an electronically controlled mechanical clock according to a third embodiment.
Figure 14:
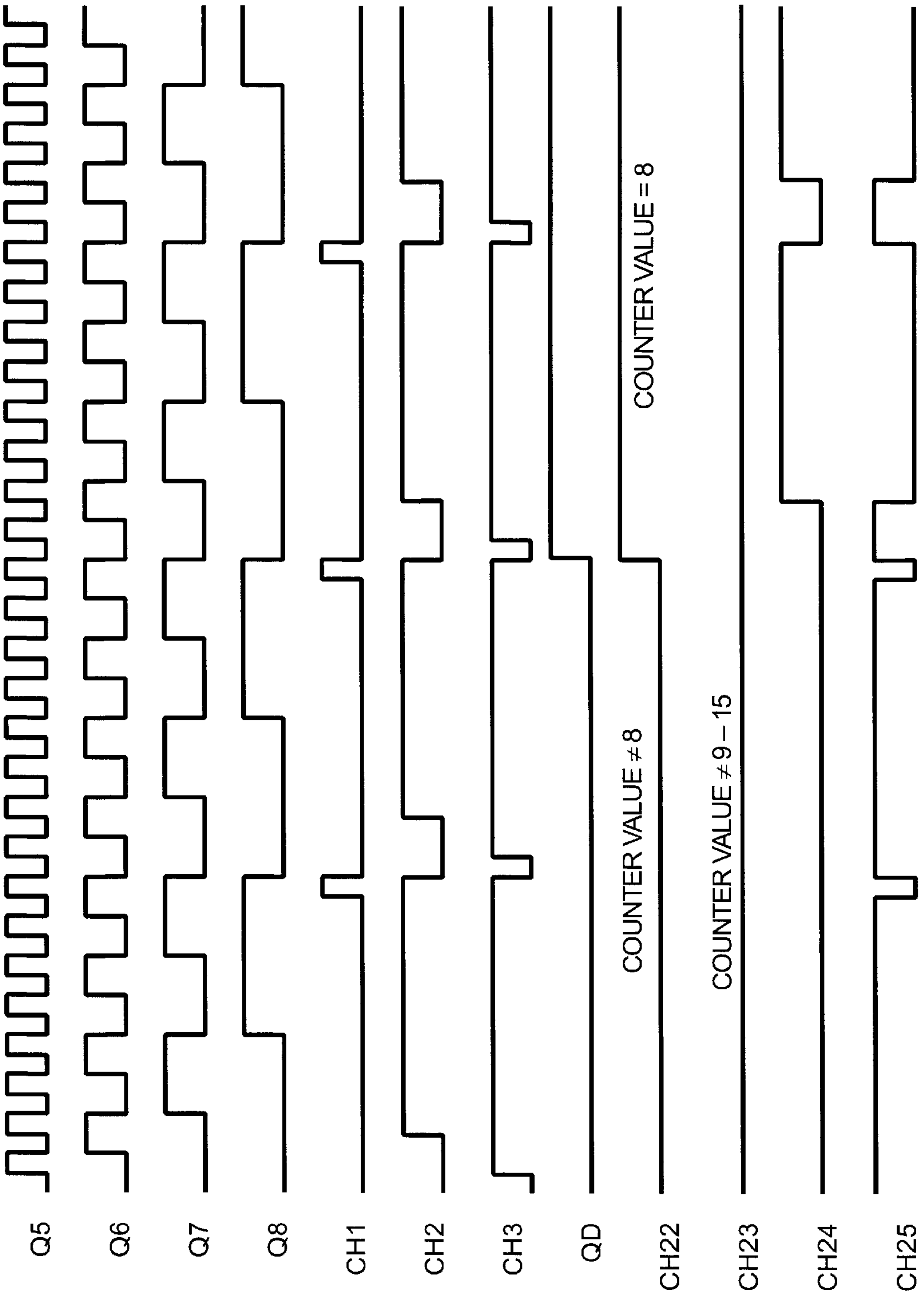
FIG. 14 is a timing chart associated with a chopping signal selector according to the third embodiment.
Figure 15:
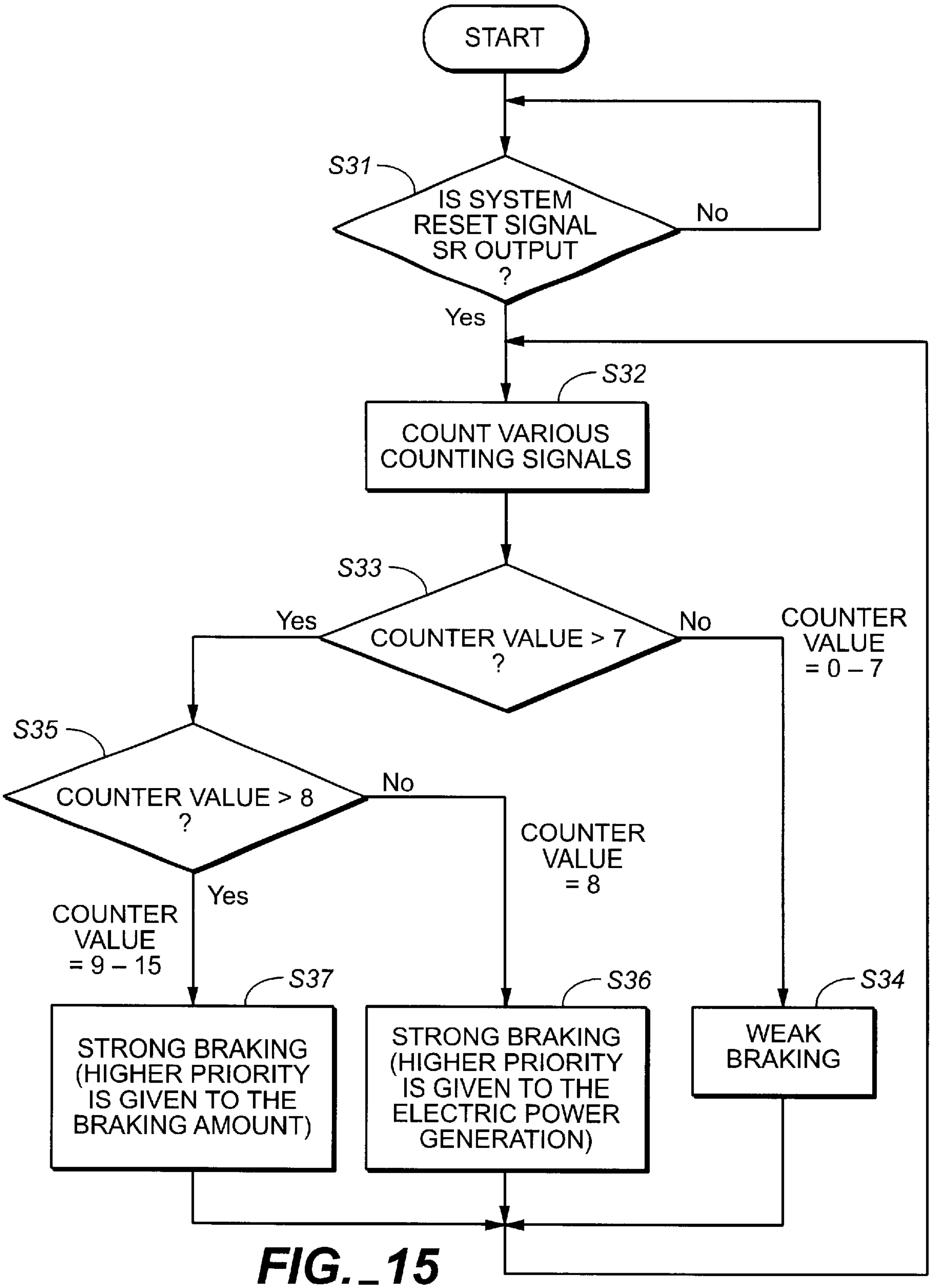
FIG. 15 is a flow chart illustrating a control method according to the third embodiment.

A third embodiment of the present invention is described below with reference to FIGS. 13 to 15. In this third embodiment, the same or similar elements as or to those in the first or second embodiment are denoted by the same reference numerals, and they are not described in further detail herein.

In the present embodiment, the output of the OR gate 154 of the chopping signal selector 80 is switched in accordance with the counter value of the up/down counter 60.

In the present embodiment, of the outputsnn QA–QD, the outputs QA–QC are input to an AND gate 111 after being inverted, and the output QD is directly input to the AND gate 111. The inverted output of the AND gate 111 is input to an AND gate 112. The output QD is also input to the AND gate 112.

Thus, the output CH22 of the AND gate 111 becomes high only when the counter value is equal to "8" and thus the output QD is high and the other outputs QA–QC are low. The output CH22 of the AND gate 111 becomes low when the counter has any other value.

The output CH23 of the AND gate 112 becomes high when the counter value is equal to one of values "9" to "15", and the output CH23 becomes low when the counter has any other value.

Thus, the initialization circuit 90 outputs a system reset signal SR (S31), and the up/down counter 60 counts up count signals and down count signals (S32). If the counter value of the up/down counter 60 is less than "8" ("0" to "7", (S33), the outputs CH22 and CH23 are both low. As a result, the output CH24 of the OR gate 154 is also low. Thus, a chopping signal obtained by inverting the output CH1 with a small duty ratio is output from the NOR gate 155 as CH25, and the operation is performed in the weak braking mode (S34).

When the counter value becomes "8", that is, when the counter value is equal to or greater than "7" (S33) and is not greater than "8" (S35), only the output CH22 becomes high, and the output CH24 becomes identical to the chopping signal CH2. Thus, the chopping signal (first chopping signal) obtained by inverting the output CH24 having a duty ratio 13/16 is output as CH25. As a result, a strong braking force is applied while giving high priority to generation of electric power (S36).

If the counter value further increases to "9" or greater (S35), only the output CH23 becomes high and the output CH22 becomes low. As a result, the output CH24 becomes identical to the chopping signal CH3, and the chopping signal (second chopping signal) obtained by inverting the output CH24 having a duty ratio 15/16 is output as CH25. Thus, a strong braking force is applied while giving high priority to braking (S37).

The counter value of the up/down counter 60 increases if the rotation period of the electric power generator relative to the period of the reference signal fs decreases and vice versa.

Thus, in the present embodiment, the up/down counter 60 serves as a priority determination circuit which detects the rotation period of the electric power generator 20 thereby determining the priority of the braking torque applied to the electric power generator versus the priority of generation of electric power by the electric power generator in the strong braking mode. The output of the up/down counter 60 is also used to control the switching between the strong and weak braking modes. Thus, the up/down counter 60, the gates 111, 112, 152–155 form chopping signal selector 80 for selecting a chopping a signal used in the strong braking mode or chopping signals used in the strong and weak modes, respectively.

The present embodiment also has the advantages described above in (1)–(11) with reference to the first embodiment, as well as the advantage described below.

(13) The switching of the chopping signal used in the strong braking mode is performed by a simple circuit consisting of the AND gates 111 and 112, which is very simple in configuration compared with the circuit including the power supply voltage detector 103 or the braking amount detector 100 employed in the previous embodiments, and which results in a reduction in cost.

Figure 16:
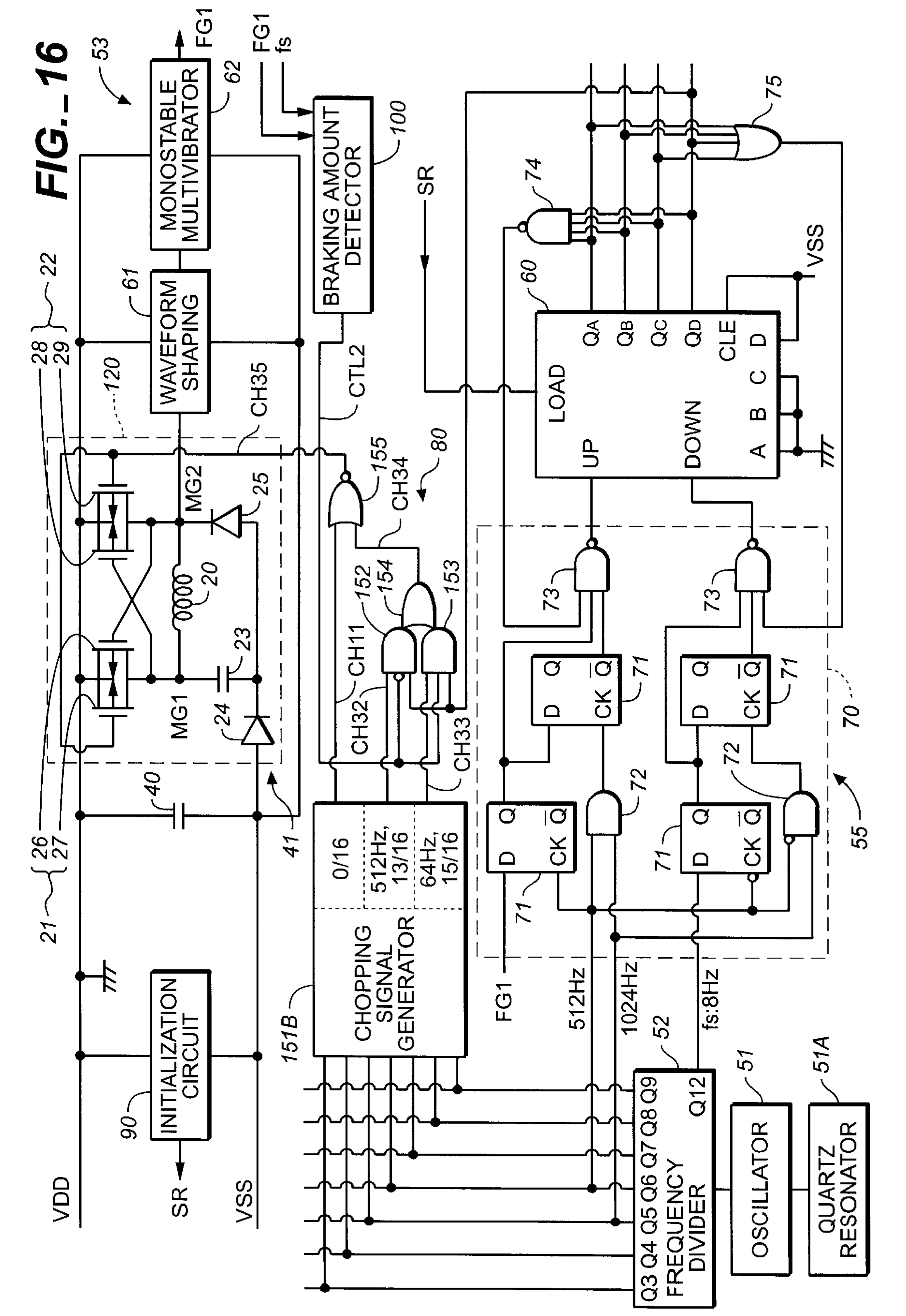
FIG. 16 is a circuit diagram illustrating the circuit configuration of an electronically controlled mechanical clock according to a fourth embodiment.
Figure 17:
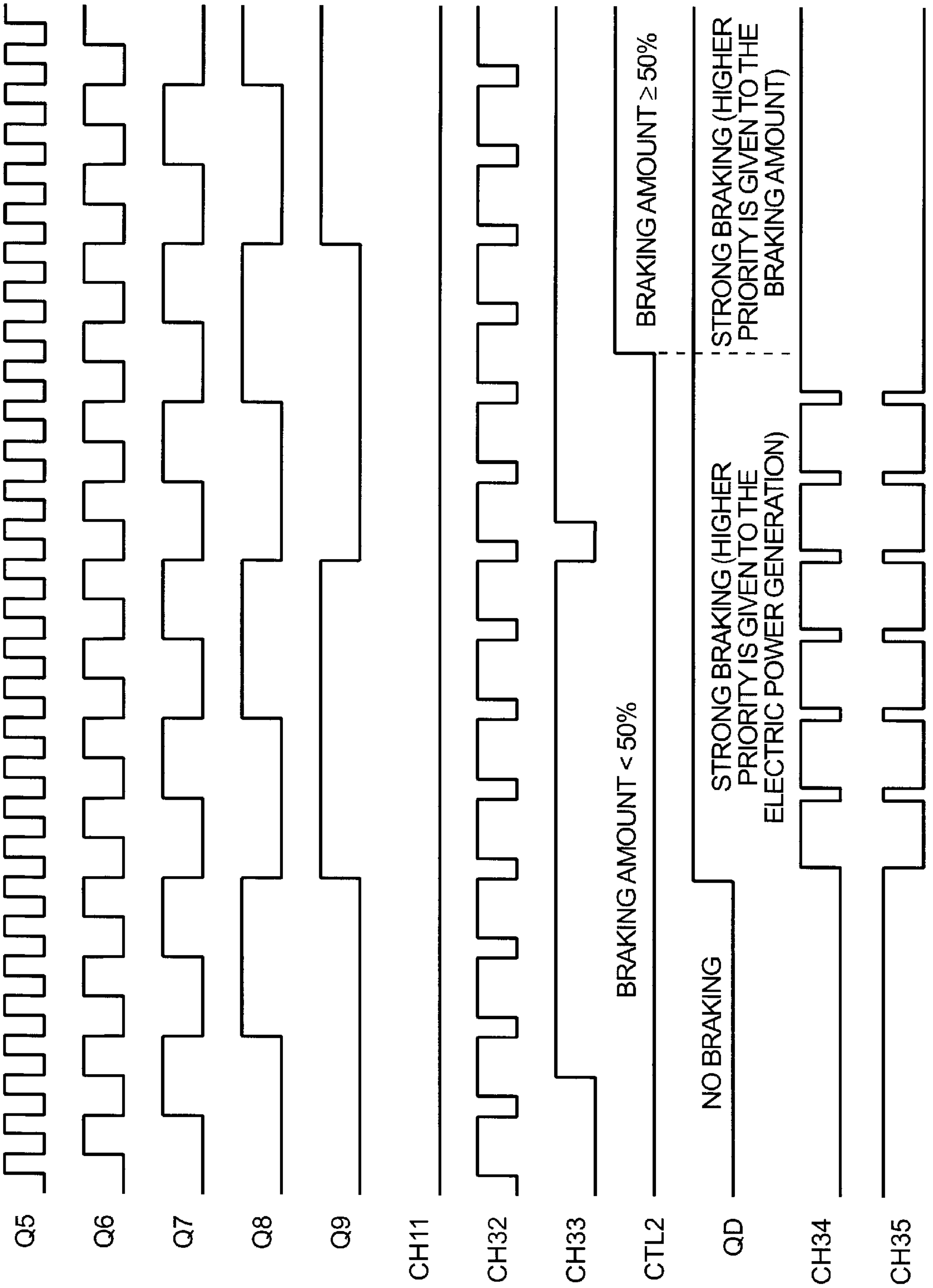
FIG. 17 is a timing chart associated with a chopping signal selector according to the fourth embodiment.

A fourth embodiment of the present invention is described below with reference to FIGS. 16 and 17. In this third embodiment, the same or similar elements as or to those in the previous embodiments are denoted by the same reference numerals, and they are not described in further detail herein.

In the present embodiment, a chopping signal generating circuit 151B serving as the chopping signal generator outputs chopping signals CH32 and CH33 which are different in duty ratio and frequency.

More specifically, a chopping signal CH32 (first chopping signal) having a frequency of 512 Hz and a duty ratio of 13/16 and a chopping signal CH33 (second chopping signal) having a frequency of 64 Hz and a duty ratio of 15/16 are used.

These chopping signals CH32 and CH33 are switched in response to the signal CTL2 output by the braking period detector 100 serving as the priority determination circuit.

That is, in the present embodiment, the operation is performed in accordance with the same flow as that of the second embodiment, as described below. That is, up count signals and down count signals are counted by the up/down counter. When the counter value of the up/down counter 60 is less than "7" and thus the output QD is at a low level, the output CH35 of the chopping signal selector 80 is given by the inverted signal of CH11, and thus it is maintained at a high level. As a result, the switches 21 and 22 are maintained in off-states, and no braking force is applied to the electric power generator 20. That is, the operation is performed in the braking-off state.

When the output QD is at a high level and the operation is performed in the strong braking mode, if the relative braking period is less than the reference value and thus the signal CTL2 is at a low level, the signal (first chopping signal) which is obtained by inverting the chopping signal CH32 and which has a frequency of 512 Hz and a duty ratio of 13/16 is output as CH35. As a result, a strong braking force is applied while giving high priority to generation of electric power. In the strong braking mode, if the relative braking period is equal to or greater than the reference value and thus the signal CTL2 is at a high level, the signal (second chopping signal) which is obtained by inverting the chopping signal CH33 and which has a frequency of 64 Hz and a duty ratio of 15/16 is output as CH35. As a result, a strong braking force is applied while giving high priority to braking.

Thus, in the present embodiment as in the second embodiment, chopping signal selector 80 is formed of the up/down counter 60 and the gates 152–155.

The present embodiment also has the advantages described above in (1)–(11) with reference to the first embodiment plus the following advantage.

(14) Furthermore, because both the frequency and the duty ratio of each chopping signal CH32 and CH33 are varied, the following advantages are obtained. That is, when an inversion of the chopping signal CH32 is used, the strong braking operation can be performed such that a high priority is given to the charged voltage, that is, generation of electric power. On the other hand, when an inversion of the chopping signal CH33 is used, the strong braking operation can be performed such that a high priority is given to the braking so as to obtain a large braking torque. Thus, it is possible to control the rotation of the electric power generator in a further efficient manner.

A fifth embodiment of the present invention is described below with reference to FIGS. 18 to 23. In this fifth embodiment, the same or similar elements as or to those in the previous embodiments are denoted by the same reference numerals, and they are not described in further detail herein.

The electronically controlled mechanical clock according to the present embodiment has a similar construction to that of the first embodiment described above with reference to FIG. 1. That is, the electronically controlled mechanical clock includes a spring 1*a* serving as a mechanical energy source, a step-up wheel train (wheels 7–11) serving as a mechanical energy transmission device for transmitting a torque of the spring 1*a* to an electric power generator 20, and hands 13, 14, and 17 serving as time indication devices which are connected to the step-up wheel train (wheels 7–11) so as to indicate time.

The electric power generator 20 is driven by the spring 1*a* via the step-up wheel train 7–11. As a result, electric power is generated by means of induction, and the resultant electric power is output from the electric power generator 20. An AC voltage output from the electric power generator 20 is stepped up and rectified by a rectifying circuit 41 such as a step-up rectifier, a full-wave rectifier, a half-wave rectifier, or a transistor rectifier. The resultant stepped-up and rectified voltage is supplied to a capacitor (power supply) 40, and thus the capacitor 40 is charged by the voltage.

Figure 18:
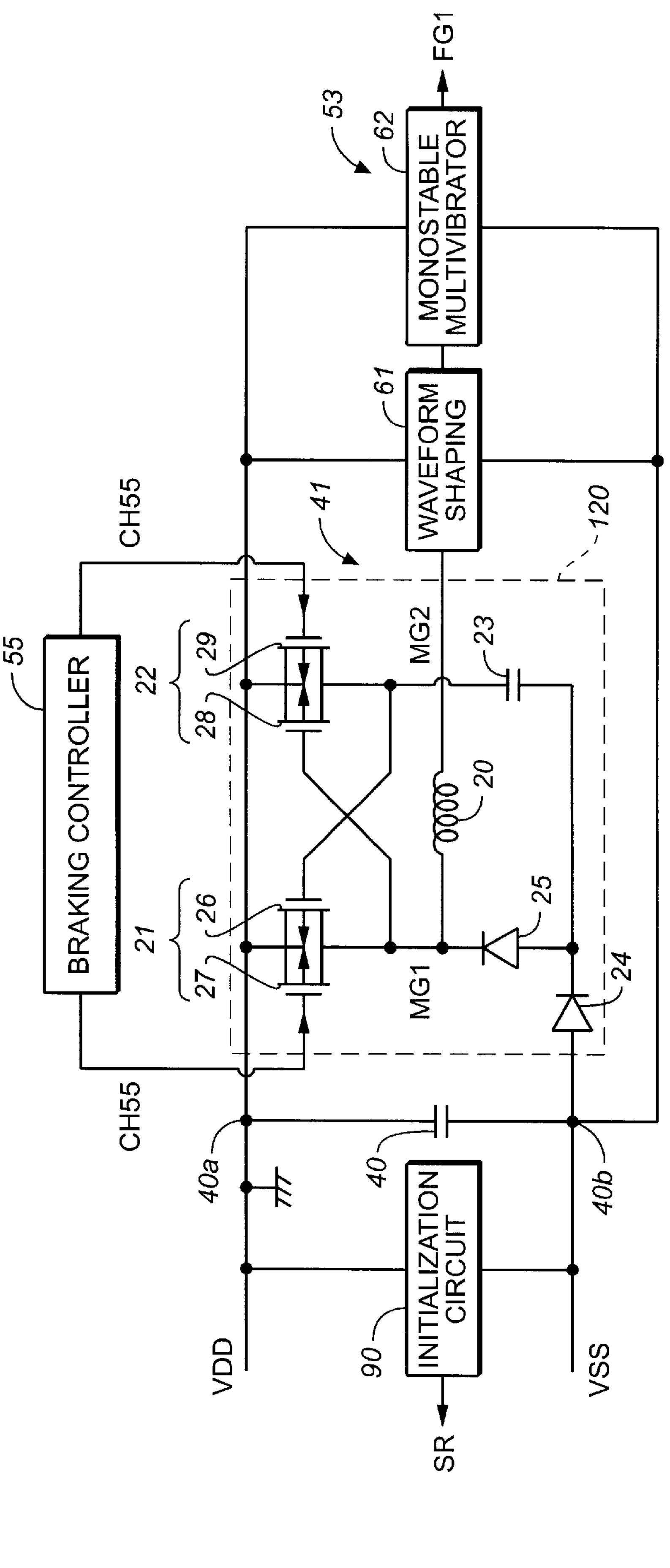
FIG. 18 is a circuit diagram illustrating the circuit configuration of an electronically controlled mechanical clock according to a fifth embodiment.

The rotation controller 50 is driven by electric power supplied by the capacitor 40, and the rotation controller 50 controls the rotation of the electric power generator 20. The rotation controller 50 includes an oscillator 51, a frequency divider 52, a rotor rotation detector 53, and a braking controller 55. As shown in FIG. 18, the rotation controller 50 controls the rotation of the electric power generator 20 by controlling a braking circuit 120.

In the present embodiment, the braking circuit 120 includes first and second switches 21 and 22 for electrically connecting first and second terminals MG1 and MG2, serving as terminals for outputting a generated AC signal (AC current), of the electric power generator 20 to each other into a closed-loop state thereby braking the electric power generator 20. The braking circuit 120 is disposed on the electric power generator 20 which also serves as a speed regulator.

The first switch 21 is constructed of, as in the previous embodiments, a first field effect transistor (FET) 26 of the p-channel type whose gate is connected to the second output terminal MG2, and a second field effect transistor 27 connected in parallel to the first field effect transistor 26 wherein a chopping signal (chopping pulse) CH55 output by the braking controller 55 is input to the gate of the second field effect transistor 27. The first switch 21 is disposed between the first output terminal MG1 and a first input terminal 40*a* of the capacitor 40.

The second switch 22 is constructed of a third field effect transistor (FET) 28 of the p-channel type whose gate is connected to the first output terminal MG1, and a fourth field effect transistor 29 connected in parallel to the third field effect transistor 28, wherein the chopping signal (chopping pulse) CH55 output by the braking controller 55 is input to the gate of the fourth field effect transistor 29. As with the first switch 21, the second switch 22 is disposed between the first output terminal MG1 and the first input terminal 40*a* of the capacitor 40.

A step-up capacitor 23 and diodes 24 and 25 similar to those employed in the previous embodiments are disposed between the output terminals MG1 and MG2 of the electric power generator 20 and a second input terminal 40*b* of the capacitor 40.

The step-up capacitor 23 connected to the electric power generator 20, the diodes 24 and 25, and the first and second switches 21 and 22 form a voltage doubler rectifier 41. A DC signal obtained by the rectifying circuit 41 is supplied to the capacitor 40 via the input terminals 40*a* and 40*b* and stored therein.

Figure 19:
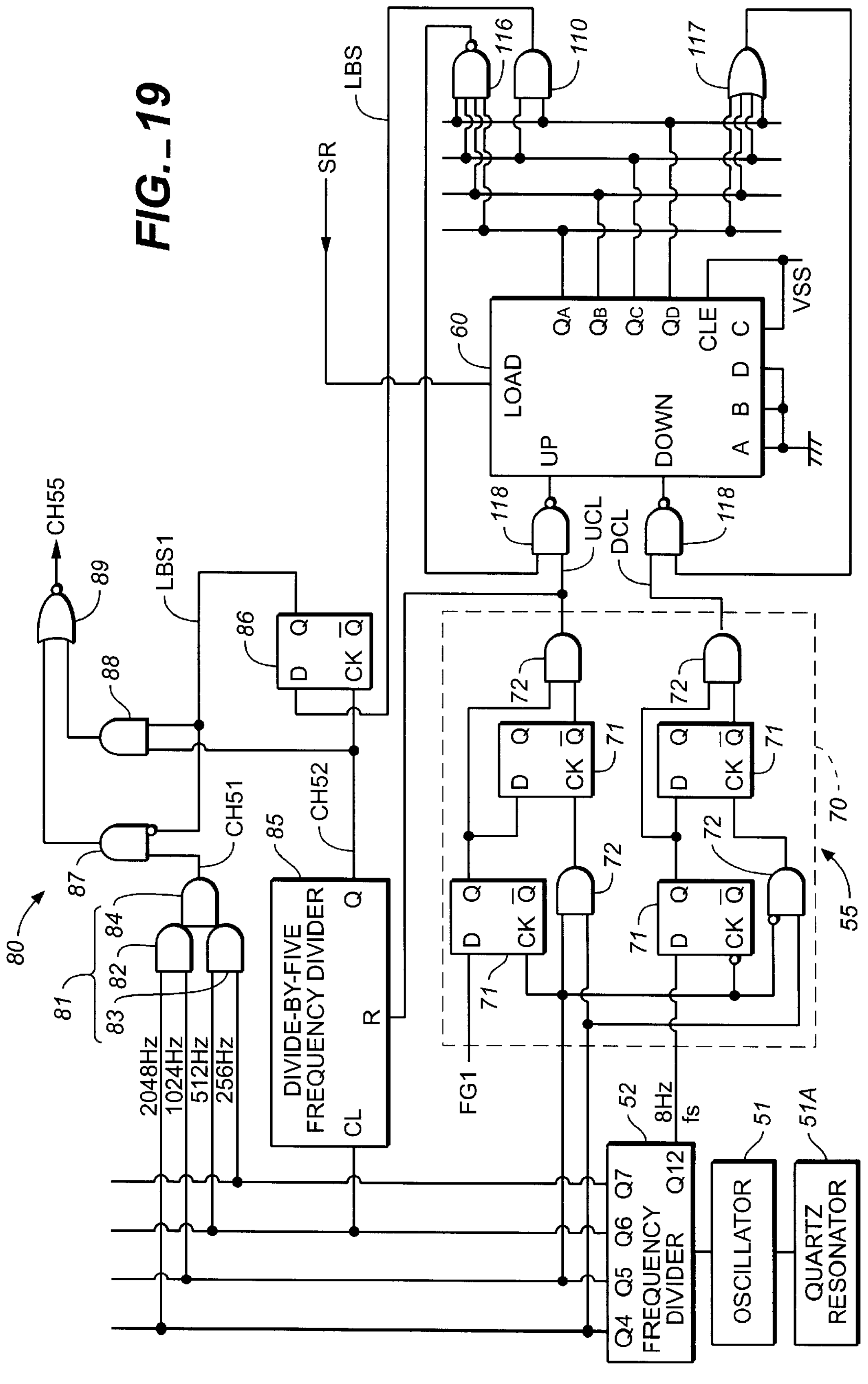
FIG. 19 is a circuit diagram illustrating the circuit configuration of a rotation controller according to the fifth embodiment.

As shown in FIG. 19, the oscillator 51 of the rotation controller 50 generates an oscillating signal (32,768 Hz) using a quartz resonator 51A serving as a standard time source. The oscillating signal output from the oscillator 51 is divided down to a particular frequency by the frequency divider 52 formed of flip-flops. The output of the twelfth stage of the frequency divider 52 is output as a reference signal fs at 8 Hz. Thus, the oscillator 51 and the frequency divider 52 form a reference signal generator. The frequency divider 52 outputs signals having frequencies 2048 Hz, 1024 Hz, 512 Hz, and 256 Hz, at output terminals Q4, Q5, Q6, and Q7, respectively.

As in the previous embodiments, the rotation detector 53 includes a waveform shaping circuit 61 connected to the electric power generator 20 and a monostable multivibrator 62.

The braking controller 55 includes an up/down counter 60, a synchronous circuit 70, first and second chopping signal generators 81 and 85, and chopping signal selector 80.

The rotation detection signal FG1 output from the rotation detector 53 and the reference signal fs output from the frequency divider 52 are input to the up/down counter 60 via an up count input and a down count input, respectively.

As shown in FIG. 19, the synchronous circuit 70 includes four flip-flops 71 and an AND gate 72. The synchronous circuit 70 makes the rotation detection signal FG1 synchronized with the reference signal fs (8 Hz) using the output (2048 Hz) of the fourth stage or the output (1024 Hz) of the fifth stage of the frequency divider 52. The synchronous circuit 70 also makes an adjustment so that there is no overlap among signal pulses.

The up/down counter 60 is constructed of a 4-bit counter. A signal (UCL, up count signal) generated by the synchronous circuit 70 in response to the rotation detection signal FG1 is applied to the up count input of the up/down counter 60, and a signal (DCL, down count signal) generated by the synchronous circuit 70 in response to the reference signal fs is applied to the down count input, whereby the counting of both the reference signal fs and the rotation detection signal FG1 and the calculation of the difference therebetween are performed at the same time.

The up/down counter 60 has four data input terminals (preset terminals) A–D. High-level signals are input to the terminals A, B, and D so that the up/down counter 60 is set to an initial counter value (preset value) equal to 11.

A LOAD input terminal of the up/down counter 60 is connected to an initialization circuit 90 which is connected to a capacitor 40 and which outputs a system reset signal SR when electric power is supplied to the capacitor 40 for the first time. More specifically, in the present embodiment, the initialization circuit 90 outputs a high-level signal when the charged voltage of the capacitor 40 is less than a predetermined value, while the initialization circuit 90 outputs a low-level signal when the charged voltage becomes equal to or greater than the predetermined value.

The up/down counter 70 does not accept an up/down input signal until the LOAD input becomes low, that is, until the system reset signal SR becomes low, and thus the counter value thereof is maintained at "11" until then.

The up/down counter 60 has 4-bit outputs QA–QD. Therefore, if the counter value is equal to or greater than "12", the third-bit output QC and the fourth-bit output QD both become high. On the other hand, if the counter value is equal to or less than "11", at least one of the third-bit output QC and the fourth-bit output QD becomes low.

Therefore, if the counter value of the up/down counter 60 is equal to or greater than "12", the output LBS of the AND gate 110 to which the outputs QC and QD are input becomes high, while the output LBS becomes low when the counter value is equal to or less than "11". The output LBS is applied to the chopping signal selector 80.

The output of the NAND gate 116 to which the outputs QA–QD are input and the output of the OR gate 117 to which the outputs QA–QD are also input are applied to the NAND gate 118 to which the output of the synchronous circuit 70 is also input. Thus, if the counter value becomes, for example, "15" after a plurality of up count signals have been input, a low-level signal is output from the NAND gate 116. As a result, even if another up count signal is input to the NAND gate 118 after that, the up count signal is blocked by the NAND gate 118 thereby ensuring that no further up count signal is input to the up/down counter 60. On the other hand, if the counter value becomes equal to "0", a low-level signal is output from the OR gate 117 thereby blocking down count signals. This ensures that the counter value does not exceed "15" to "0" and does not exceed "0" to "15".

The chopping signal generator is formed of the first chopping signal generation circuit 81 for generating a first chopping signal CH51 and the second chopping signal generation circuit 85 for generating a second chopping signal CH52.

The first chopping signal generation circuit 81 is formed of three AND gates 82–84 so that the first chopping signal CH51 is generated using the outputs Q4–Q7 of the frequency divider 52.

The second chopping signal generation circuit 85 for outputting the second chopping signal CH52 is formed of a divide-by-5 frequency divider which receives the output Q6 of the frequency divider 52 as a clock signal and which is reset by a signal UCL.

The chopping signal selector 80 is constructed such that it selects one of the chopping signals CH51 and CH52 in accordance with the output LBS of the AND gate 110 and outputs the selected chopping signal. More specifically, the chopping selector 80 is constructed of a flip-flop 86, AND gates 87 and 88, and a NOR gate 89, wherein the flip-flop 86 receives the output LBS of the up/down counter 60 as a data input and the chopping signal CH52 as a clock signal and outputs a switching signal LBS1 which controls the switching between braking and non-braking states, and wherein a chopping signal serving as a weak braking control signal (inverted signal of the first chopping signal CH51) and a chopping signal serving as a strong braking control signal (inverted signal of the second chopping signal CH52) are output by the AND gates 87 and 88 and the NOR gate 89 in accordance with the switching signal LBS1.

Figure 20:
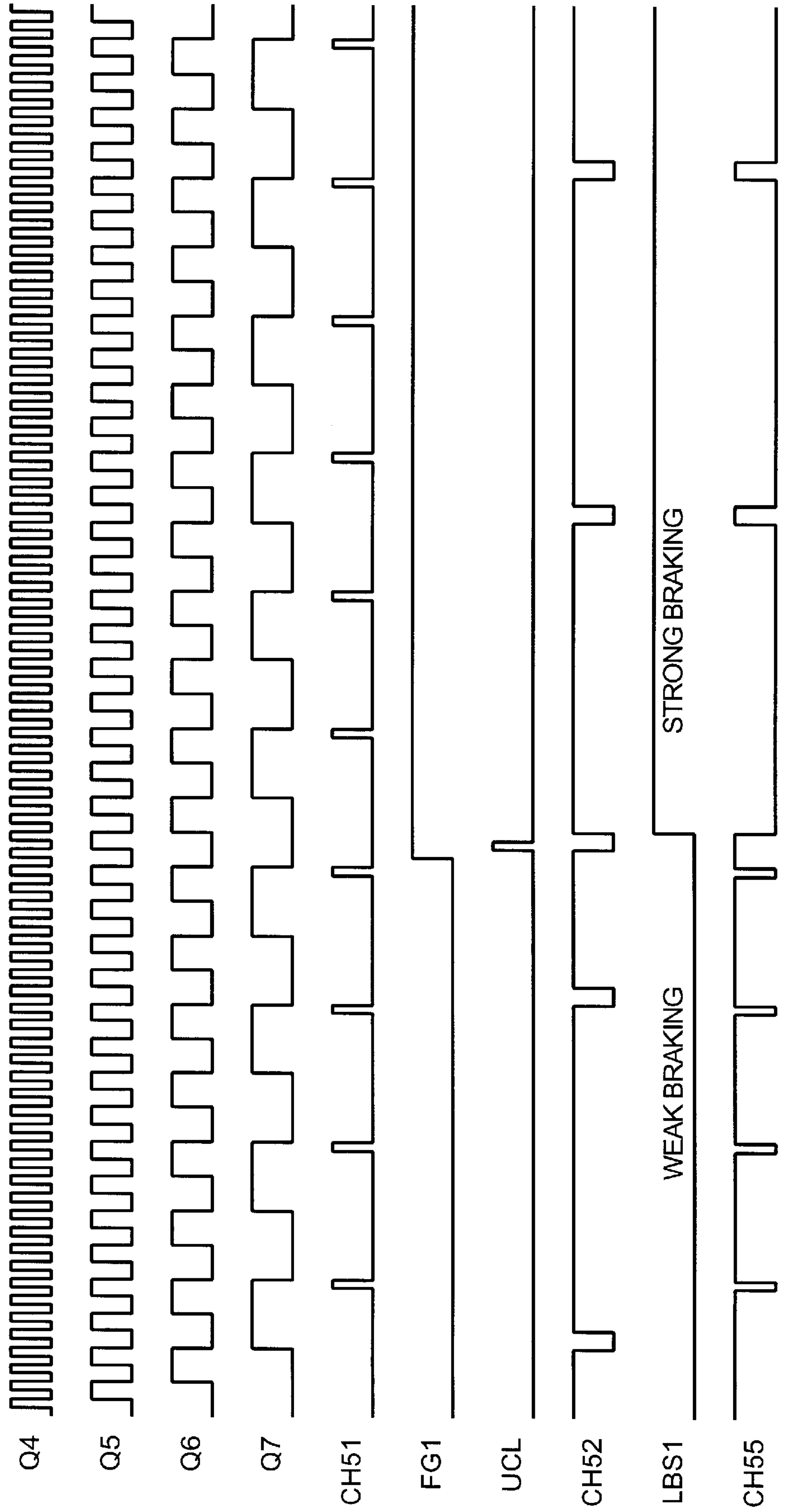
FIG. 20 is a timing chart associated with a chopping signal generator according to the fifth embodiment.
Figure 21:
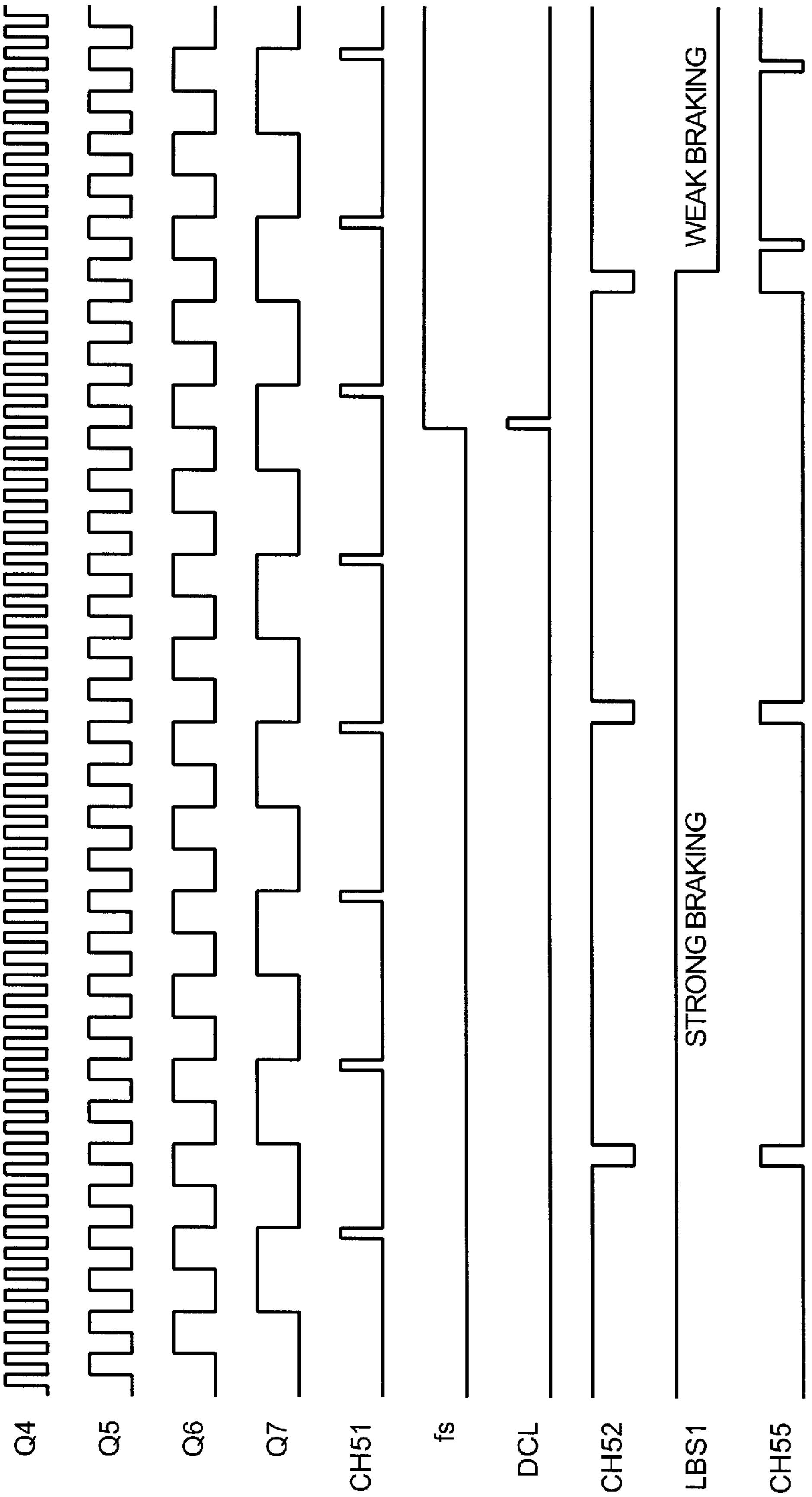
FIG. 21 is a timing chart associated with the chopping signal generator according to the fifth embodiment.

Thus, as shown in FIGS. 20 and 21, the chopping signal serving as the weak braking control signal (obtained by inverting the first chopping signal CH51) having a high frequency (256 Hz) and a small duty ratio (ratio of the braking period to the one period, that is, the relative length of the low-level period) and the chopping signal serving as the strong braking control signal (obtained by inverting the second chopping signal CH52) having a low frequency (512/5=102.4 Hz) and a large duty ratio are alternately switched in response to the output LBS1 and output as the chopping signal CH55 from the NOR gate 89 of the chopping signal selector 80.

The chopping signal CH55 is applied to the transistors 27 and 29 of the braking circuit 120. Therefore, when the chopping signal CH55 is low, the transistors 27 and 29, that is, the switches 21 and 22 are maintained in closed states, and thus the electric power generator 20 is short-circuited through a closed-loop formed by the switches 21 and 22. As a result, the electric power generator 20 is braked.

On the other hand, when the chopping signal CH55 is at a high level, the transistors 27 and 29 are maintained in off-states, and no braking force is applied to the electric power generator 20. Thus, the electric power generator 20 is controlled in a chopping fashion by the chopping signal CH55.

The operation of the present embodiment is described with reference to timing charts shown in FIGS. 20, 21, and 22 and a flow chart shown in FIG. 23.

When a low-level system reset signal SR is applied from the initialization circuit 90 to the LOAD input of the up/down counter 60 after the electric power generator 20 starts to operate (S51), an up count signal (UCL) generated based on a rotation detection signal FG1 and a down count signal (DCL) generated based on a reference signal fs are counted by the up/down counter 60 (S52). The synchronous circuit 70 controls these signals so that they are not applied to the counter 60 at the same time.

Thus, when an up count signal (UCL) is input, the counter value is incremented to "12" from an initial value of "11". As a result, the output LBS becomes high and is applied to the flip-flop 86 of the chopping signal selector 80. At the same time, the second chopping signal generation circuit (divide-by-5 frequency divider) 85 is reset by UCL, and a pulse signal is input to the clock input of the flip-flop 86. Therefore, if the counter value is incremented to "12" in response to UCL, the output BLS1 of the flip-flop 86 rises up to a high level at the same time.

If the counter value returns to "11" in response to a down count signal (DCL), the output LBS becomes low. However, as shown in FIG. 21, because the output LBS1 of the flip-flop 86 varies in synchronization with the chopping signal CH52, the output LBS does not fall down to the low level immediately after the input of DCL but falls down at the end of one period of the chopping signal CH52.

In the chopping signal selector 80, when the output LBS1 of the flip-flop 86 is at a low level (when the counter value is equal to or less than "11"), the output of the AND gate 88 is also maintained at a low level. As a result, the NOR gate 89 outputs an inversion of the output CH51 as the chopping signal CH55. Thus, the chopping signal CH55 output from the NOR gate 89 has a large high-level period (braking-off period) and a small low-level period (braking-on period). That is, the chopping signal CH55 has a small duty ratio (the relative on-period of the switches 21 and 22) used in the weak braking mode. As a result, the braking-on period relative to the reference period becomes short, and the electric power generator 20 is braked very weakly, and a higher priority is given to optimum generation of electric power (S53, S55).

On the other hand, when the output LBS1 of the flip-flop 86 is at a high level (when the counter value is equal to or greater than "12"), the output of the AND gate 87 is maintained at a low level. As a result, the NOR gate 89 outputs an inversion of CH52 as a chopping signal CH55. Thus, the chopping signal CH55 output from the NOR gate 89 becomes a strong-braking chopping signal having a large duty ratio and a frequency higher than that of the above-described weak-braking chopping signal. As a result, the braking-on period relative to the reference period becomes long, and large braking is applied to the electric power generator 20. However, because the braking is turned off at fixed time intervals in a chopping fashion, a large braking torque can be obtained without causing a significant reduction in electric power generated.

Figure 22:
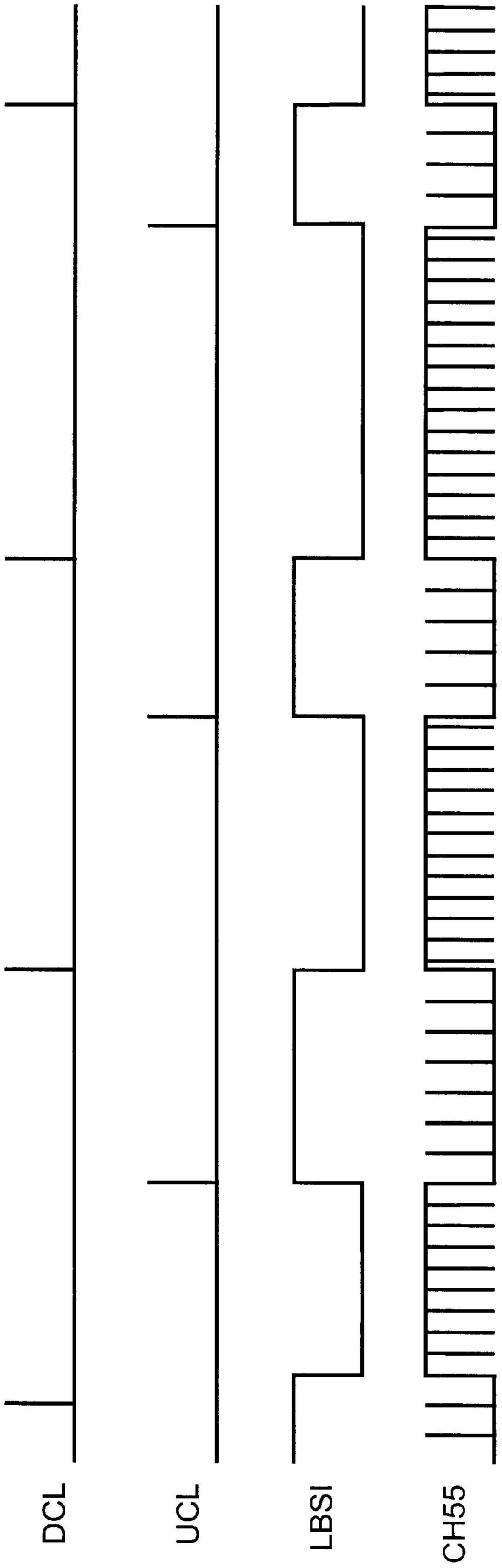
FIG. 22 is a timing chart associated with the chopping signal generator according to the fifth embodiment.
Figure 23:
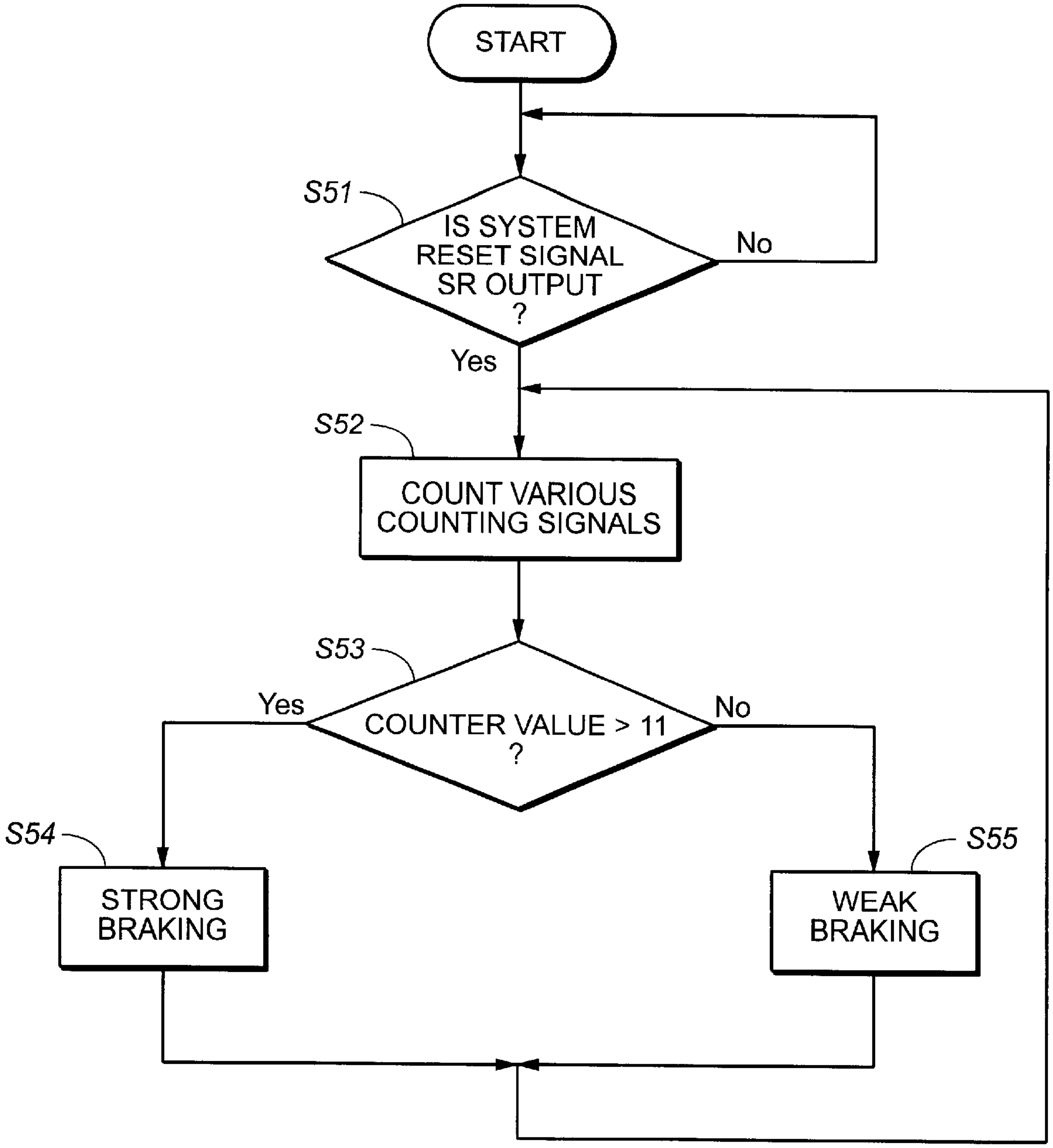
FIG. 23 is a flow chart illustrating a control method according to the fifth embodiment.

As shown in FIG. 22, the strong braking period starts in synchronization with the up count signal (UCL) generated based on the rotation detection signal FG1 associated with the rotation of the rotor. However, the end of the strong braking period, that is the start of the weak braking period, is not synchronous with the down count signal (DCL) generated based on the reference signal fs but starts at the end of one period of the chopping signal CH55. Herein, because the strong-braking chopping signal CH55 is synchronous with the rotor rotation detection signal FG1, the timing of transition to the weak braking period at the end of one period of the strong-braking chopping signal is also synchronous with the rotor rotation detection signal FG1.

However, because the weak-braking chopping signal CH55 (inversion of CH51) is not synchronous with the rotor rotation detection signal FG1, the chopping timing is not synchronous with the rotor rotation detection signal FG1, although the starting timing is synchronous.

In the voltage doubler rectifier 41, a charge generated by the electric power generator 20 is stored in the capacitor 40 in the manner described below. When the voltage of the first output terminal MG1 is positive and that of the second output terminal MG2 is negative, the first field effect transistor (FET) 26 is turned off and the third field effect transistor (FET) 28 is turned on. The charge generated by the electric power generator 20 is stored into the capacitor having a capacitance of, for example, 0.1 $\mu$F via a path including the second output terminal MG2, the capacitor 23, the diode 25, and the first output terminal MG1. The charge is also stored into the capacitor 40 having a capacitance of, for example, 10 μF via a path including the second output terminal MG2, the second switch 22, the first input terminal 40*a,* the capacitor 40, the second input terminal 40*b,* the diodes 24 and 25, and the first output terminal MG1.

If the polarities are switched such that the first output terminal MG1 is positive and the second output terminal MG2 is negative, the first field effect transistor (FET) 26 is turned on and the third field effect transistor (FET) 28 is turned off. As a result, the capacitor 40 is charged up with the sum of the voltage generated by the electric power generator 20 and the voltage stored in the capacitor 23 via a path including, as shown in FIG. 18, the capacitor 23→the second output terminal MG2→the electric power generator 20→the first output terminal MG1→the switch 21→the first input terminal 40*a*→the capacitor 40→the second input terminal 40*b*→the diode 24→the capacitor 23.

In each state, when the electric power generator 20 is opened in response to a chopping pulse after being closed, a high voltage is generated across the coil, and this high voltage makes a contribution to an increase in the charging efficiency of the power supply (capacitor) 40.

In the case where the spring 1*a* has a strong torque and thus the electric power generator 20 is rotated at a high speed, there is a possibility that another up count signal is input after the counter value has been incremented to "12" in response to an up count signal. In this case, the counter value becomes "13", and the output LBS is maintained at a high level. As a result, strong braking is performed in response to the chopping signal CH55 in such a manner that braking is turned off at fixed time intervals. This strong braking operation is continued regardless of the period of the reference signal fs until the counter value of the up/down counter 60 drops to a value equal to or smaller than "11".

Thus the rotational speed of the electric power generator 20 is reduced by the braking. If, as a result of the reduction in the rotational speed, the reference signal fs (down count signal) is input twice before the rotation detection signal FG1 is input, the counter value is decremented to "12" and then to "11". When the counter value becomes "11", the control mode is switched to the weak braking mode.

As a result of the control described above, the rotational speed of the electric power generator 20 approaches the set speed, and the operation finally comes into a locked state in which the up count signal and the down count signal are alternately input and the counter value alternately has "12" and "11". In this case, strong braking and weak braking are alternately applied depending on the counter value. That is, a chopping signal with a large duty ratio and a chopping signal with a small duty ratio are alternately applied to the switches 21 and 22 in each cycle during which the rotor rotates one revolution, thereby controlling the rotation of the electric power generator 20 in a chopping fashion.

When the torque of the spring 1*a* becomes small as the spring 1*a* is released, there is a possibility that a plurality of down count signals (DCL) are input in a short period of time and thus the counter value is decremented to "11" and further to "10". In this case, the output LBS1 is maintained at the low level, and a weak-braking chopping signal is continuously output as CH55. As a result, no strong braking is applied, and the rotational speed of the electric power generator is controlled at the standard speed.

If the spring 1*a* is released further, the down count signal is input at shorter time intervals even in the weak braking mode. Thus, when the counter value becomes equal to or smaller than "10", it is determined that the torque of the spring 1*a* has become very low, and the hands are stopped or their moving speeds are reduced to very low levels. Furthermore, an alarm is sounded or a lamp is lit to warn a user to rewind the spring 1*a*.

Thus, when the output LBS of the up/down counter 60 is high and the output LBS1 of the flip-flop 86 is also high, a strong braking operation is performed in response to a chopping signal having a large duty ratio. On the other hand, when the output LBS of the up/down counter 60 is low and the output LBS1 of the flip-flop 86 is also low, a weak braking operation is performed in response to a chopping signal having a small duty ratio. That is, the control mode is switched between the strong braking mode and the weak braking mode in accordance with the output of the up/down counter 60, and more directly in accordance with the output of the flip-flop 86 serving as the chopping signal selector 80.

The electric power generator outputs electric power having an AC waveform corresponding to the change in the magnetic flux, via the terminals MG1 and MG2. Herein, a chopping signal CH5 having a frequency and a duty ratio which both vary depending on the output signal LBS1 is applied to the switches 21 and 22. When the output LBS1 is high, that is, in the strong braking mode, the braking period in each chopping cycle becomes long. As a result, large braking is applied to the electric power generator 20 and the rotational speed thereof is reduced. The braking also results in a reduction in electric power generated. However, energy is stored during the braking period, and the stored energy is output when the switches 21 and 22 turn off in response to the chopping signal CH55. That is, the voltage is increased as a result of the chopping operation, and the reduction in the electric power generated by the electric power generator is compensated for. Thus, it is possible to increase the braking torque while minimizing the reduction in electric power generated.

Conversely, when the output LBS1 is low, that is, in the weak braking mode, the braking period in each chopping cycle become short. As a result, the braking force becomes lower and thus the rotational speed of the electric power generator increases. Also in this case, the voltage is increased when the closed switches 21 and 22 are opened by the chopping signal CH55. This makes it possible to increase the generated electric power even compared with electric power obtained when braking is not applied at all.

The AC output of the electric power generator 20 is stepped up and rectified by the voltage doubler rectifier 21 and then stored in the power supply (capacitor) 40. The rotation controller 50 is driven by the power supply 40.

The present embodiment has advantages as described below.

(21) Because the timing of the start of the chopping signal CH55 for applying a braking force is synchronized with the up count signal (UCL) generated based on the rotor rotation detection signal FG1, it is ensured that strong braking is applied immediately after the strong-braking chopping signal is started in response to the UCL signal. This make is possible to control the rotational speed in a quick and highly reliable fashion.

(22) On the other hand, the transition from the strong braking mode to the weak braking mode is not performed immediately after the input of the down count signal (DCL) generated based on the reference signal. Instead, the transition is performed in synchronization with the period of the strong-braking chopping signal CH55. This ensures that the strong-braking chopping signal CH55 is applied to the switches 21 and 22 over a time corresponding to that period. This makes it easy to calculate the braking force, and thus it becomes possible to control the rotational speed in a more precise fashion.

(23) When the counter value of the up/down counter 60 is equal to or greater than "12", the strong braking mode is maintained. Therefore, when the spring 1*a* has a large torque and thus the rotational speed of the rotor of the electric power generator 20 is high, the rotational speed is reduced down to the standard speed in a short time. That is, the response speed of the rotational speed control is improved compared with the case where braking is turned on and off in each period of the reference signal.

Conversely, when the counter value of the up/down counter 60 is equal to or smaller than "11", the weak braking mode is maintained. Therefore, when the torque of the spring 1*a* becomes low and thus the rotational speed of the rotor of the electric power generator becomes low, the rotational speed is returned to the standard speed because no strong braking is applied. Also in this case, the control of the rotational speed is quickly performed compared with the case where braking is turned on and off in each period of the reference signal.

(24) The control mode is switched between the strong braking mode and the weak braking mode using chopping signals CH5 having different duty ratios and different frequencies so as to apply a large braking force (large braking torque) without causing a reduction in the charging voltage (voltage generated by the electric power generator). In particular, a chopping signal having a large duty ratio and having a low chopping frequency is used in the strong braking mode, so that a large braking torque can be applied while minimizing the reduction in the charging voltage thereby achieving high-efficiency braking control while maintaining the high stability of the system. This makes it possible to operate the electronically controlled mechanical clock for a longer period of time.

That is, when the electric power generator 20 is controlled in a chopping fashion by applying a chopping signal to the switch such that the switch connects the two terminals of the electric power generator 20 into a closed-loop state in response to the chopping signal, the driving torque (braking torque, damping torque) increases with decreasing chopping frequency and with increasing duty ratio, as shown in FIGS. 32–35. In contrast, the charged voltage (generated voltage) increases with increasing chopping frequency. However, a significant reduction in the charged voltage (generated voltage) does not occur when the duty ratio increases. On the contrary, at frequencies higher than 50 Hz, the charged voltage increases with increasing duty ratio in a range where the duty ratio is less than 0.8. Therefore, by selecting the frequency and the duty ratio of the chopping signal CH31 in the manner as employed in the present embodiment, it is possible to increase the braking force without causing a reduction in the charged voltage (generated voltage). Thus, the rotational speed can be controlled in an effective fashion.

(25) The up count signal (UCL) generated on the basis of the rotation detection signal FG1 and the down count signal (DCL) generated on the basis of the reference signal fs are input to the up/down counter 60, and the delay or lead of phase is detected for both signals. The detection result is reflected in the braking operation in the one period immediately after the detection. Therefore, even if a short-term fluctuation occurs in the rotational speed of the motor of the clock, such a fluctuation does not result in a long-term delay or lead of time. That is, the rotational speed is precisely controlled, and high time indication accuracy is obtained.

(26) In the voltage doubler rectifier 41, rectification is performed using the first and third field effect transistors 26 and 28 whose gates are connected to the terminals MG1 and MG2, respectively. Therefore, no comparator is required. This allows the rectifier 41 to be constructed in a simple form which needs a less number of components. Furthermore, a reduction in the charging efficiency due to power consumption by the comparator is eliminated. Furthermore, because the field effect transistors 26 and 28 are turned on and off using the terminal voltages (voltages of the output terminals MG1 and MG2) of the electric power generator 20, the field effect transistors 26 and 28 are turned on and off in synchronization with the polarity of the terminal voltage of the electric power generator. This results in an improvement in the rectification efficiency.

(27) Furthermore, the second and fourth field effect transistors 27 and 29 are connected in parallel to the transistors 26 and 28, respectively, so that the electric power generator 20 can be controlled in the chopping fashion independently using the field effect transistors 27 and 28 without having to use a complicated circuit configuration. That is, it is possible to provide a voltage doubler rectifier 41 simply configured and capable of performing chopping rectification in synchronization with the polarity of the electric power generator 20 while stepping up the voltage.

(28) In the rectifier 41, in addition to the increasing of the voltage using the capacitor 23, the voltage is also increased by means of chopping. As a result, the DC voltage output from the rectifier 41, that is, the charged voltage of the capacitor 40 is increased. Thus, the charging efficiency is improved.

(29) The use of the 4-bit up/down counter 60 allows counting to be performed in the range of sixteen counter values. Therefore, when a plurality of up count signals are input at short time intervals, the up/down counter 60 can cumulatively count the input signals. Thus, the cumulative error can be corrected as long as the counter value is within the range of 0 to 15 when a plurality of up count signals or down count signals are input at short time intervals. Therefore, even if the rotational speed of the electric power generator 20 greatly deviates from the standard speed, the cumulative error of the rotational speed of the electric power generator 20 can be corrected and the rotational speed can be returned to the standard speed, although it takes a rather long time until the system comes into the locked state. Thus, it is possible to move the hands at correct intervals from the long-term view point.

(30) The switching between the strong braking mode and the weak braking mode is performed depending only on whether the counter value is equal to or smaller than "11" or equal to or greater than "12", without needing a setting of the braking time or the like. This allows the rotation controller 50 to be constructed in a simple form. Therefore, the component cost and production cost can be reduced, and thus it is possible to provide an electronically controlled mechanical clock at low cost.

Figure 24:
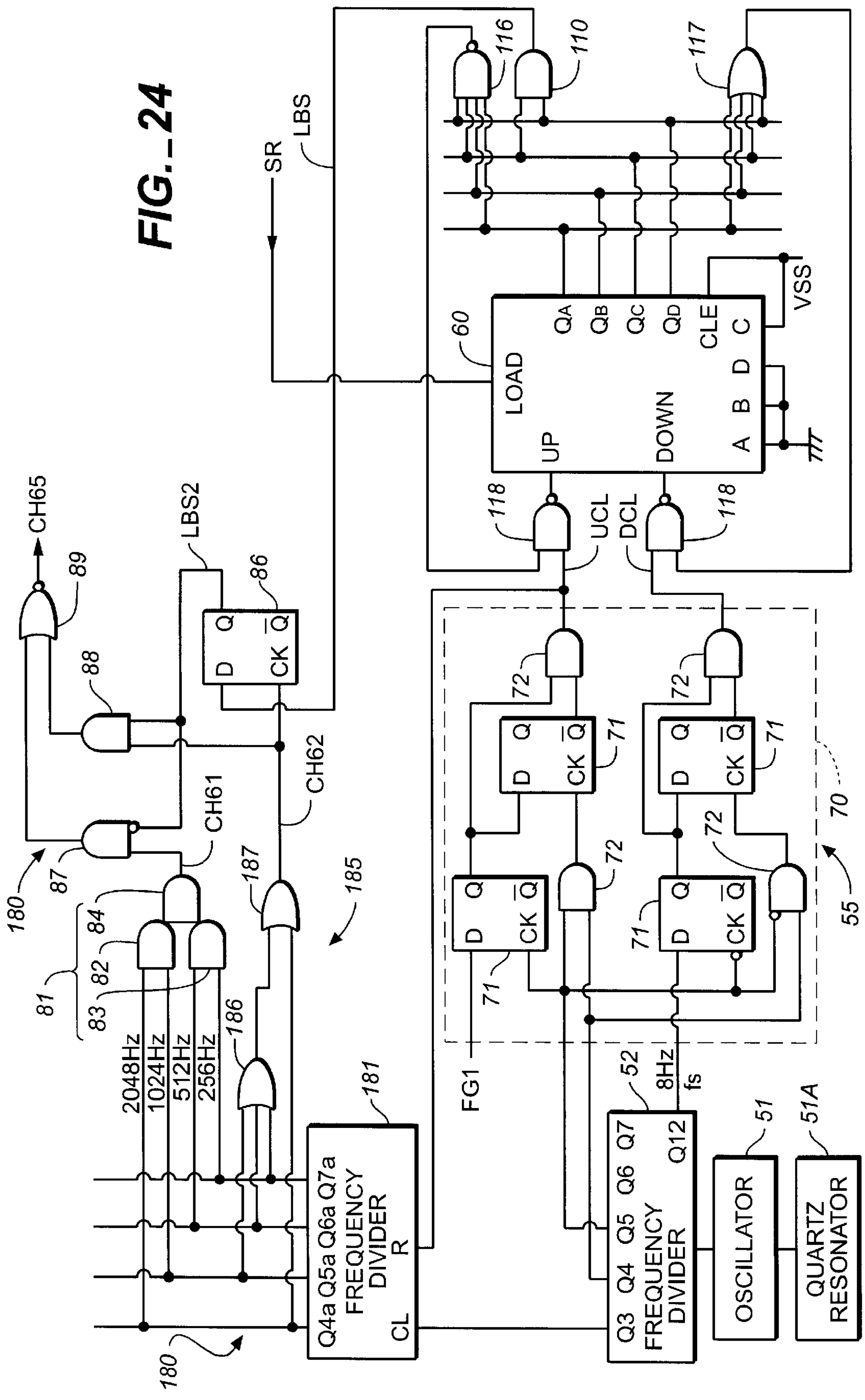
FIG. 24 is a circuit diagram illustrating the circuit configuration of a rotation controller according to a sixth embodiment.

A sixth embodiment of the present invention is described below with reference to FIGS. 24 to 26. In this sixth embodiment, the same or similar elements as or to those in the fifth embodiment are denoted by the same reference numerals, and they are not described in further detail herein.

A chopping signal generator 180 employed in the present embodiment is different in configuration from the chopping signal generator employed in the fifth embodiment in that the chopping signal CH65 generated by the chopping signal generator 180 has the same frequency for both the strong and weak braking operations.

More specifically, the chopping signal generator 180 includes a frequency divider 181 which is reset by an up count signal (UCL).

The frequency divider 181 receives, at its clock input, the output Q3 (4096 Hz) of the frequency divider 52 and outputs signals Q4*a* (2048 Hz) to Q7*a* (256 Hz).

The chopping signal generator 180 further includes: a first chopping signal generation circuit 81, composed of three AND gates 82 to 84, for generating a first chopping signal CH61 using the outputs Q4*a* to Q7*a* of the frequency divider 181; and a second chopping signal generation circuit 185, composed of two OR gates 186 and 187, for generating a second chopping signal CH62 using the outputs Q4*a* to Q7*a* of the frequency divider 181.

Chopping signal selector 80 including a flip-flop 86 is constructed in a similar manner to that employed in the fifth embodiment. The chopping signal selector 80 outputs a switching signal LBS2 in synchronization with the second chopping signal CH62.

Figure 25:
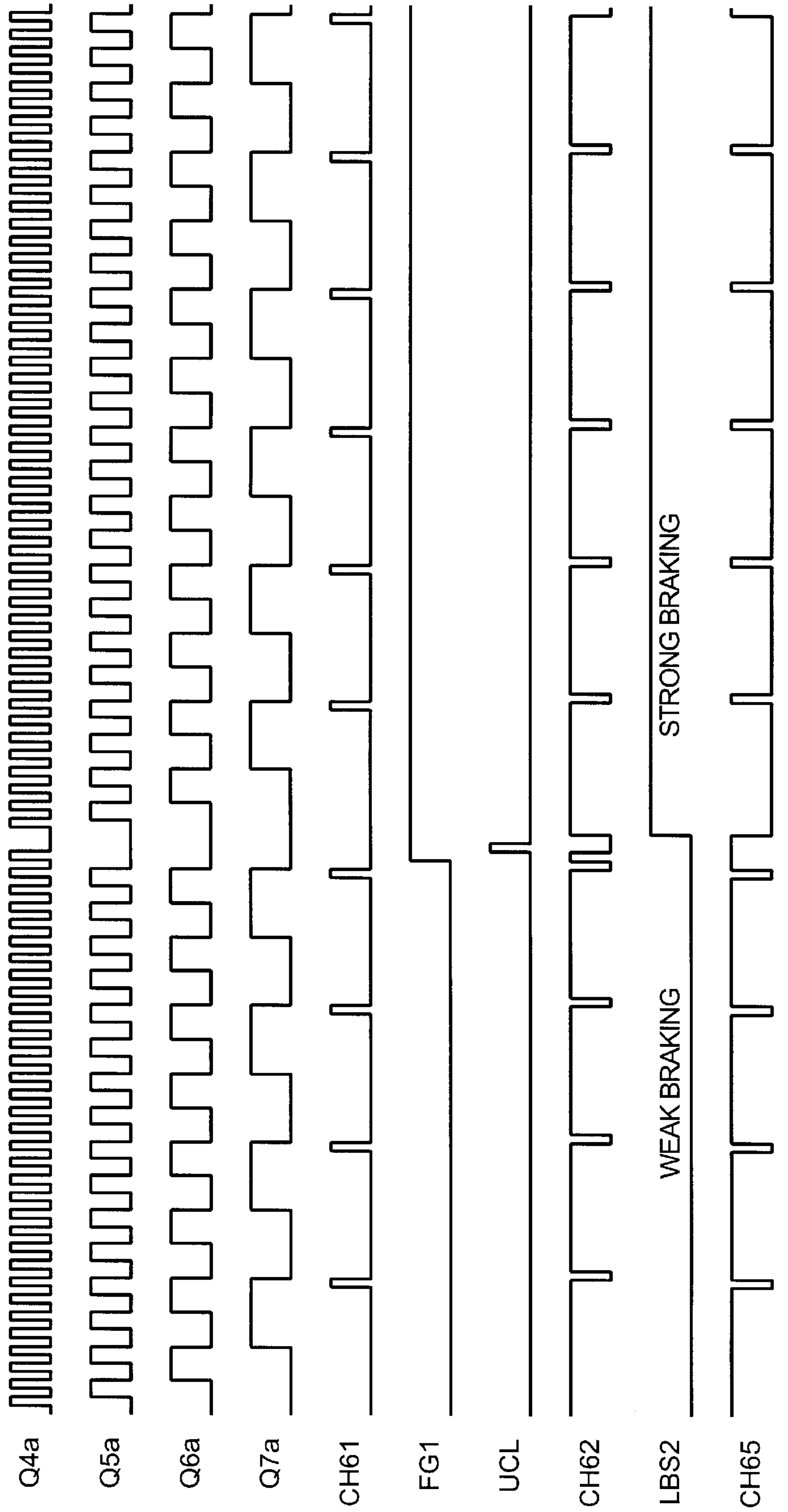
FIG. 25 is a timing chart associated with a chopping signal generator according to the sixth embodiment.
Figure 26:
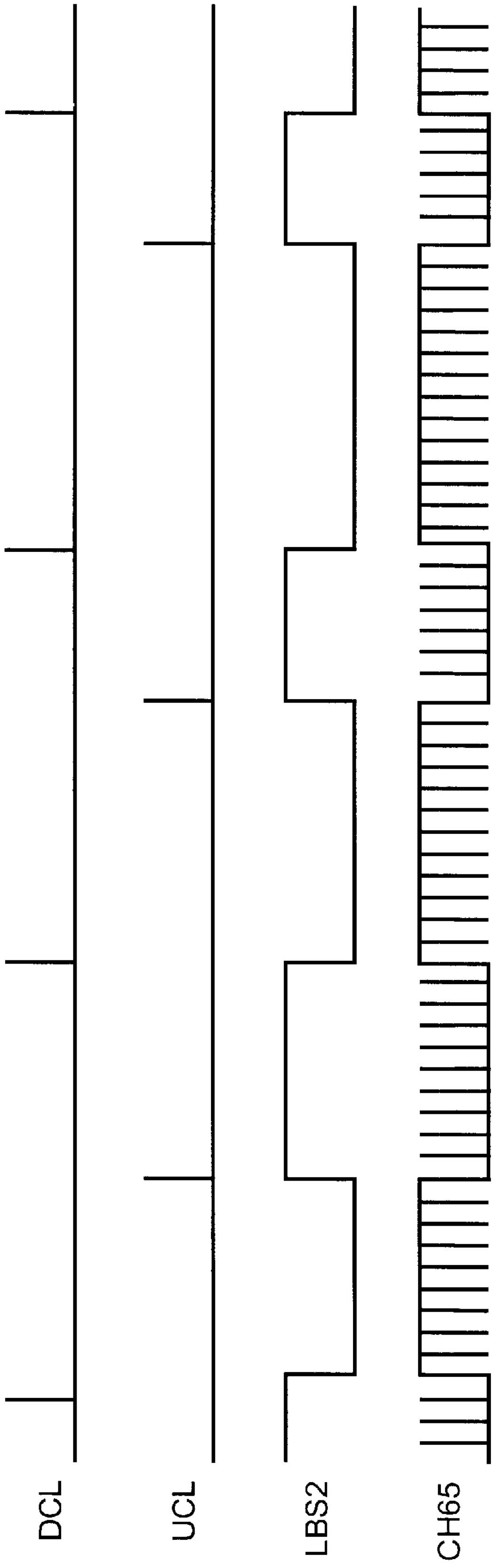
FIG. 26 is a timing chart associated with the chopping signal generator according to the sixth embodiment.

As shown in FIGS. 25 and 26, the chopping signal CH65 output from the NOR gate 89 of the chopping signal selector 80 is switched by the output LBS2 between a chopping signal with a small duty ratio for weak braking (inversion of the first chopping signal CH61) and a chopping signal having the same frequency as that of the former chopping signal but having a large duty ratio for strong braking (inversion of the second chopping signal CH62).

The chopping signal CH65 is applied to the transistors 27 and 29. Therefore, when the chopping signal CH65 is low, the transistors 27 and 29, that is, the switches 21 and 22 are maintained in closed states, and thus the electric power generator 20 is short-circuited through a closed-loop formed by the switches 21 and 22. As a result, the electric power generator 20 is braked.

On the other hand, when the chopping signal CH65 is at a high level, the transistors 27 and 29 are maintained in off-states, and no braking force is applied to the electric power generator 20. Thus, the electric power generator 20 is controlled in a chopping fashion by the chopping signal CH65.

The operation of the present embodiment is described with reference to timing charts shown in FIGS. 25 and 26.

When a low-level system reset signal SR is applied from the initialization circuit 90 to the LOAD input of the up/down counter 60 after the electric power generator 20 starts to operate, an up count signal (UCL) generated based on a rotation detection signal FG1 and a down count signal (DCL) generated based on a reference signal fs are counted by the up/down counter 60.

When the counter value has an initial value of "11", if an up count signal (UCL) is input, the counter value is incremented to "12". As a result, the output LBS becomes high and is applied to the flip-flop 86 of the chopping signal selector 80. At the same time, frequency divider 181 is reset by UCL, and outputs Q4*a*–Q7*a* are then output in response to UCL.

When the frequency divider 181 is reset, a first pulse signal is output as the output CH62 and applied to the clock input of the flip-flop 86. Thus, if the counter value is incremented to "12" in response to an up count signal (UCL), the output LBS2 of the flip-flop 86 immediately rises up to a high level.

If the counter value returns to "11" in response to a down count signal (DCL), the output LBS becomes low. However, because the output LBS2 of the flip-flop 86 varies in synchronization with the output CH62 as in the fifth embodiment, the output LBS2 does not fall down to a low level at the instant when the DCL is input, but falls down after the end of one period of the chopping signal CH62.

In the chopping signal selector 80, when the output LBS2 of the flip-flop 86 is at a low level (when the counter value is equal to or less than "11"), the output of the AND gate 88 is also maintained at a low level. As a result, the NOR gate 89 outputs an inversion of the output CH61 as the chopping signal CH65. Thus, the chopping signal CH65 output from the NOR gate 89 has a small duty ratio. As a result, the braking-on period relative to the reference period becomes short, and the electric power generator 20 is braked very weakly, so that a higher priority is given to optimum generation of electric power.

On the other hand, when the output LBS2 of the flip-flop 86 is a high level (when the counter value is equal to or greater than "12"), the output of the AND gate 87 is maintained at a low level. As a result, the NOR gate 89 outputs an inversion of the output CH62 as the chopping signal CH65. Thus, the chopping signal CH65 output from the NOR gate 89 has a large duty ratio. As a result, the braking-on period relative to the reference period becomes long, and large braking is applied to the electric power generator 20. However, because the braking is turned off at fixed time intervals in a chopping fashion, which allows the braking torque to be increased while minimizing the reduction in electric power generated.

Therefore, also in the present embodiment, the strong braking period starts in synchronization with the up count signal (UCL) generated based on the rotation detection signal FG1 associated with the rotation of the rotor. However, the end of the strong braking period, that is the start of the weak braking period, is not synchronous with the down count signal (DCL) generated based on the reference signal fs but starts after the end of one period of the chopping signal CH65. Thus, the rotational speed is controlled by the chopping signals in a similar manner to the first embodiment described above.

More specifically, the output of the flip-flop 86 for controlling the switching between the strong braking mode and the weak braking mode is output in synchronization with the output CH62. The output CH62 is produced using a signal output from the frequency divider 181 which is reset by an up count signal (UCL) generated on the basis of the rotor rotation detection signal FG1, and output in synchronization with the rotation detection signal FG1. Therefore, the timing of the start of a strong braking operation after the end of a weak braking operation and the timing of the start of a weak braking operation after the end of a strong braking operation are both synchronized with the rotor rotation detection signal FG1.

Furthermore, because the chopping signal for weak braking (inversion of the first chopping signal CH61) and the chopping signal for strong braking (inversion of the second chopping signal) are both produced using the signal output from the frequency divider 181 which is reset by the rotor rotation detection signal FG1, the timing of chopping operations performed in response to the respective chopping signals is synchronized with the rotor rotation detection signal FG1.

The present embodiment also has the advantages (21)–(23) and (25)–(30) described above with reference to the fifth embodiment.

Furthermore, because the starting timing of the weak braking operation and the chopping signal CH65 (inversion of the first chopping signal CH61) used in the weak braking operation are both synchronized with the rotor rotation detection signal FG1, the chopping signal used in the weak braking operation starts at the beginning of one period when the operation is switched to the weak braking mode. Therefore, the chopping signal CH65 used in the weak braking mode is also applied to the switched 21 and 22 for a precise period of time. Thus, also in the weak braking mode, the braking amount can be easily determined, and the control accuracy of the rotational speed can be further improved.

The present invention is not limited to the specific embodiments described above. Various modifications and improvements are possible without departing from the scope of the present invention.

For example, although in the first embodiment, the two types of chopping signals CH2 and CH3 used in the strong braking mode are switched in accordance. with the signal CTL1 which represents the power supply voltage detected by the power supply voltage detector 103, they may be switched in accordance with the signal CTL2 representing the braking amount detected by the braking amount detector 100 as in the second embodiment or may be switched in accordance with the outputs CH22 and CH23 of the AND gates 111 and 112, that is, the counter value of the up/down counter 60 as in the third embodiment. Similarly, in other embodiments, the switching between the chopping signals may be performed using the voltage of the power supply 40, the braking amount, and/or the counter value. Furthermore, as for the priority determination circuit, any one of those disclosed in the first to third embodiments may be employed.

The priority determination circuit may also be constructed by combining two or more components selected from the power supply voltage detector 103, the braking amount detector 100, and the up/down counter 60.

Furthermore, the priority determination circuit may include a rotation period detector for detecting the rotation period of the electric power generator 20 whereby the priority is determined on the basis of the rotation period and the chopping signal in the strong braking mode is switched in accordance with the priority. In this case, the rotation period detector may be constructed such that the rotation detection signal FG1 is input and the rotation period of the electric power generator 20 is detected from this signal using a time in a similar manner to the braking amount detector 100 shown in FIG. 9 or 16.

More specifically, if the value of the time (detection value) is equal to or less than a reference value (125 ms (8 Hz) for example), the rotation period is determined to be small, that is, the rotational speed is determined to be high, and a chopping signal having a high duty ratio or a chopping signal having a low frequency is selected so that a large braking force is applied while giving a high priority to the braking amount (braking torque).

Conversely, if the value of the timer (detection value) is greater than the reference value, the rotation period is determined to be large, that is, the rotational speed is determined to be low. In this case, it is not necessary to give a high priority to the braking amount in the operation in the strong braking mode. Thus, a chopping signal having a small duty ratio or a chopping signal having a high frequency is selected, and the rotation is controlled while giving a high priority to the generated voltage.

The priority determination circuit is not limited to a device which directly detects the state of the electric power generator 20, such as the power supply voltage detector 103, the braking amount detector 100, the up/down counter 60, and the rotation period detector, but a device which detects the state of the electric power generator 20 in an indirect fashion may also be employed. For example, because the rotational speed (generated voltage) of the electric power generator greatly depends on the torque of the spring 1*a,* the state of the electric power generator 20 may be estimated on the basis of the elapsed time from the start of release of the spring 1*a* from the fully wound state detected by a timer or the like, and the priority may be determined on the basis of the state of the electric power generator 20.

The duty ratio of the chopping signal generated by the chopping signal generator is not limited to 13/16 and 15/16 employed in the embodiments described above, but other values such as 14/16 may also be employed. Furthermore, the duty ratio of the chopping signal may be selected not from 16 levels but from 32 levels such as 28/32, 31/32. That is, for the first chopping signal used when a high priority is given to generation of electric power in the strong braking mode, the duty ratio is preferably set to a value in the range from 0.75 to 0.85, and more preferably in the range from 0.78 to 0.82 so as to increase the charged voltage. On the other hand, for the second chopping signal used when a high priority is given to the braking force in the strong braking mode, the duty ratio is preferably set to a value in the range from 0.87 to 0.97 , and more preferably in the range from 0.90 to 0.97 so as to increase the braking force.

In the case where only one type of chopping signal is used in the strong braking mode as in the fifth and sixth embodiments, the duty ratio the chopping signal may be set to a value in a range which contains the ranges employed for the first and second chopping signals described above. More specifically, the duty ratio may be set to a value in the range from 0.75 to 0.97.

In each embodiment, the chopping signal used in the weak braking mode may have a duty ratio of 1/16, 1/32, or another value, depending on the particular application. The frequency of the chopping signal used in the weak braking mode may also be set to a proper value depending on the particular application. Instead of performing the weak braking operation, a braking-off operation may be performed as in the second or fourth embodiment.

When the frequency of the chopping signal generated by the chopping signal generator is varied, the frequencies are not limited to 512 and 64 Hz employed in the second embodiment. The frequencies may be set to, for example, 1024 and 128 Hz, or other combinations. More specifically, the frequency of the first chopping signal used when a higher priority is given to generation of electric power in the strong braking mode is preferably set to a value in the range from 110 to 1100 Hz. To obtain a greater charged voltage, the frequency is preferably set to a value in a higher range from 500 to 1100 Hz. On the other hand, the frequency of the second chopping signal used when a higher priority is given to the braking force in the strong braking mode is preferably set to a value in the range from 25 to 100 Hz, and more preferably in the range from 25 to 50 Hz to obtain a greater braking force.

When one type of chopping signal is used in the strong braking mode as is the case in the fifth and sixth embodiments described above, the frequency of the chopping signal may be set to a value in a range which contains the ranges employed for the first and second chopping signals described above. More specifically, the frequency may be set to a value in the range from 25 to 1100 Hz.

Furthermore, the specific frequency and duty ratio of the chopping signal used in the fourth embodiment are not limited to the examples described above, but other proper values may also be employed.

The reference value used by the power supply voltage detector 103 serving as the priority determination circuit to switch the chopping signal in accordance with the voltage of the power supply 40 is not limited to 1.2 V employed in the embodiment, but other proper values may also be employed.

Furthermore, the number of reference voltages is not limited to one. For example, first and second reference voltages may be used to switch the chopping signal such that the switching characteristic includes a hysteresis. More specifically, the chopping signal is switched in accordance with the first reference voltage (1.5 V for example) when the charged voltage gradually increases, and the chopping signal is switched in accordance with the second reference voltage (1.0 V for example) when the charged voltage gradually decreases.

The reference value used by the braking amount detector 100 is not limited to 50% employed in the second embodiment, but other proper values may also be employed.

In the braking circuit 120 in each embodiment, the first and second switches 21 and 22 may be replaced with the capacitor 23 and the diode 24, and may be disposed on the negative side (VSS) of the power supply 40. That is, the transistors 26–29 of the switches 21 and 22 are replaced with n-channel transistors and inserted between the two terminals MG1 and MG2 of the electric power generator 20 and the negative side (VSS) of the power supply 40 serving as a low-voltage power supply. In this case, the circuit is configured such that one of the switches 21 and 22 connected to the negative terminal of the electric power generator is maintained in an on-state and the other one of the switches 21 and 22 connected to the positive terminal is turned on and off.

In the case where the chopping signal is switched in accordance with the counter value of the up/down counter 60, the switching manner is not limited to the example employed in the third embodiment in which the chopping signal is switched among three types depending on whether the counter value is less than “8”, equal to “8”, or equal to or greater than “9”, but the chopping signal may be switched depending on, for example, whether the counter value is less than “8”, equal to a value of 8 to 9, or equal to a value of 10 to 15. Other proper values may also be employed.

Although the 4-bit up/down counter 60 is employed as the chopping signal selector in the braking controller for switching the control mode between the strong braking mode and the weak braking mode or the braking-off mode, an up/down counter of a 3-bit configuration or of a configuration of a smaller number of bits may also be used. Conversely, an up/down counter of a 5-bit configuration or of a configuration of a greater number of bits may be employed. When an up/down counter of a configuration of a great number of bits is used, the counter can count signals over a greater range. As a result, it becomes possible to store a cumulative error over a greater range. This is useful in particular to control the rotation of the electric power generator 20 in a non-locked state which occurs immediately after the start of the operation of the electric power generator 20. On the other hand, when an up/down counter of a configuration of a small number of bits is used, a reduction in cost can be achieved. In this case, the allowable range of the cumulative error becomes small. However, once the operation comes into the locked state, the operation is performed in a simple fashion in which the counter value is alternately incremented and decrement, and thus even a 1-bit counter can be used.

The braking control circuit is not limited to the up/down counter. For example, the braking controller may be formed of first and second counters provided for counting the reference signal fs and the rotation detection signal FG1, respectively, and a comparator for comparing the counter values of the first and second counters. However, it is desirable to employ the up/down counter 60 because it allows the circuit to be configured in a simpler form. Any circuit capable of detecting the rotation period or the like of the electric power generator and switching the control mode between the strong braking mode and the weak braking mode in accordance with detected rotation period may be employed as the braking control circuit. The specific construction of the braking controller may be determined as required when the invention is practiced.

Although in the first to fourth embodiments described above, two types of chopping signals which are different in duty ratio or frequency are employed to control the braking operation in the strong braking mode, three or more chopping signals which are different in duty ratio or frequency may also be employed. Similarly, although in the fifth and sixth embodiments, one type of chopping signal is employed in the strong braking mode, two or more types of chopping signals may be used in the strong braking mode.

Instead of changing the frequency or duty ratio in a discrete fashion, the frequency or duty ratio may be continuously changed as is employed in the frequency modulation technique.

In the first to fourth embodiments, the starting time of each braking operation may be synchronized with the rotor rotation detection signal as in the fifth and sixth embodiment. When the starting timing of braking operations is synchronized with the rotor rotation detection signal, only the starting timing of strong braking operations may be synchronized with the rotor rotation detection signal, or only the starting timing of weak braking operations may be synchronized with the rotor rotation detection signal. Otherwise, both the starting timing of strong braking operations and the starting timing of weak braking operations may be synchronized with the rotor rotation detection signal. A proper synchronization manner may be selected as required when the invention is practiced.

Figure 27:
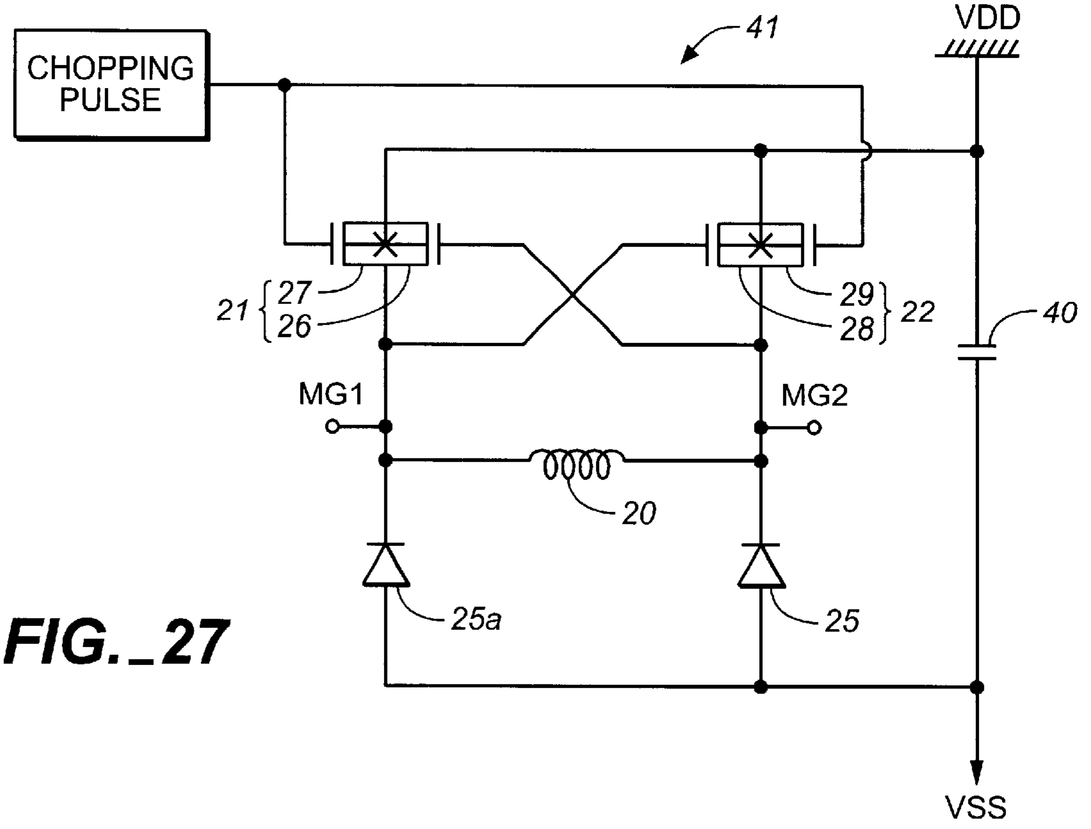
FIG. 27 is a circuit diagram illustrating a rectifying circuit according to the present invention.

The specific circuit configurations of the rectifying circuit 41, the braking circuit 120, the braking controller 55, the chopping signal generator (chopping signal generation circuits 151, 151A and 151B, chopping signal generation circuit 81, 85, and 185, and chopping signal generator 180), and the chopping signal selector 80 are not limited to those employed in the respective embodiments, but other proper circuit configurations may also be employed as required when the invention is practiced. For example, in the rectifying circuit 41 of the braking circuit 120, the capacitor 23 may be replaced with a diode 25*a* as shown in FIG. 27.

The chopping signal selector 80 is not limited to that constructed of logic gates, which is employed in the respective embodiments described above, but the chopping signal selector 80 may also be constructed using a switching device for switching the outputs of the chopping signal generator 151 and an integrated circuit or the like for controlling the switching device in accordance with the voltage generated by the electric power generator or the braking amount.

Figure 28:
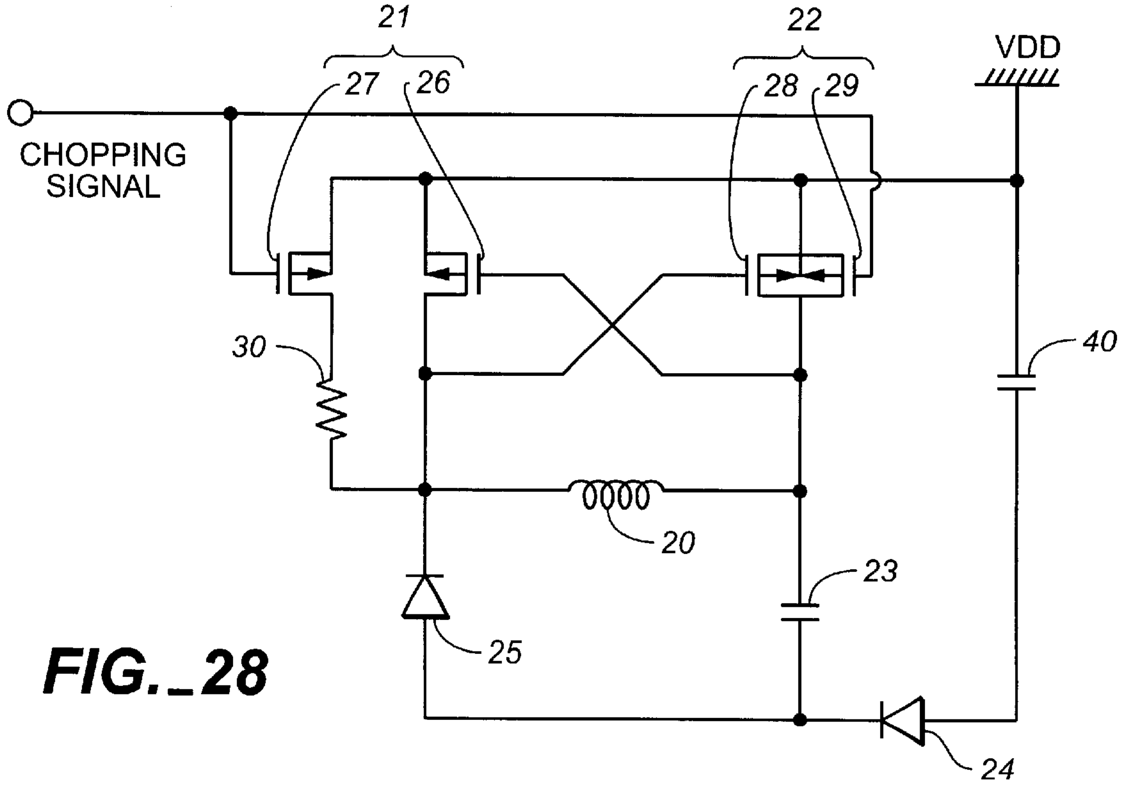
FIG. 28 is a circuit diagram illustrating another rectifying circuit according to the present invention.

The switches used to connect the two terminals of the electric power generator 20 into the closed-loop are not limited to the switches 21 and 22 employed in the embodiments described above. For example, as shown in FIG. 28, a resistor 30 may be connected to the transistor 27 such that the resistor 30 is included in the closed-loop when the two terminals of the electric power generator 20 are connected into the closed-loop by turning on the transistors 27 and 29 using the chopping signal. What is essential is that the switches are capable of connecting the two terminals of the electric power generator into the closed-loop.

The rectifying circuit 41 is not limited to that based on the chopping step-up technique, which is employed in the embodiments described above. For example, the rectifying circuit 41 may include a plurality of capacitors so that a stepped-up voltage is obtained by switching the connections among the plurality of capacitors. Other types of rectifying circuits may also be employed depending on the type of the electronically controlled mechanical clock in which the electric power generator and the rectifying circuit are installed.

The braking circuit including the rectifying circuit 41 is not limited to the barking circuit 120 employed in the embodiments described above, but any braking circuit may be employed as long as it is capable of controlling the electric power generator 20 in a chopping fashion. Although in the braking circuit 120, full-wave chopping is employed, half-wave chopping may also be employed.

Although the frequency of the chopping signal in each embodiment may be properly selected depending on a practical application, it is preferable that the frequency be equal to or higher than 50 Hz (five times the rotation frequency of the rotor of the electric power generator 20) so as to improve the braking performance while obtaining a charged voltage equal to or greater than a predetermined level. Similarly, the duty ratio of the chopping signal may be properly selected within the range from 0.05 to 0.97 depending on a practical application.

The rotation frequency (reference signal) of the rotor is not limited to 8 Hz employed in the embodiments described above, but other values such as 10 Hz may be employed depending on a practical application.

The application of the present invention is not limited to the electronically controlled mechanical clock described above with reference to the specific embodiments, but the invention may also be applied to a wide variety of electronic devices such as various types of watches and desk-top clocks, a portable clock, a portable sphygmomanometer, a portable telephone, a personal handy phone, a pager, a pedometer, a calculator, a portable personal computer, an electronic notepad, a PDA (personal digital assistant), a portable radio set, a toy, a music box, a metronome, and an electric shaver. The feature that the rotation of the electric power generator can be controlled at a fixed speed in an efficient fashion while maintaining the voltage generated by the electric power generator at a certain level is advantageous to operate various electronic devices in a stable fashion for a long period of time. The invention is particularly useful when it is applied to a portable electronic device which is used outdoors because a mechanical energy source such as a spring is used and thus an external power supply is not needed, although the present invention may also be applied to electronic devices which are installed in a house or a building.

Figure 29:
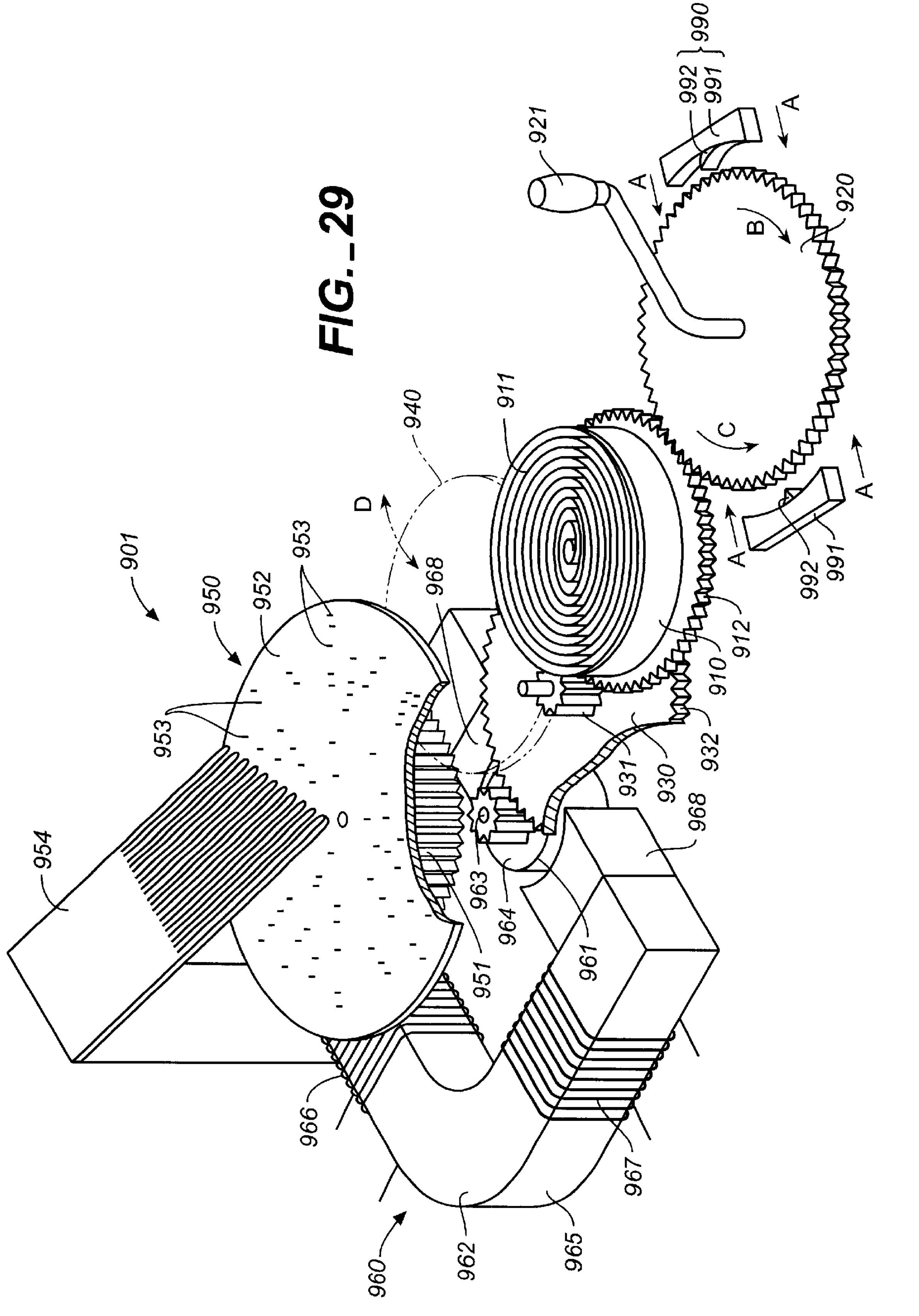
FIG. 29 is a perspective view illustrating main parts of a music box to which aspects of the present invention may be applied.

The present invention may also be applied to an audio sound device such as a music box 901 shown in FIG. 29.

The music box 901 includes: a barrel wheel 910 in which a spring 911 serving as a mechanical energy source is placed; a winding wheel 920, meshing with a barrel gear 912 of the barrel wheel 910, for winding the spring 911; a step-up wheel 930, also meshing with the barrel gear 912, for transmitting mechanical energy of the spring 911; a step-down wheel 940 (represented by a two-dot chain line in FIG. 29) meshing with a pinion of the step-up wheel 930; sound generation circuit 950, driven via the step-down wheel 940, for generating a sound; an electric power generator 960 for converting the mechanical energy transmitted via the step-up wheel 930 to electrical energy; and a rotation controller 970 (FIG. 30) for controlling the rotational speed of the electric power generator 960 at a fixed value. The music box 901, which is an example of an electronic device according to the present invention, may be used by itself or may be installed in a clock so that a musical sound is generated for a predetermined period of time.

On the winding wheel 920, there is provided an electromagnetic clutch 990 having a pair of engaging parts and serving as a locking mechanism. If the rotational speed of the rotor 961 becomes very low when the spring 911 is released, the electromagnetic clutch 990 moves the engaging parts 991 in directions denoted by arrows A so that latching members 992 are engaged with the winding wheel 920 thereby stopping the rotation (in a direction denoted by an arrow B) of the winding wheel 920 and thus preventing the spring 911 from being further released.

The latching members 992 are urged by a spring or the like against the winding wheel 920 so that even when the engaging part 991 are engaged with the winding wheel 920, the winding wheel 920 can be rotated only in a direction denoted by an arrow C using a handle 921 thereby winding the spring 911.

The audio sound generator 950 may be constructed in a similar form to that employed in conventional music boxes. More specifically, the audio sound generator 950 includes a rotating disk 952 connected to a pinion 951 meshing with the step-down wheel 940, and a musical sound is generated by plucking comb-shaped vibration plates 954 by a plurality of pins 953 disposed on the upper surface of the rotating disk 952.

The electric power generator 960 includes a rotor 961 and a coil block 962.

The rotor 961 is composed of a rotor pinion 963 meshing with the gear 932 of the step-up wheel 930 and a rotor magnet 964 which rotates together with the rotor pinion 963.

The coil block 962 is formed by winding a first coil 966 and a second coil 967 around a C-shaped stator 965. A pair of core stators 968 are disposed on the stator, at locations in the vicinity of the rotor 961. The stator 965 and the core stators 968 are made of a plurality of plate-shaped members which are placed one on another so as to minimize the eddy loss. The first coil 966 is used to generate electric power and also to brake the electric power generator. The second coil 967 is used to detect the rotation of the rotor 961.

Figure 30:
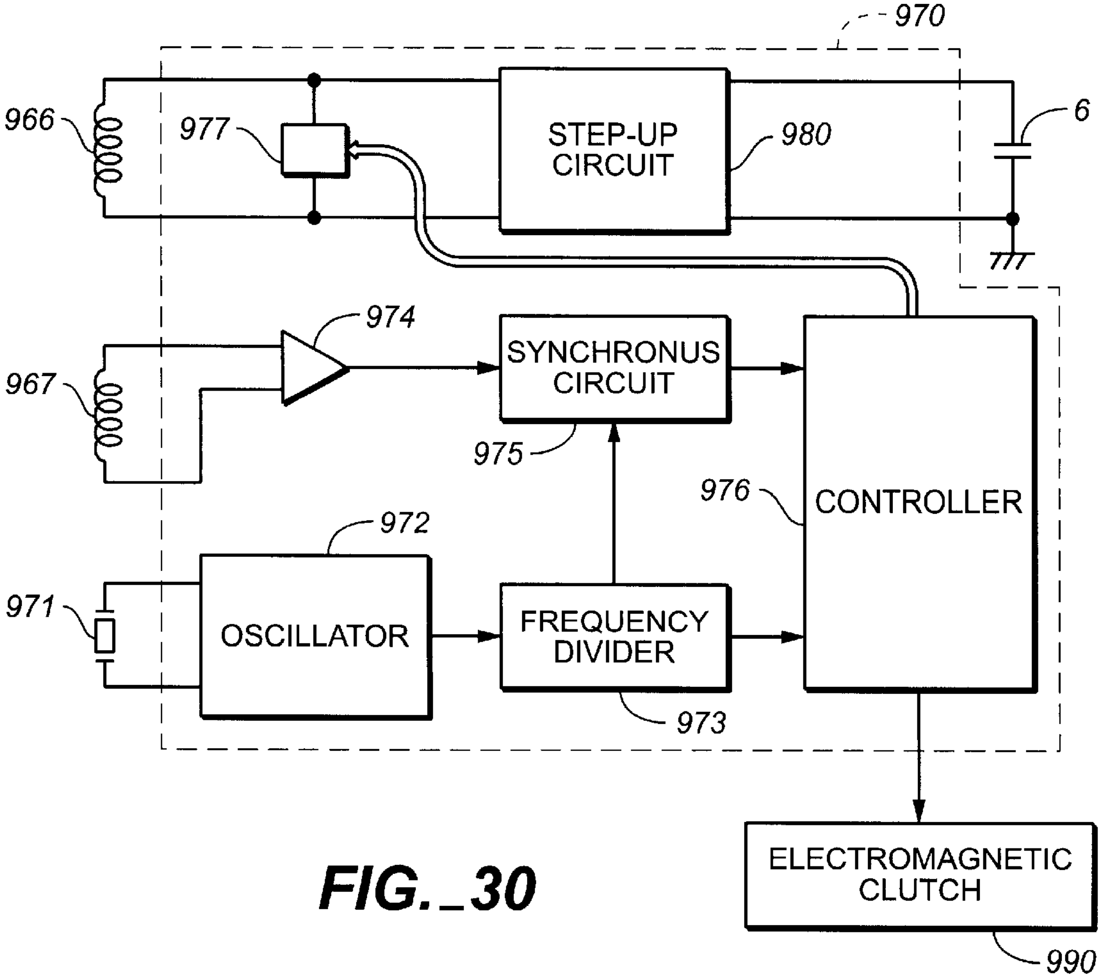
FIG. 30 is a circuit diagram illustrating main parts of a rotation controller of the music box shown in FIG. 29.

The rotation controller 970 is an electronic circuit constructed in the form of an integrated circuit. As shown in FIG. 30, the rotation controller 970 includes: an oscillator 972 for driving a quartz resonator 971; a frequency divider 973 for generating a reference signal with a particular frequency from a clock signal generated by the oscillator 972; a comparator 974 serving as rotation detector, connected to the second coil 967, for detecting the rotational speed of the rotor 961 (the frequency of an AC output signal) and generating a detection signal corresponding to the detected rotational speed; a synchronous circuit 975 for outputting the detection signal in synchronization with the reference signal; a controlling circuit 976 which compares the detection signal output from the synchronous circuit 975 with the reference signal and outputs a control signal (chopping signal) for braking depending on the comparison result; and a braking circuit 977 for controlling the rotational speed of the rotor 961 of the electric power generator 960 in accordance with the control signal output from the controlling circuit 976.

The braking circuit 977 includes a switch formed of a transistor or the like which is capable of connecting the ends of the coil 966, that is, the two terminals of the electric power generator 960, into a closed-loop state, thereby controlling the rotational speed of the electric power generator 960. The controlling circuit 976 selects a chopping signal from two or more types of chopping signals, which are different in at least either duty ratio or frequency, depending on the rotational speed of the rotor 961, and outputs the selected chopping signal, in a similar manner as in the previous embodiments described above. Using this chopping signal, the braking circuit 977 controls the electric power generator 960 in a chopping fashion.

Thus, the braking torque can be increased while maintaining the generated voltage at a certain level or higher. Therefore, the music box 901 can operate for a long period of time. Furthermore, it is possible to rotate the electric power generator 960 and thus the disk 952 at a fixed rotational speed for a long period of time. This allows music to be played at a fixed correct tempo for a long period of time.

The present invention may also be applied to a metronome. In this case, a wheel for generating a metronome sound is coupled with a wheel train so that a metronome sound is generated at regular time intervals as the wheel rotates. In metronomes, it is required to generate a sound at various tempos as required. To this end, the period of the reference signal generated by the oscillator may be varied by varying the frequency division ratio of the frequency divider.

The mechanical energy source is not limited to the spring 1*a*, but other types of mechanical energy sources such as rubber, a weight, and a fluid such as compressed air may also be employed depending on a specific device to which the present invention is applied. Mechanical energy may be stored into the mechanical energy source by means of, for example, hand winding, a rotating weight, potential energy, atmospheric pressure change, wind force, wave power, hydraulic power, temperature difference, etc.

The energy transmission device for transmitting mechanical energy from the mechanical energy source such as a spring to the electric power generator is not limited to the wheel train (gear) employed in the embodiments described above, but other types of devices such as a friction wheel, belt (timing belt) and pulley, chain and sprocket wheel, rack and pinion, and cam may also be employed depending on a specific electronic device to which the present invention is applied.

The time indication device is not limited to the hands 13, 14 and 17, but other types of time indication devices in the form of a circular plate, an annular ring, or a semicircle may also be employed. A time indication device of the digital-indication type using a liquid crystal panel or the like may also be employed. A clock using such a time indication device of the digital-indication type also falls within the scope of the present invention.

EXAMPLES

The effects of the chopping technique have been experimentally investigated as follows.

Figure 31:
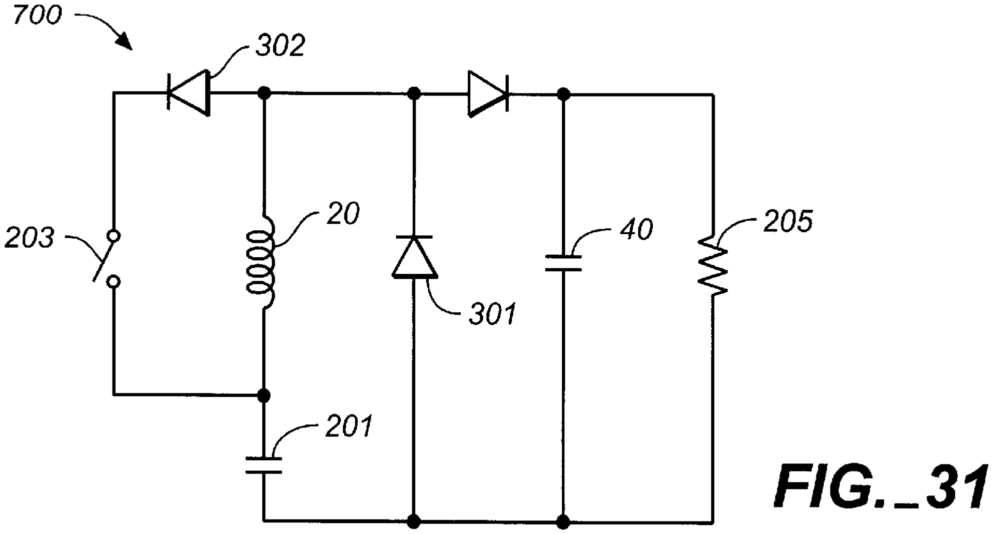
FIG. 31 is a circuit diagram of a chopping charging circuit which has been employed in an experiment according to the present invention.

Experiments were performed using a chopping charging circuit 700 shown in FIG. 31. The chopping charging circuit 700 includes a 0.1 μF capacitor 201 connected in series to the coil of the electric power generator 20, a 1 μF capacitor 40 connected in parallel to the electric power generator 20, and a chopping switch 203. Instead of an integrated circuit, a 10 MΩ resistor 205 was employed as a load. Rectifying diodes 301 and 302 were also used.

The charged voltage (generated voltage) across the capacitor 40 and the driving torque were measured for five different chopping frequencies 25, 50, 100, 500, and 1000 Hz applied to the switch 203 and also for six different frequencies 32, 64, 128, 256, 512, and 1024 Hz, and plotted in FIGS. 32 to 35 as a function of the duty cycle which is the relative length of the on-period of the switch 203. In this measurement, the rotational speed of the rotor of the electric power generator 20 was fixed at 10 Hz.

The integrated circuit 202 used in the electronically controlled mechanical clock is usually driven by a current of 80 nA and a voltage of 0.8 V. In the circuit 700, if the capacitor 40 is charged to 0.8 V, an 80 nA current flows through the 10 MΩ resistor 205. Therefore, this state corresponds to the state in which the integrated circuit 202 is driven by the capacitor 40 charged at 0.8 V.

Figure 33:
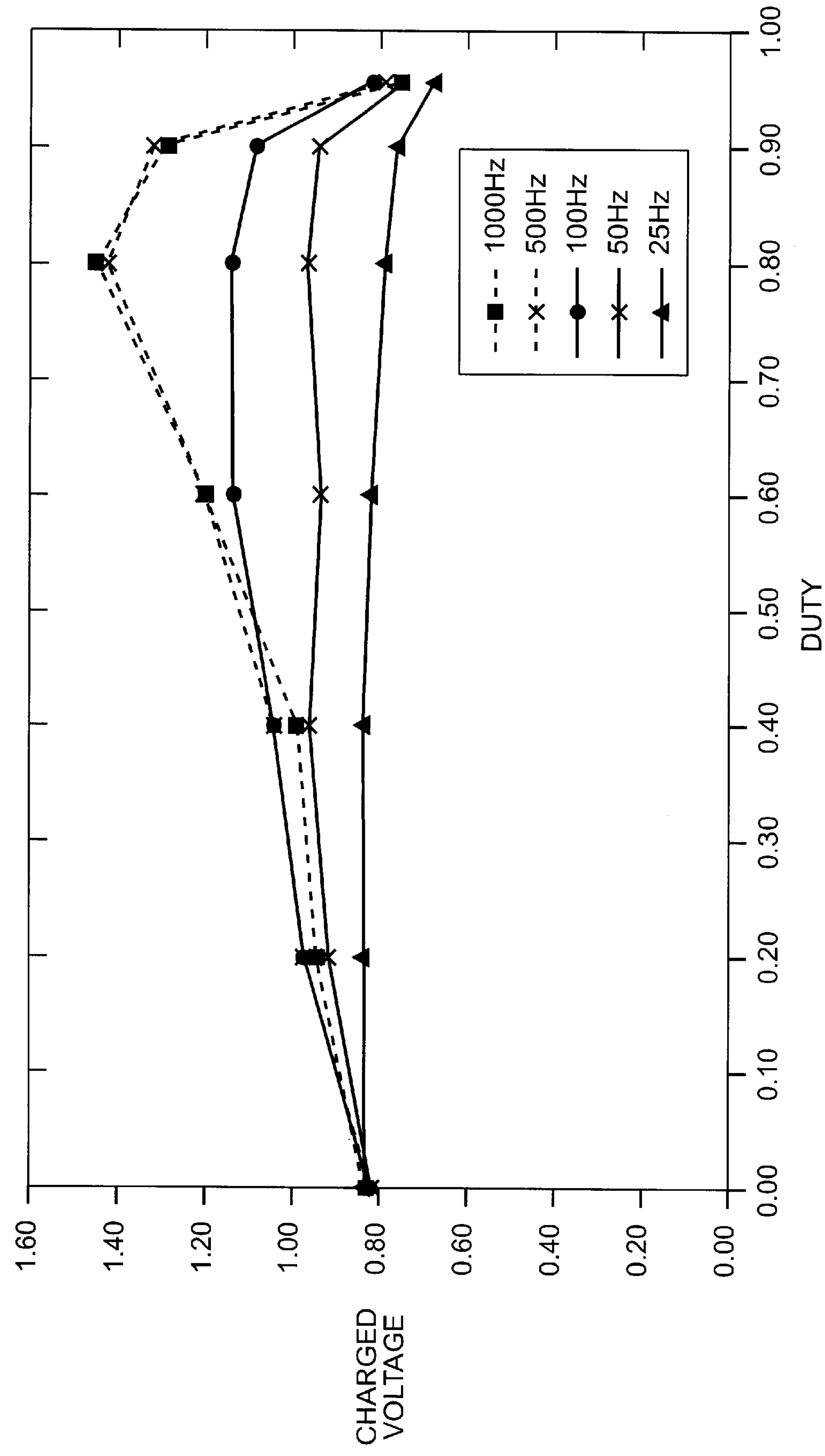
FIG. 33 is a graph illustrating the relationship between charged voltage and duty ratio for different chopping frequencies.
Figure 35:
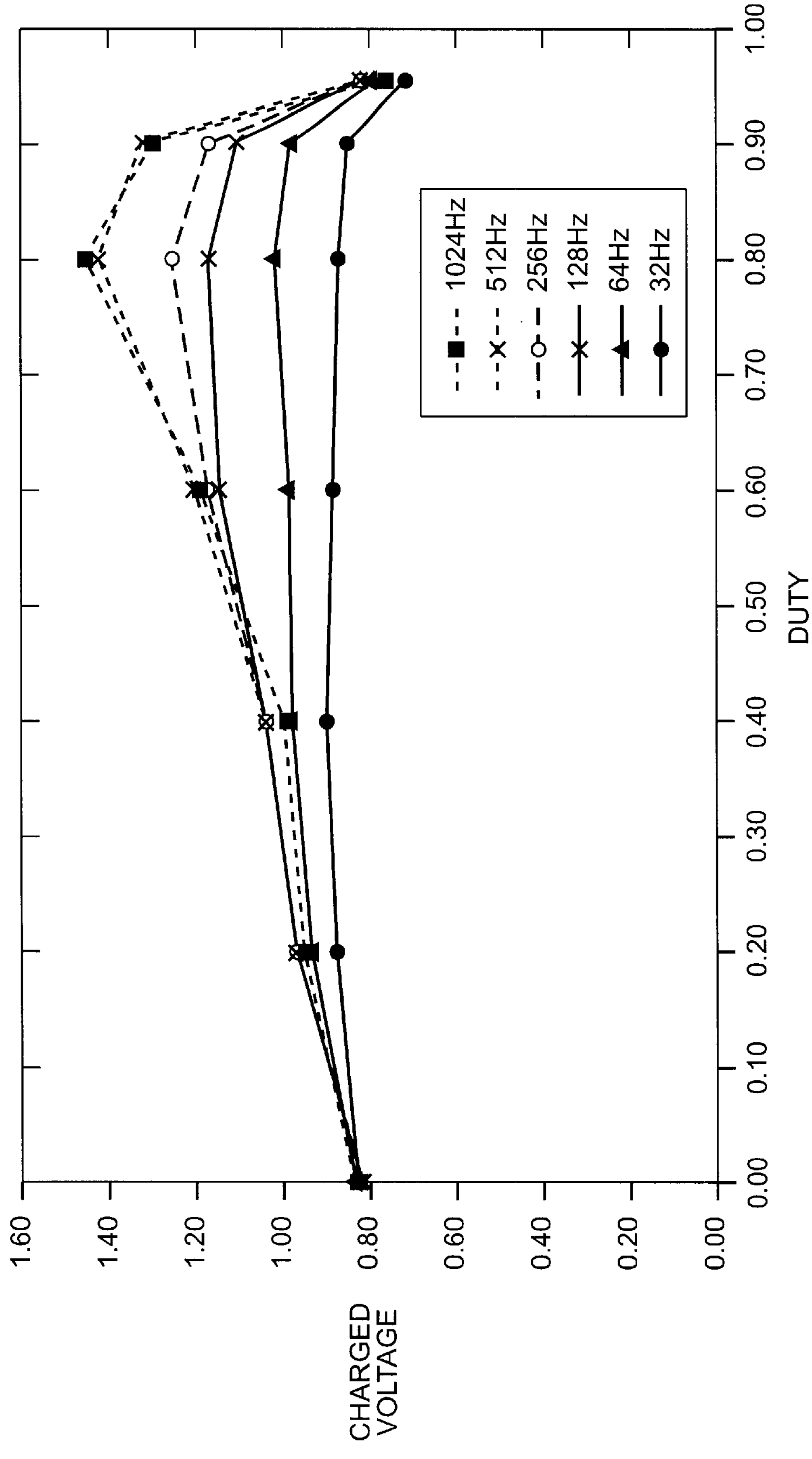
FIG. 35 is a graph illustrating the relationship between charged voltage and duty ratio for different chopping frequencies.

As can be seen from the experimental results in terms of the charged voltage shown in FIGS. 33 and 35, the capacitor 40 was charged to a voltage greater than 0.8 V except when the chopping frequency is 25 Hz and 32 Hz.

Figure 32:
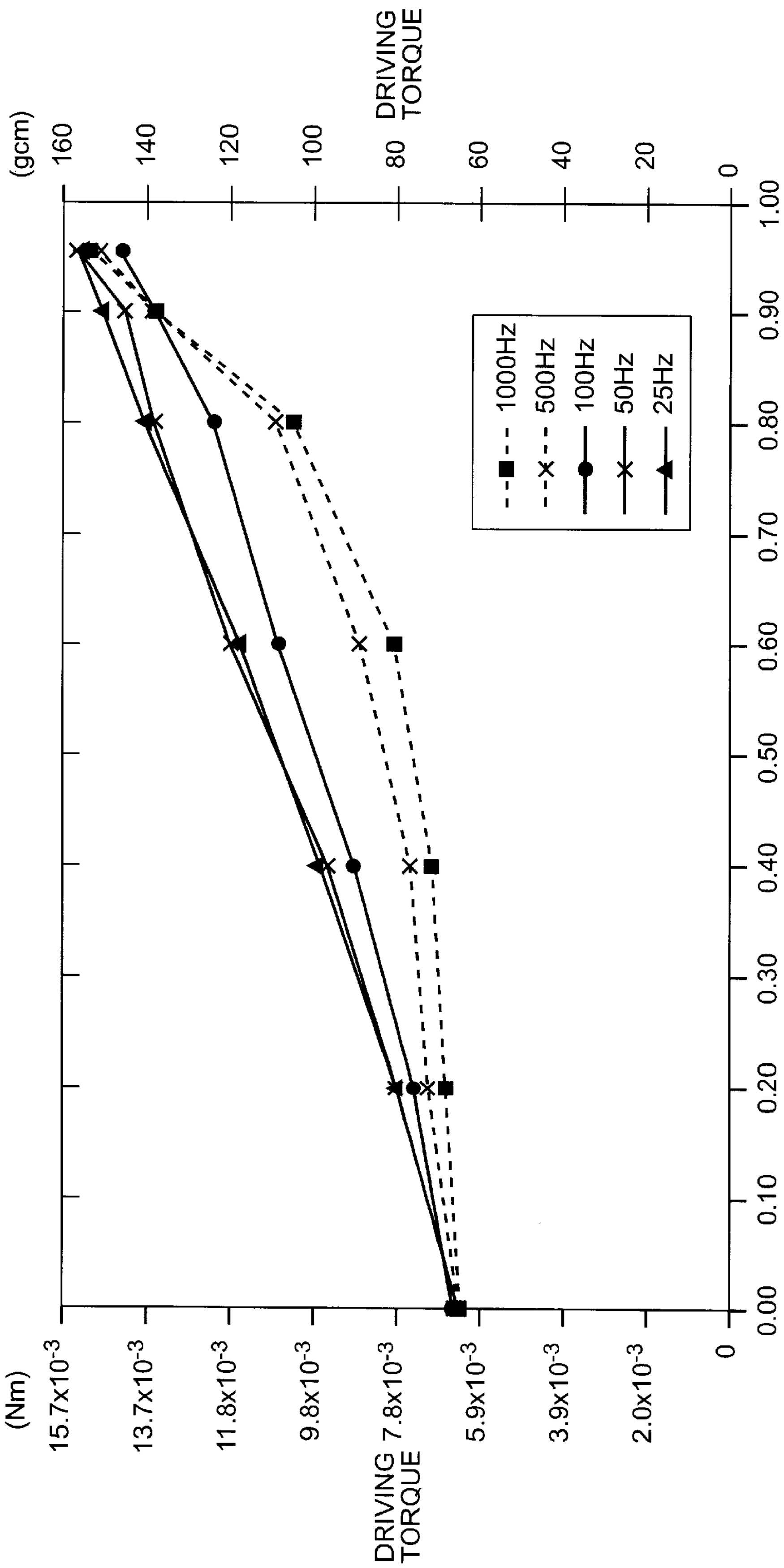
FIG. 32 is a graph illustrating the relationship between driving torque and duty ratio for different chopping frequencies.
Figure 34:
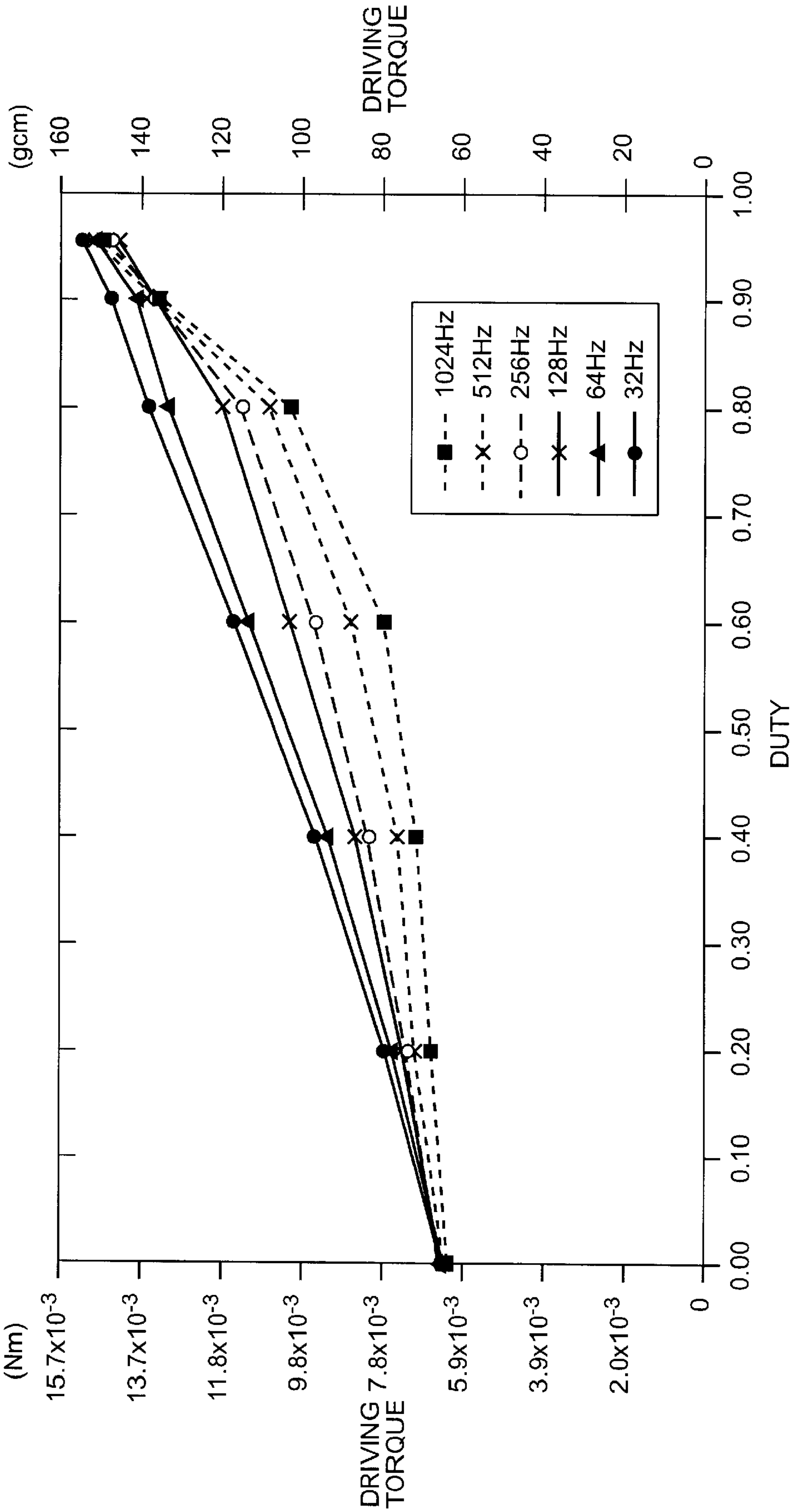
FIG. 34 is a graph illustrating the relationship between driving torque and duty ratio for different chopping frequencies.

In FIGS. 32 and 34, the driving torque of the electric power generator 30 measured under the chopping conditions shown in FIGS. 33 and 35 is plotted. Herein, the driving torque refers to a torque which is needed to rotate the electric power generator 20 at 10 Hz, and which is equal to the damping torque applied from the electric power generator 20 to the spring 1*a*. As can be seen from FIGS. 32 and 34, the increasing rate of the driving torque as a function of the duty ratio depends on the chopping frequency. However, when the duty ratio is equal to 0.9, the driving torque becomes substantially equal for all frequencies. Experiments have indicated that similar characteristics to those shown in FIGS. 32, 33, 34, and 35 are obtained at frequencies other than 10 Hz.

More specifically, when the chopping frequency was set to a value 5 times or more greater than the rotation frequency of the rotor, such as 50 Hz or 64 Hz, the braking performance was improved while obtaining a charged voltage equal to or greater than a certain level, and thus it has turned out experimentally that the invention is useful.

In the case where the chopping frequency is set to 25 Hz or 32 Hz, a charged voltage equal to or greater than 0.8 V can be obtained if the duty ratio is equal to or smaller than 0.80. This means that the chopping frequency may also be set to 25 or 32 Hz, if the duty ratio is optimized depending on the frequency.

That is, the range of the duty ratio may be properly selected depending on the chopping frequency (frequency of the chopping signal). More specifically, when the frequency is within the range from 25 to 1000 Hz, the duty ratio for strong braking may be set to a value in the range from 0.40 to 0.97 , and the duty ratio for weak braking may be set to value in the range from 0.01 to 0.30.

Although the measurement was performed for frequencies up to 1024 Hz, it is easily expected that similar effects will be obtained for higher frequencies. However, if the frequency is too high, the electric power needed by the integrated circuit for the chopping operation increased to a very high level, and thus large electric power is required to generate electric power. Therefore, in practical applications, the upper limit is 1000–1100 Hz, that is, 100 times the rotation frequency of the rotor.

When the rotation frequency of the electric power generator 20 (the frequency of the reference signal) is set to another value other than 10 Hz, similar characteristics to those shown in FIGS. 23–35 can be obtained. Therefore, the rotation frequency can be properly selected as required to achieve similar advantages depending on a particular application.

Advantages

In the electronic device and the control method thereof according to the present invention, the braking torque of the electric power generator can be increased while maintaining the generated electric power at a certain level.

Furthermore, in the electronic device and the control method thereof according to the present invention, when the braking operation is performed using a chopping signal, a precise and large enough amount of braking torque can be applied in a highly reliable fashion. This makes it possible to achieve quick response and high stability in the control of the rotational speed of the electric power generator.

In particular, the present invention may be advantageously applied to an electronically controlled mechanical clock to achieve high-precision control of the rotational speed and high-accuracy time indication. That is, a high-accuracy clock can be realized.

While the invention has been described in conjunction with several specific embodiments, further alternatives, modifications and variations will be apparent to those skilled in the art in light of the foregoing description. Thus, the invention described herein is intended to embrace all such alternatives, modifications and variations as may fall within the spirit and scope of the appended claims.

What is claimed is:

1. An electronic device, comprising:

a mechanical energy source;

an electric power generator, driven by said mechanical energy source, for generating electric power by induction and supplying electrical energy; and a rotation controller, driven by the electrical energy, for controlling the rotation period of said electric power generator with one of a strong braking signal and a weak braking signal, said rotation controller comprising:

a switch capable of connecting two terminals of said electric power generator in a closed-loop state, a chopping signal generator that generates at least two types of chopping signals which are different in at least either duty ratio or frequency and which direct said rotation controller to apply a strong braking force to said electric power generator according to said strong braking signal, and a chopping signal selector that selects one of the at least two types of chopping signals during said application of said strong braking force to said electric power generator and applies the selected chopping signal to said switch, thereby controlling said electrical power generator in a chopping manner according to the selected chopping signal.

2. An electronic device according to claim 1, wherein the at least two types of chopping signals are equal in frequency but different in duty ratio.

3. An electronic device according to claim 2, wherein the at least two types of chopping signals include a first chopping signal having a duty ratio in a range from about 0.75 to about 0.85 and a second chopping signal having a duty ratio in a range from about 0.87 to about 0.97.

4. An electronic device according to claim 1, wherein the at least two types of chopping signals are equal in duty ratio but different in frequency.

5. An electronic device according to claim 4, wherein the at least two types of chopping signals include a first chopping signal having a frequency in a range from about 110 to about 1100 Hz and a second chopping signal having a frequency in a range from about 25 to about 100 Hz.

6. An electronic device according to claim 1, wherein the at least two types of chopping signals are different in duty ratio and frequency.

7. An electronic device according to claim 6, wherein the at least two types of chopping signals include a first chopping signal having a duty ratio in a range from about 0.75 to about 0.85 and a frequency in a range from about 110 to about 1100 Hz, and a second chopping signal having a duty ratio in a range from about 0.87 to about 0.97 and a frequency in a range from about 25 to about 100 Hz.

8. An electronic device according to claim 2, wherein said rotation controller includes a priority determination circuit that determines a priority of applying a braking force to said electric power generator versus generating electric power with said electric power generator, wherein in the case where said priority determination circuit determines that a higher priority should be given to applying a braking force, said chopping signal selector selects a chopping signal having a large duty ratio and applies the selected chopping signal to said switch, and in the case where said priority determination circuit determines that a higher priority should be given to generating electric power, said chopping signal selector selects a chopping signal having a small duty ratio and applies the selected chopping signal to said switch.

9. An electronic device according to claim 4, wherein said rotation controller includes a priority determination circuit that determines a priority of applying a braking force to said electric power generator versus generation of electric power with said electric power generator, wherein in the case where said priority determination circuit determines that a higher priority should be given to applying a braking force, said chopping signal selector selects a chopping signal having a low frequency and applies the selected chopping signal to said switch, and in the case where said priority determination circuit has determined that a higher priority should be given to generating electric power, said chopping signal selector selects a chopping signal having a high frequency and applies the selected chopping signal to said switch.

10. An electronic device according to claim 6, wherein said rotation controller includes a priority determination circuit that determines a priority of applying a braking force to said electric power generator versus generating electric power with said electric power generator, wherein in the case where said priority determination circuit has determined that a higher priority should be given to applying a braking force, said chopping signal selector selects a chopping signal having a large duty ratio and a low frequency and applies the selected chopping signal to said switch, and in the case where said priority determination circuit determines that a higher priority should be given to generating electric power, said chopping signal selector selects a chopping signal having a small duty ratio and a high frequency and applies the selected chopping signal to said switch.

11. An electronic device according to claim 8, wherein said priority determination circuit includes a voltage detector that detects the voltage generated by said electric power generator, thereby determining the priority of applying a braking force to said electric power generator versus generating electric power with said electric power generator.

12. An electronic device according to claim 9, wherein said priority determination circuit includes a voltage detector that detects the voltage generated by said electric power generator, thereby determining the priority of applying a braking force to said electric power generator versus generating electric power with said electric power generator.

13. An electronic device according to claim 10, wherein said priority determination circuit includes a voltage detector that detects the voltage generated by said electric power generator, thereby determining the priority of applying a braking force to said electric power generator versus generating electric power with said electric power generator.

14. An electronic device according to claim 8, wherein said priority determination circuit includes a rotation period detector that detects the rotation period of said electric power generator, thereby determining the priority of applying a braking force to said electric power generator versus generating electric power with said electric power generator.

15. An electronic device according to claim 9, wherein said priority determination circuit includes a rotation period detector that detects the rotation period of said electric power generator, thereby determining the priority of applying a braking force to said electric power generator versus generating electric power with said electric power generator.

16. An electronic device according to claim 10, wherein said priority determination circuit includes a rotation period detector that detects the rotation period of said electric power generator, thereby determining the priority of applying a braking force to said electric power generator versus generating electric power with said electric power generator.

17. An electronic device according to claim 8, wherein said priority determination circuit includes a braking amount detector that detects an amount of braking applied to said electric power generator, thereby determining the priority of applying a braking force to said electric power generator versus generating electric power with said electric power generator.

18. An electronic device according to claim 9, wherein said priority determination circuit includes a braking amount detector that detects an amount of braking applied to said electric power generator, thereby determining the priority of applying a braking force to said electric power generator versus generating electric power with said electric power generator.

19. An electronic device according to claim 10, wherein said priority determination circuit includes a braking amount detector that detects an amount of braking applied to said electric power generator, thereby determining the priority of applying a braking force to said electric power generator versus generating electric power with said electric power generator.

20. An electronic device according to claim 1, wherein said chopping signal selector selects one of the at least two types of chopping signals and applies the selected chopping signal to said switch based on the voltage generated by said electric power generator.

21. An electronic device according to claim 1, wherein said rotation controller includes an up/down counter which receives, at an up count input, a rotation detection signal generated based on the rotation period of said electric power generator and which receives, at a down count input, a reference signal, and wherein said chopping signal selector selects one of the at least two types of chopping signals and applies the selected chopping signal to said switch based on the value of said up/down counter.

22. An electronic device according to claim 1, wherein said chopping signal selector selects one of the at least two types of chopping signals and applies the selected chopping signal to said switch based on a braking amount represented by a ratio of a braking period to one period of a reference signal.

23. An electronic device according to claim 1, wherein said rotation controller is capable of applying not only the strong braking force but also a weak braking force to said electric power generator, and wherein, when the weak braking force is applied to said electric power generator, said rotation controller applies a chopping signal with a duty ratio smaller than the duty ratio of any of the at least two types of chopping signals used to provide the strong braking force.

24. An electronic device according to claim 23, wherein the chopping signal used to apply the weak braking force has a duty ratio in a range from about 0.01 to about 0.30.

25. An electronic device according to claim 19, wherein said chopping signal selector is capable of continuously outputting a chopping signal for strong braking over a period of time greater than or equal to one period of a reference signal.

26. An electronic device according to claim 1, further comprising a power supply, and first and second power supply lines for transmitting electrical energy generated by said electric power generator to said power supply for storage;

wherein said switch includes a first switch disposed between a first terminal of said electric power generator and said first power supply line, and a second switch disposed between a second terminal of said electric power generator and said second power supply line; and wherein said rotation controller controls the rotation period of said electric generator, such that one of said first and second switches is maintained in a closed state while the selected chopping signal is applied to the other of said first and second switches, thereby turning it on and off.

27. An electronic device according to claim 26, wherein said first switch includes a first field effect transistor whose gate is connected to the second terminal of said electric power generator and a second field effect transistor which is connected in parallel to said first field effect transistor and which is turned on and off by said rotation controller; and wherein said second switch includes a third field effect transistor whose gate is connected to the first terminal of the electric power generator and a fourth field effect transistor which is connected in parallel to said third field effect transistor and which is turned on and off by said rotation controller.

28. An electronic device according to claim 1, wherein said electronic device is an electronically controlled mechanical timepiece including a time indication device which is rotated by said mechanical energy source in connection with said electric power generator and which is controlled by said rotation controller.

29. A method of controlling an electronic device comprising a mechanical energy source, an electric power generator, driven by said mechanical energy source, for generating electric power by induction and supplying resulting electrical energy, and a rotation controller, driven by the electrical energy, for controlling the rotation period of said electric power generator with one of a strong braking signal and a weak braking signal, said method comprising:

applying a chopping signal, selected during application of a strong braking force to said electric power generator from at least two types of chopping signals which are different in at least either duty ratio or frequency and which direct said rotation controller to apply said strong braking force to said electric power generator, to a switch capable of connecting two terminals of said electric power generator in a closed-loop state, thereby controlling said electric power generator in a chopping manner according to the selected chopping signal.

30. A method of controlling an electronic device comprising a mechanical energy source, an electric power generator, including a rotor, driven by said mechanical energy source, for generating electric power by induction and supplying electrical energy, and a rotation controller, driven by the electrical energy, for controlling the rotation period of said electric power generator with one of a strong braking signal and a weak braking signal, said rotation controller including a switch capable of connecting two terminals of said electric power generator in a closed-loop state, said method comprising:

applying a chopping signal, selected during application of a strong braking force to said electric power generator from at least two types of chopping signals which are different in at least either duty ratio or frequency and which direct said rotation controller to apply said strong braking force to said electric power generator, to said switch, wherein when a rotation detection signal associated with the rotor of said electric power generator is input, a chopping signal for strong braking is applied to said switch.

31. An electronic device according to claim 2, wherein the at least two types of chopping signals include a first chopping signal having a duty ratio in a range from about 0.75 to about 0.88 and a second chopping signal having a duty ratio in a range from about 0.90 to about 0.97.

32. An electronic device according to claim 6, wherein the at least two types of chopping signals include a first chopping signal having a duty ratio in a range from about 0.75 to about 0.88 and a frequency in a range from about 110 to about 1100 Hz, and a second chopping signal having a duty ratio in a range from about 0.90 to about 0.97 and a frequency in a range from about 25 to about 100 Hz.

* * * * *